United States Patent [19]
Smith

[11] Patent Number: 5,691,798
[45] Date of Patent: Nov. 25, 1997

[54] PROGRESSIVE POWER OPHTHALMIC LENS

[75] Inventor: Scott W. Smith, Apex, N.C.

[73] Assignee: Teijin Chemicals Ltd., Tokyo, Japan

[21] Appl. No.: 508,112

[22] Filed: Jul. 27, 1995

[51] Int. Cl.$^6$ .................................................. G02C 7/06
[52] U.S. Cl. ................................................. 351/169; 351/177
[58] Field of Search .................................. 351/169, 168, 351/177, 161

[56] References Cited

U.S. PATENT DOCUMENTS

| | | | |
|---|---|---|---|
| 2,878,721 | 3/1959 | Kanolt | 351/169 |
| 3,010,366 | 11/1961 | Crawford | 351/169 |
| 3,687,528 | 8/1972 | Maitenaz | 351/169 |
| 3,785,724 | 1/1974 | Cretin-Maitenaz | 351/169 |
| 3,797,922 | 3/1974 | Plummer | 351/169 |
| 4,056,311 | 11/1977 | Winthrop | 351/169 |
| 4,240,719 | 12/1980 | Guilino et al. | 351/169 |
| 4,253,747 | 3/1981 | Maitenaz | 351/169 |
| 4,315,673 | 2/1982 | Guilino et al. | 351/169 |
| 4,418,992 | 12/1983 | Davenport et al. | 351/169 |
| 4,461,550 | 7/1984 | Legendre | 351/169 |
| 4,514,061 | 4/1985 | Winthrop | 351/169 |
| 4,592,630 | 6/1986 | Okazaki | 351/169 |
| 4,606,622 | 8/1986 | Fuëter et al. | 351/169 |
| 4,676,610 | 6/1987 | Barkan et al. | 351/169 |
| 4,784,482 | 11/1988 | Guilino | 351/169 |
| 4,796,988 | 1/1989 | Dufour et al. | 351/169 |
| 4,838,674 | 6/1989 | Dufour | 351/169 |
| 4,838,675 | 6/1989 | Barkan et al. | 351/169 |
| 4,861,153 | 8/1989 | Winthrop | 351/169 |
| 4,934,808 | 6/1990 | Kitani | 351/169 |
| 4,946,270 | 8/1990 | Guilino et al. | 351/169 |
| 4,950,057 | 8/1990 | Shirayanagi | 351/169 |
| 4,952,047 | 8/1990 | Barth et al. | 351/169 |
| 4,988,182 | 1/1991 | Takahashi et al. | 351/169 |
| 5,042,936 | 8/1991 | Guilino et al. | 351/169 |
| 5,048,945 | 9/1991 | Ueno et al. | 351/169 |
| 5,123,725 | 6/1992 | Winthrop | 351/169 |
| 5,137,343 | 8/1992 | Kelch et al. | 351/169 |
| 5,166,711 | 11/1992 | Portney | 351/161 |
| 5,270,744 | 12/1993 | Portney | 351/161 |
| 5,270,745 | 12/1993 | Pedrono | 351/169 |
| 5,305,028 | 4/1994 | Okano | 351/169 |

*Primary Examiner*—Scott J. Sugarman
*Assistant Examiner*—Jordan Schwartz
*Attorney, Agent, or Firm*—Chilton, Alix & Van Kirk

[57] ABSTRACT

A progressive power ophthalmic lens having a spherical distance viewing area, a progressive power portion with a decreasing radius of curvature along an umbilic meridian, and a spherical near viewing area. Power distribution functions are optimized for smooth transition along the principal directions of gaze. A statistically smoothed polynomial function of the general form $Pm = b_1 + b_2 X + b_3 X^2 + \ldots + b_9 X^8$ defines the mean power at any point on the lens surface to regulate curvature variation. Thereby providing continuity of the visual field at the boundaries of the principal lens zones and creating an integrated visual field as the eye traverses the lens.

4 Claims, 39 Drawing Sheets

VERTICAL POWER CROSS SECTION, y = 20 mm 2.5 Add

VERTICAL POWER CROSS SECTION, y = 15 mm 2.5 Add

ASTIGMATISM HORIZONTAL SECTION, 2.5 Add, xo = 10 mm

ASTIG HORIZONTAL SECTION, 2.5 Add, xo = 20 mm

PROGRESSIVE POWER OPHTHALMIC LENS

BACKGROUND OF THE INVENTION

This invention relates to eyeglass lenses. More particularly, the present invention relates to progressive lenses for the correction of presbyopia.

The original multifocal ophthalmic lenses intended for the correction of presbyopia were bifocals with the distance prescription in the carrier lens and the near prescription in a segment which occupied some or all of the lower portion of the lens. Such lenses have the disadvantage of an abrupt discontinuity in optical power at the boundary between distance and near viewing zones and are limited to providing correction for essentially two distances. Aesthetically, the line at the boundary is often considered unattractive. Since then, many multifocal surfaces with continuously variable surface power have been described all with varying degrees of the inevitable unwanted surface astigmatism. In 1959 Kanolt described a lens composed of four different analytic polynomial surfaces of unspecified origin which are continuous at their common boundaries (U.S. Pat. No. 2,878, 721). Continuity extends at least through the first derivatives and preferably the second order derivatives. This is necessary to achieve continuity of the physical surface and power transition. In this early embodiment, there was no umbilical meridian and therefore astigmatism was present in the transitional zones between the distance and near viewing portions of the lens.

In 1972 Maitenaz disclosed a progressive power ophthalmic lens design which reduced the levels of surface astigmatism to tolerable levels (U.S. Pat. No. 3,687,528), thus making the concept of progressive addition lenses more practical. This lens was constructed around a central umbilicus whose surface could be defined by an infinite set of spheres of variable radius with their centers located on an involute and their surfaces tangential to the lens surface. Another characteristic of one preferred embodiment was that the surface not directly on the umbilicus meridian was described as a set of orthogonal conic sections whose eccentricity evolved gradually along the path of power transition in a way that was intended to reduce surface astigmatism and provide areas of useful width for viewing at all distances. These goals were substantially achieved, although the intermediate viewing zone was quite narrow. Successive generations of this original lens followed.

In 1986, Fueter et al. described a progressive surface (U.S. Pat. No. 4,606,622) which was intended to enhance binocular vision through a concept known as horizontal symmetrics. In this lens, off axis points on each lens corresponding to the simultaneous lines of sight of the left and right eyes are balanced in the sense that both eyes view approximately equal amounts of aberration in terms of mean power and astigmatism errors in lateral gaze. This has the effect of improving orthoscopy by reducing vertical and horizontal prism imbalance.

The concept of mathematically optimizing smoothness was introduced by Winthrop in his 1989 invention (U.S. Pat. No. 4,861,153). By variationally minimizing an auxiliary function closely related to the mean square gradient of surface curvature, the lens successfully achieved the lowest maximum astigmatism and the smoothest gradients of astigmatism and mean power prior to that time. The bipolar boundary conditions assured that the aberrations would be distributed over the entire area of the lens in a particularly smooth way.

The general framework for a progressive lens has become an ophthalmic lens with distance and near viewing areas which are essentially aberration free and are connected by a transitional corridor which is also essentially free of astigmatism. Adjacent to the transitional corridor are areas with varying amounts of unwanted astigmatism and mean power errors. Numerous progressive lenses have been proposed. Each such lens attempts to optimize the balance of the level of unwanted surface astigmatism, distribution of aberration on the surface, and the useful width of the various viewing zones. The specific distributions of mean power and astigmatism are the features which distinguish each particular progressive lens and make them unique.

SUMMARY OF THE INVENTION

Briefly stated, the present invention is a progressive power ophthalmic surface such that the distribution of mean power along a path which is parallel to the eye path in both lateral gaze and convergence for near objects corresponds to a statistically smoothed polynomial. The invention in a preferred form is a multifocal ophthalmic lens having a wide spherical distance viewing zone and an essentially aberration free near viewing zone which are connected by an asymmetric corridor which provides a continuously varying increase in focal power as a function of the addition. The corridor parallels an umbilicus which asymmetrically bisects the progressive zone and which is angled to correspond to the path of the eye during convergence and along which the variation in refractive power is determined by the specified power addition. The curvatures in the principal meridians are equal along the meridional umbilic so that the surface along the umbilical curve can be described by an infinite set of osculating spheres of decreasing radius of curvature. Power curves along sections parallel to the corridor are proportional to the refractive power increase along the umbilical curve.

The mean power at any point on the surface of a progressive power ophthalmic lens in accordance with the present invention is defined by the general expression $P_m = (\frac{1}{2})(n-1)/(1/r_1 + 1/r_2)$ wherein $r_1$ and $r_2$ are the radii of surface curvature in the principal meridians and n is the index of refraction. More particularly, the functions of mean power are parallel to selected directions of gaze and correspond to a unique eighth order polynomial of the form $P = b_1 + b_2 X + b_3 X^2 + \ldots b_9 X^8$ wherein $b_1$ through $b_9$ are non-zero coefficients.

It is an object of the present invention to provide an improved progressive power ophthalmic lens.

It is another object of the present invention to provide an improved progressive power ophthalmic lens having an optically smooth transition between the essentially spherical distance and near viewing areas of the lens and the asymmetric corridor which connects the distance and near viewing areas.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DETAILED DESCRIPTION OF THE PREFERRED EMBODIMENT

Figure 1A:
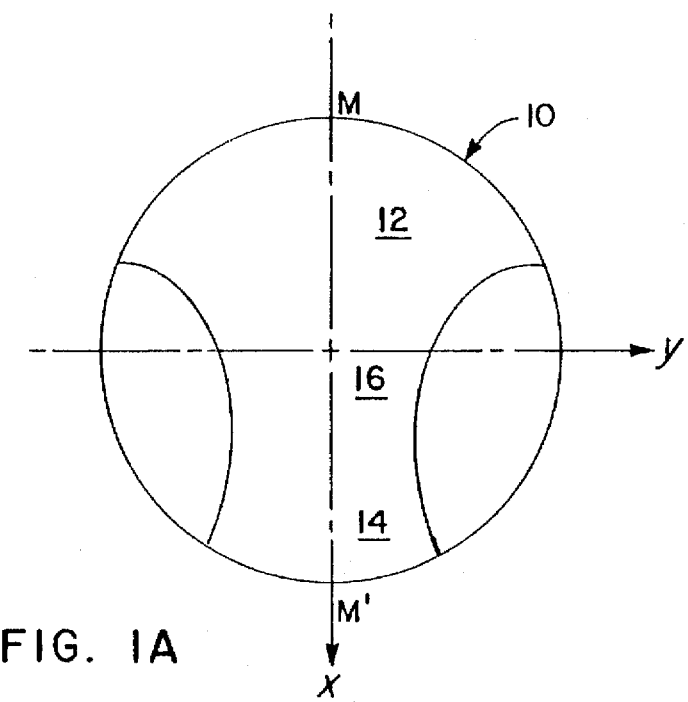
FIGS. 1A and 1B are views in vertical elevation and coordinate representation respectively, of a progressive power ophthalmic lens in accordance with the present invention.

A progressive addition ophthalmic lens 10 in accordance with this invention has a wide essentially spherical area for distance viewing 12 and a essentially spherical area for near viewing 14 connected by an umbilicus along which the principal curvatures are equal. This creates a corridor 16 between distance viewing and near viewing areas 12, 14 paralleling the umbilicus (FIG. 1A) in which the surface astigmatism is low. There is a gradual increase in surface power along the corridor 16 according to the reading addition. During convergence, the eye path coincides with the line of the corridor 16 which runs asymmetrically in a nasal direction between the distance and reading areas 12, 14.

In a conventional progressive lens spline functions are often used to create continuity in both surface height and power transition between the spherical reading and distance areas 14, 12 and the aspheric regions which border them. They have been an effective modeling tool in surface construction. However, the present invention utilizes another stochastic method which can more easily achieve smoothing over a relatively long distance. This method is somewhat similar in concept to an ordinary least squares fit in linear regression theory where $$n(x) = \frac{e^{[-(x-\mu)^2/2\sigma^2]}}{\sqrt{2\pi}\ \sigma}$$

wherein $n(x)$ is the normal probability distribution function, $\mu$ is the mean, $\sigma^2$ is the variance and $x$ is an independent variable.

In the above equation, a change in $u$ translates the distribution curve up and down the axis and the variance controls the width of the curve. In polynomial regression theory, $f(x_i)$ is regarded as if it were the outcome of an experiment whose outcomes are normally distributed and is conducted at $x=x_i$ where $x$ is an independent variable of known value. The mean is now regarded as a function of the independent variable and the variance is held constant. Therefore, $\mu$ is defined as a polynomial of the form $$\mu(x) = \sum_{j=1}^{n} a_j * x^j = P_n.$$

The coefficients $a_j$ are found by determining the choice of the function which maximizes the probability of the n+1 observations by least squares methods. The resulting polynomial regression curve is unique and will depend on the order "j" chosen. The order must be sufficiently high so as to correspond accurately to required boundary conditions and other constraints.

Figure 2A:
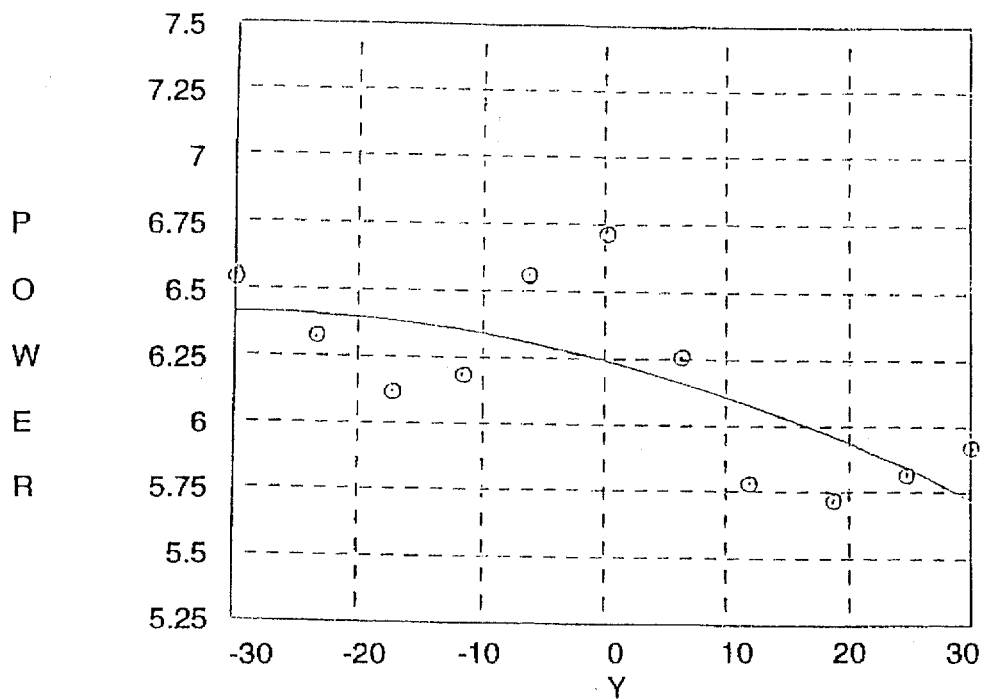
FIGS. 2A through 2D are graphs showing the effect of increasing the order of a polynomial equation defining a progressive power ophthalmic lens having a 2.00 diopter progression.
Figure 2B:
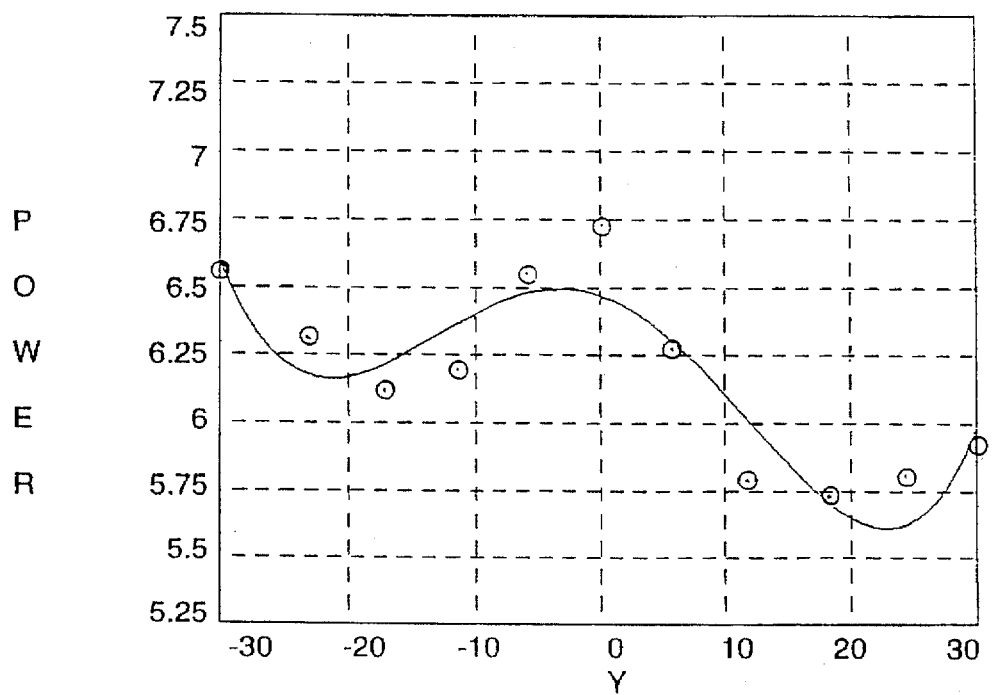
Figure 2C:
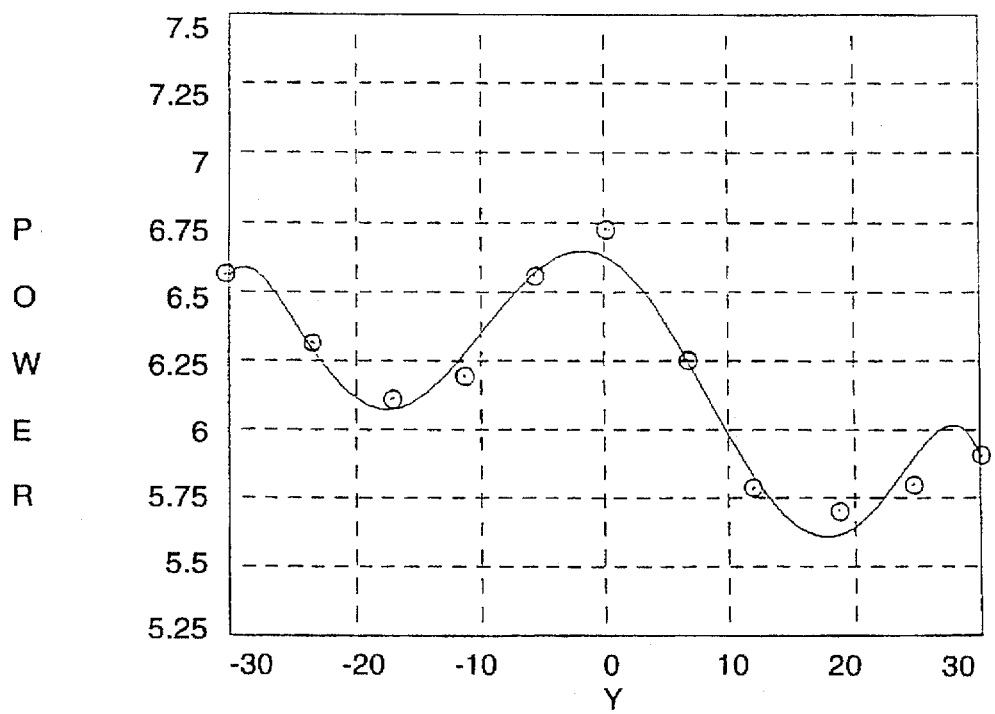
Figure 2D:
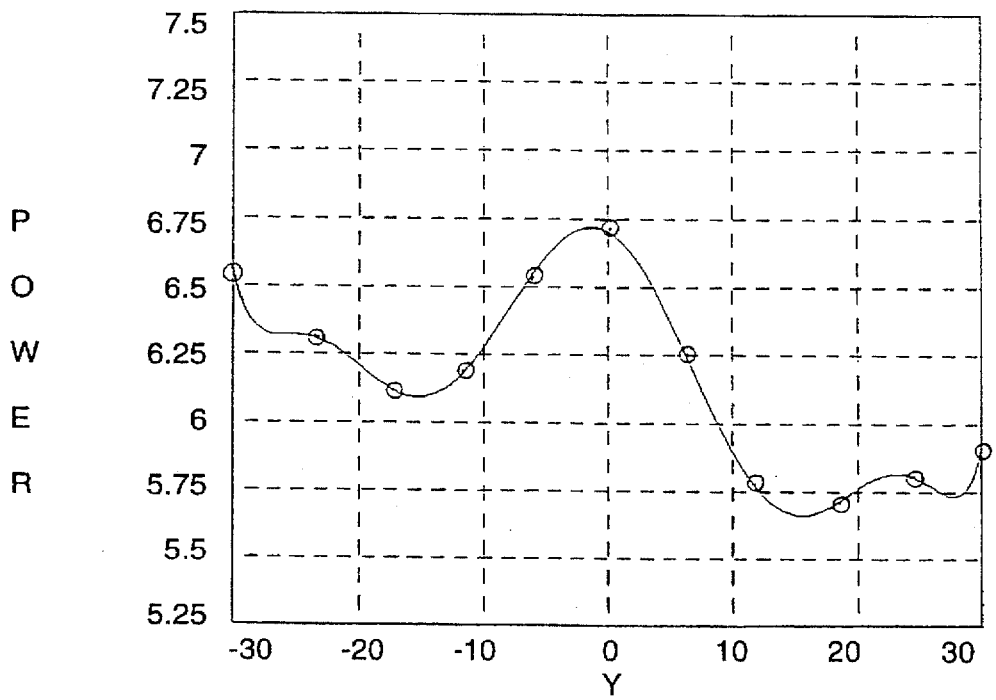
Figure 3A:
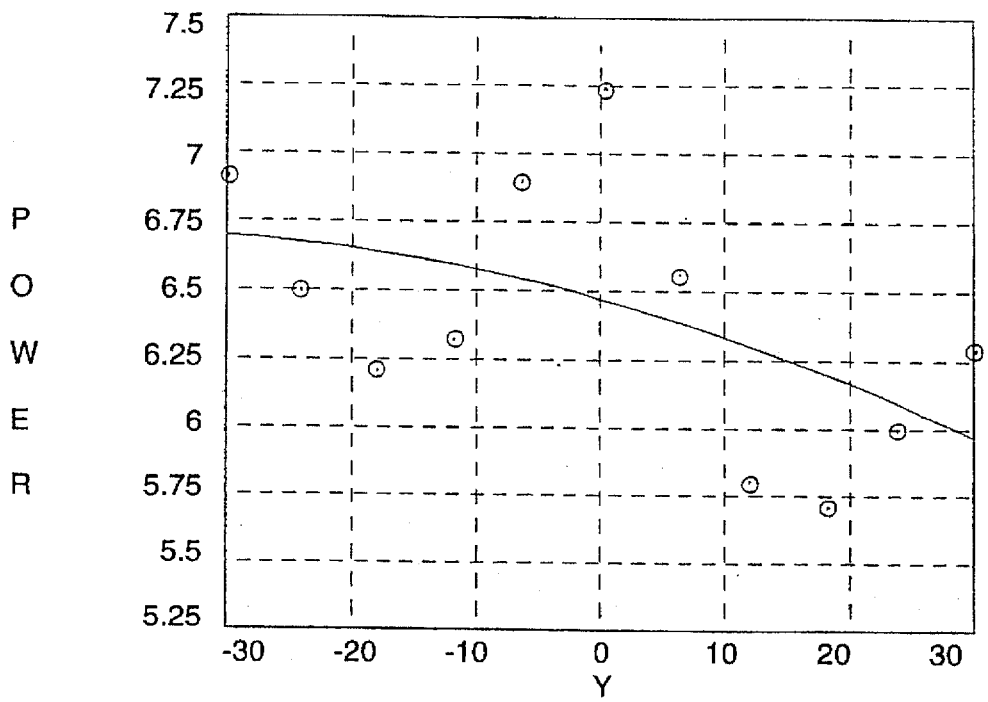
FIGS. 3A through 3D are graphs showing the effect of increasing the order of a polynomial equation defining a progressive power ophthalmic lens having a 2.50 diopter progression.
Figure 3B:
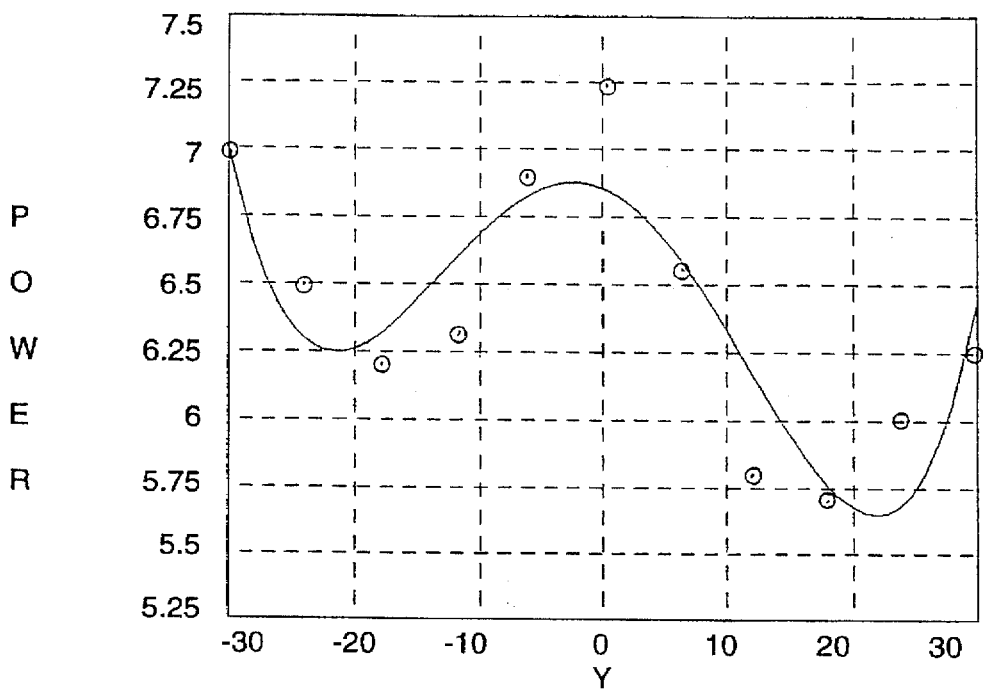
Figure 3C:
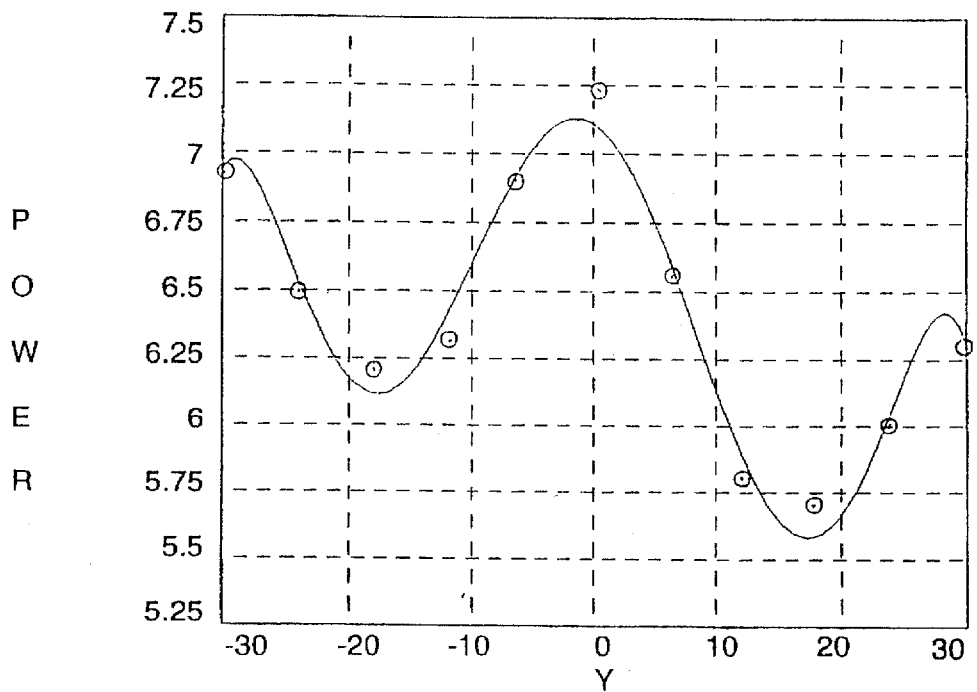
Figure 3D:
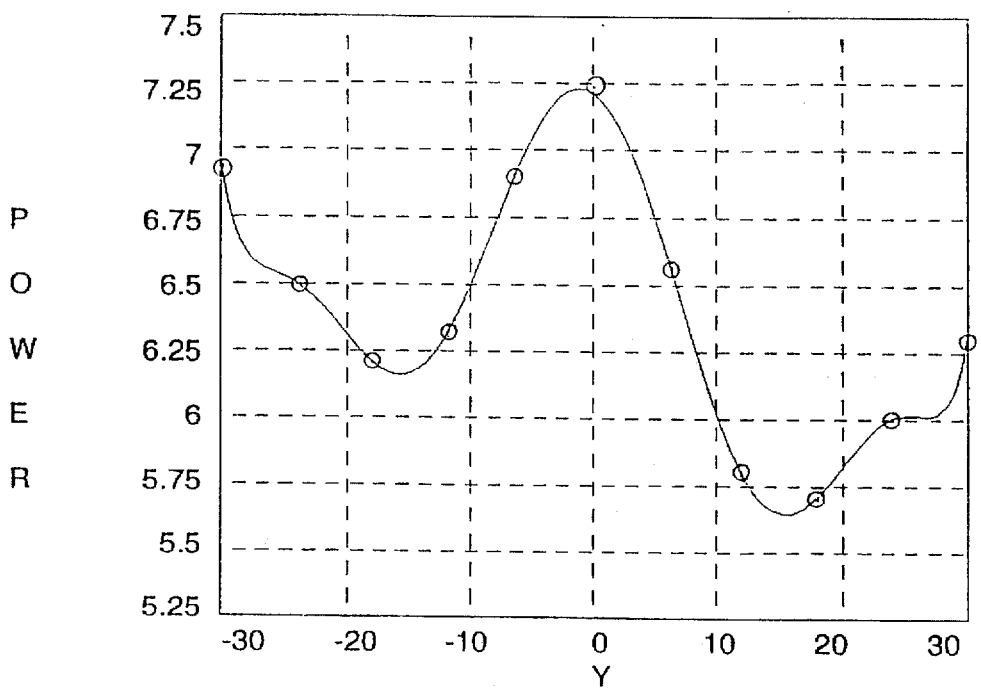

In a first example, 11 points are specified as power requirements (FIGS. 2A through 2D). In FIG. 2A, a second order solution is found for a horizontal cross-section 20 mm down into the progressive zone of a 2.00 diopter progression. Clearly, the second order solution is inadequate to model the surface power requirements. In FIG. 2B, a fourth order solution more nearly reflects design requirements but still not closely enough. In FIG. 2C, the sixth order solution is almost adequate. Finally, in FIG. 2D, the corresponding eighth order solution conforms well to specified parameters. Going to even higher orders will produce no benefit and increases the possibility of oscillatory behavior. In a second example (FIGS. 3A through 3D) the power specifications and curves 20 mm down into the progressive portion of a 2.50 diopter addition are examined. The results of second example are qualitatively similar to the first. Only the eighth order solution produces a satisfactory model.

Given the general parameters and boundary conditions, it is possible to iteratively construct a very general power grid from a fairly small number of points consistent with these constraints. These points can serve as data points to be used in a curve fitting procedure to determine the equation for a power function along a chosen cross-section of the lens. It is most crucial to maintain smoothness of the power curves along the eye path to reduce the swim effects caused by distortion created by the lens surface. It is therefore desirable to select power functions along the principal paths of eye movement which are as smooth as possible and still consistent with the given constraints. This can be achieved by taking advantage of the statistical smoothing properties inherent in curve fitting by polynomial regression.

Figure 1B:
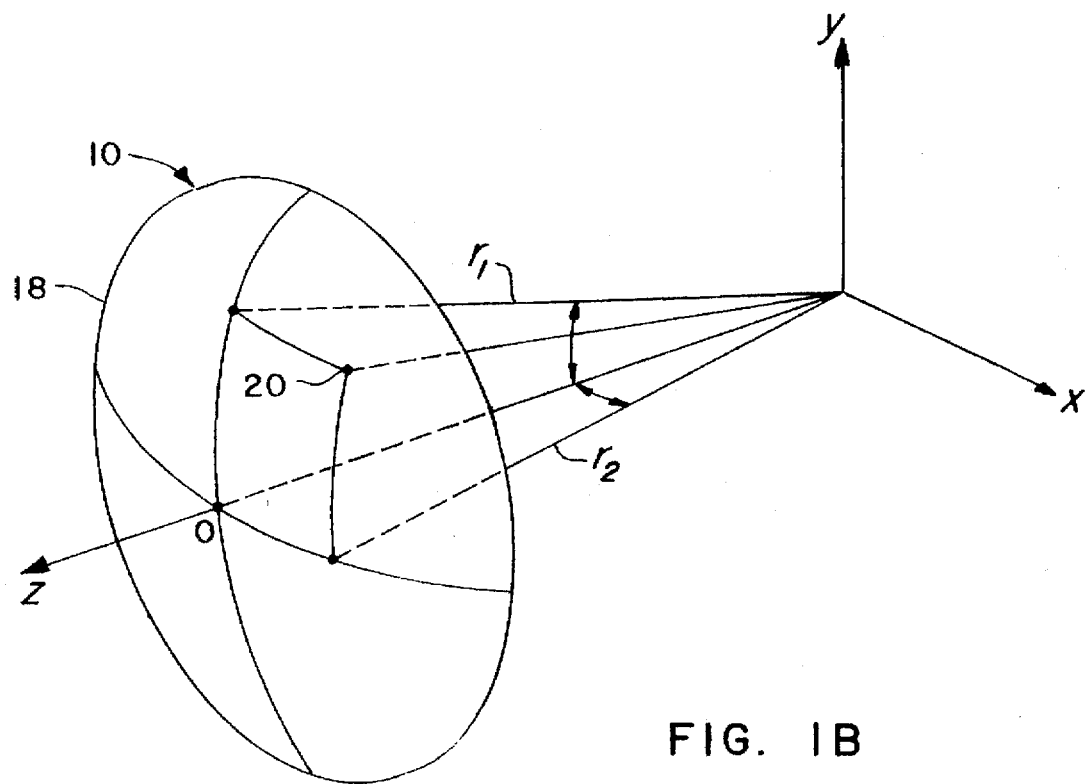

The mean power at any point on the surface 18 is defined by the general expression:

$$P_m = (½)(n-1)(1/r_1 + 1/r_2)$$

wherein $r_1$ and $r_2$ are the radii of surface curvature in the principal meridians (FIG. 1B) and n is the index of refraction. Therefore, the mean power is directly related to the curvature functions which can be used to completely describe a lens surface. More particularly, the functions of mean power are parallel to selected directions of gaze and correspond to a unique eighth order polynomial of the form:

$$P = b_1 + b_2 X + b_3 X^2 + \ldots b_9 X^8$$

wherein $b_1$ through $b_9$ are non-zero coefficients and X is the ordinate value of the coordinate axis, as shown in FIG. 1B.

In a preferred embodiment, each power curve for each cross-section of the lens surface parallel to the eye path along the corridor is a statistically smoothed eighth order polynomial which has been optimized by polynomial regression. Thus, for convergence eye movements, the eye will always follow a path along which the rate of change of mean power is gradual enough to facilitate the appearance of an integrated visual field free of obvious boundaries. Similarly, lateral eye movements will follow along mean power curves which have been statistically smoothed. The directions involved in convergence eye movements and lateral gaze movements have been selected for polynomial regression because they are fundamental to optimal performance of the subject invention.

EXAMPLE 1

Figure 4A:
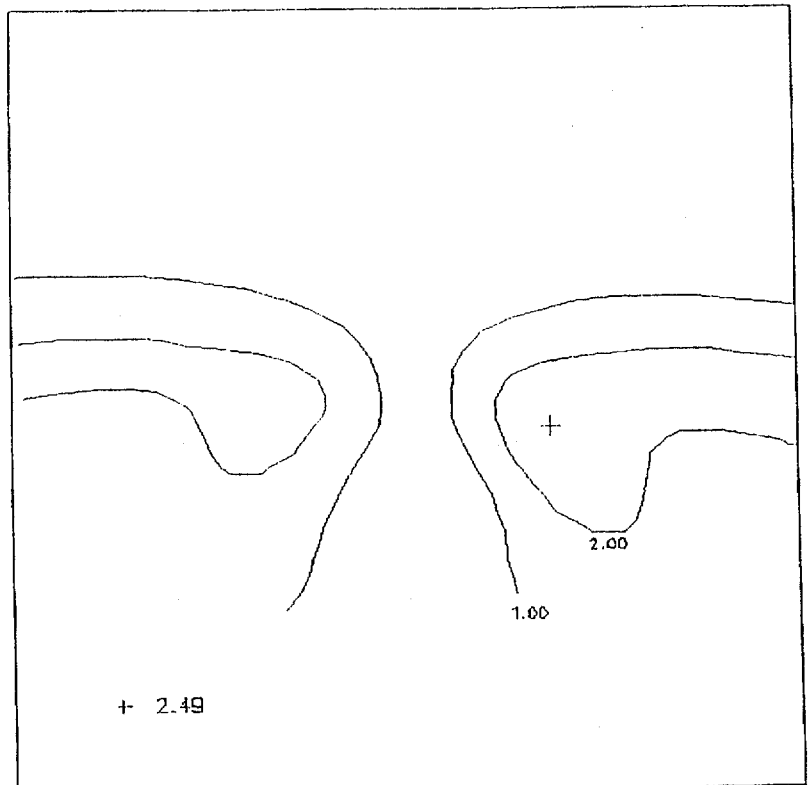
FIGS. 4A, 4B, 4C and 4D depict, respectively, contours of constant surface astigmatism, contours of constant mean surface power, an isometric plot of surface astigmatism, and an isometric plot of surface mean power of a progressive power ophthalmic lens in accordance with the present invention having a 2.00 diopter progression.
Figure 4B:
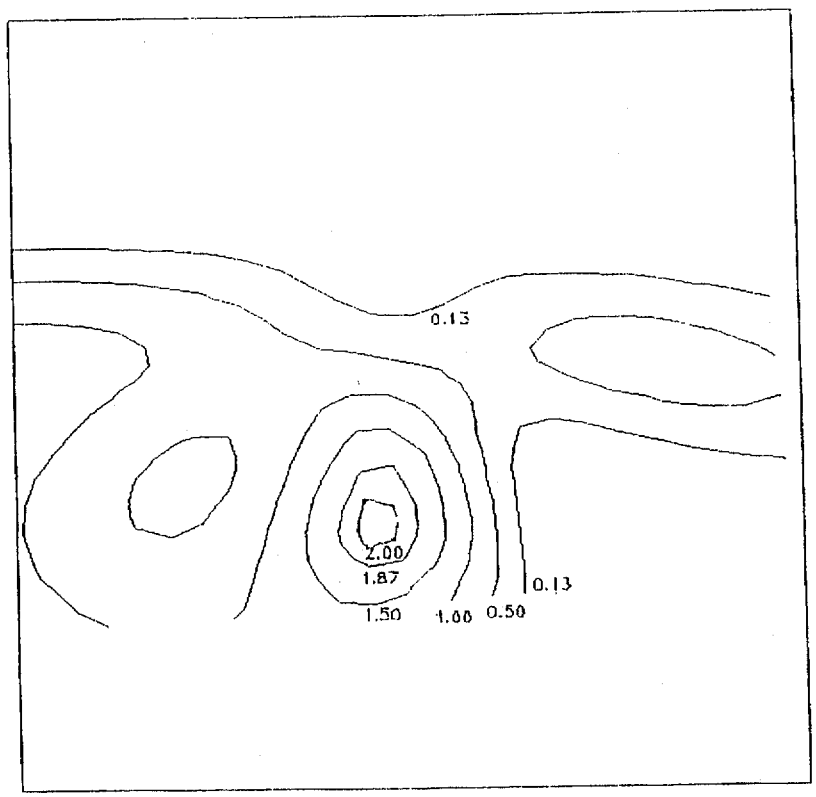
Figure 4C:
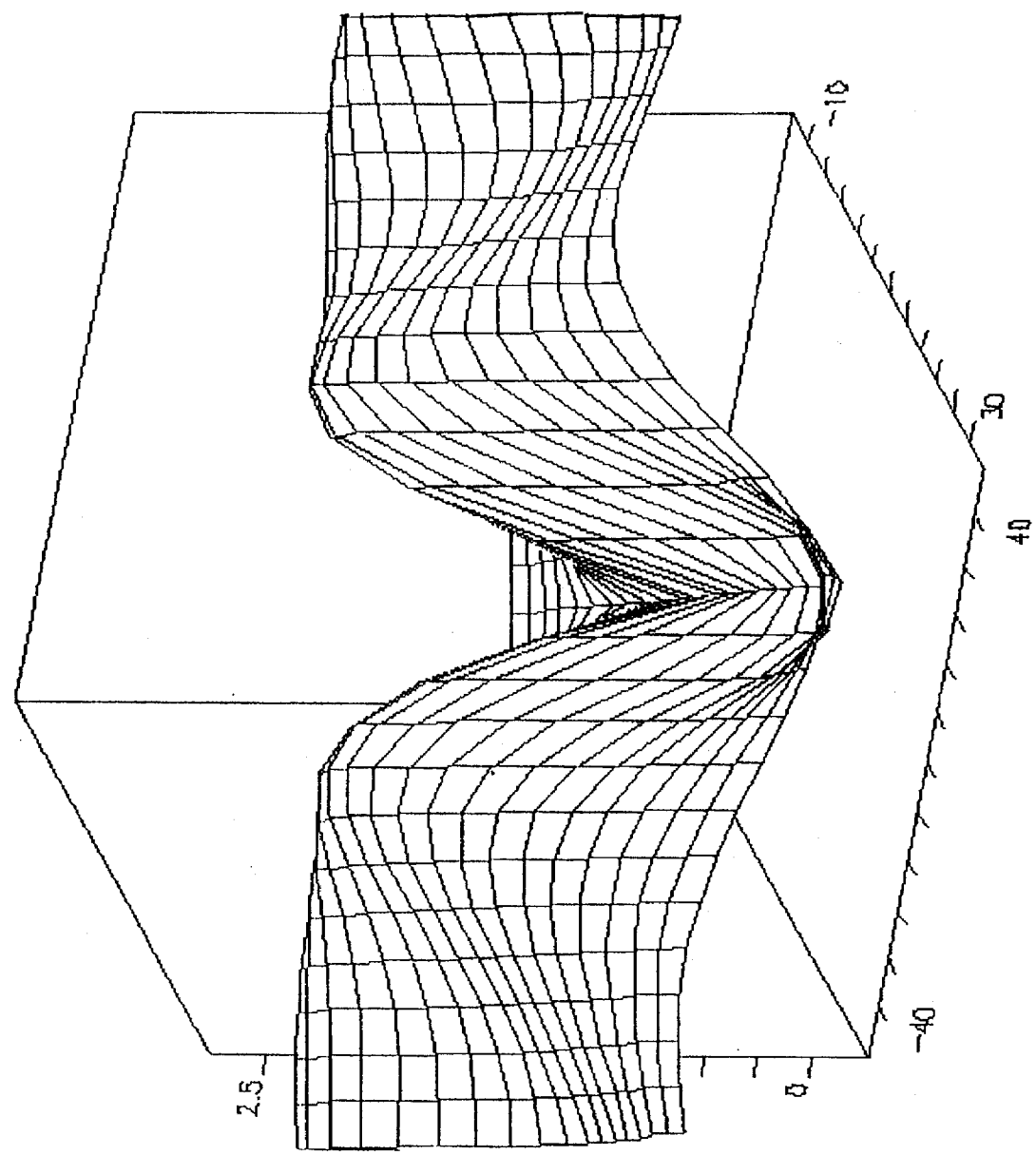
Figure 4D:
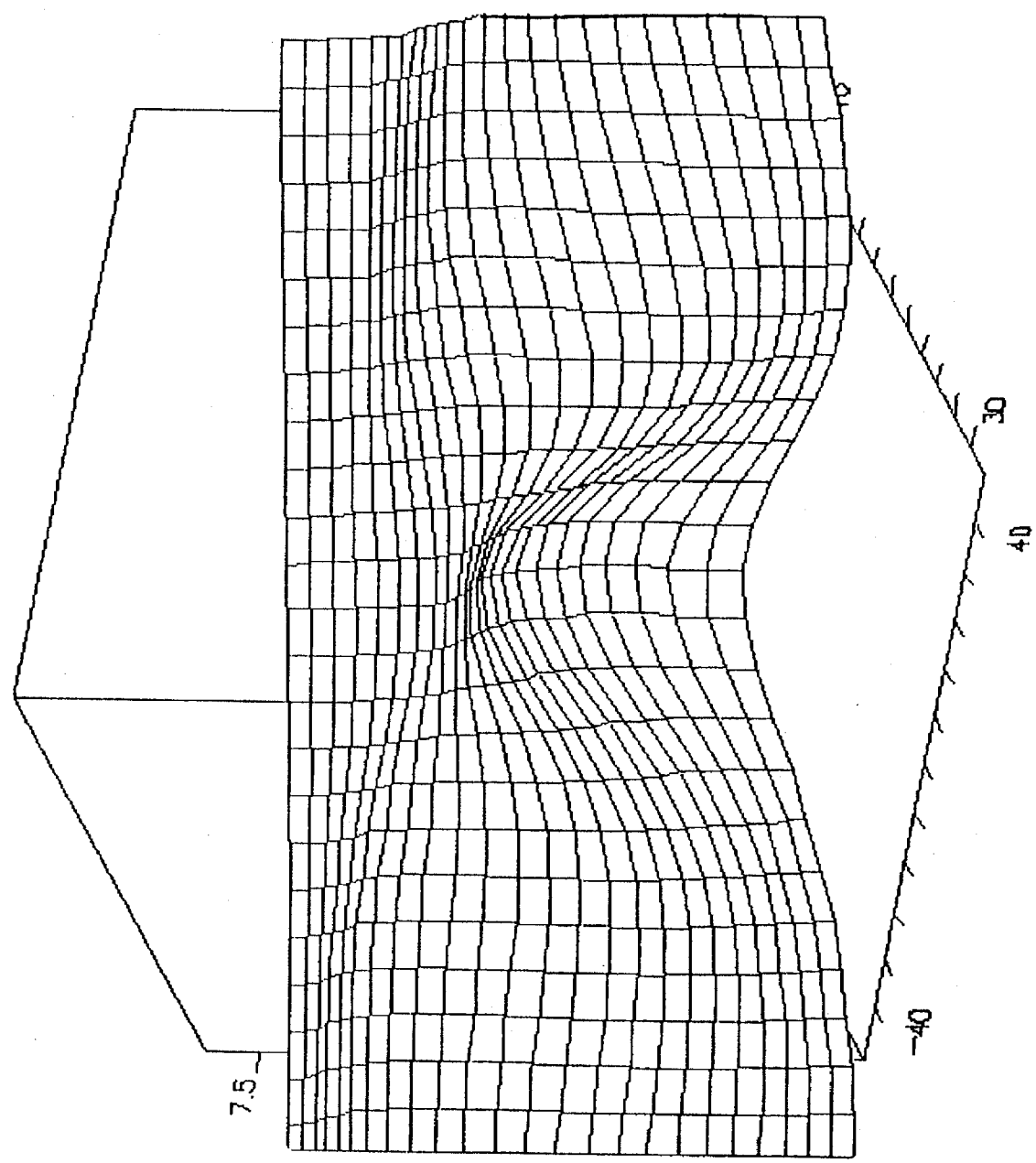
Figure 5A:
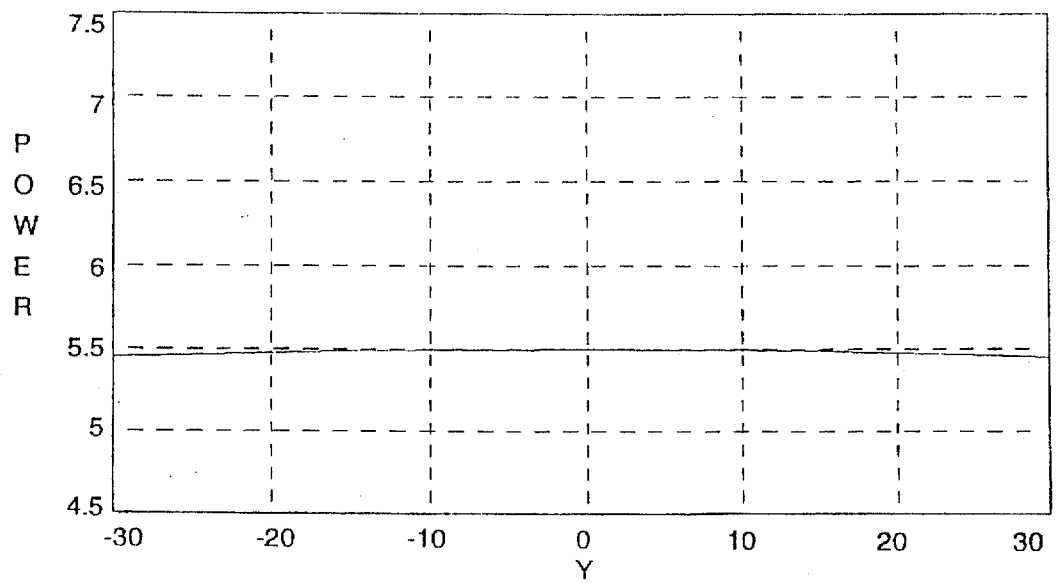
FIGS. 5A through 5H are graphs showing the horizontal cross-sections of mean power taken every 5 mm along the X-axis of the lens of FIG. 4.
Figure 5B:
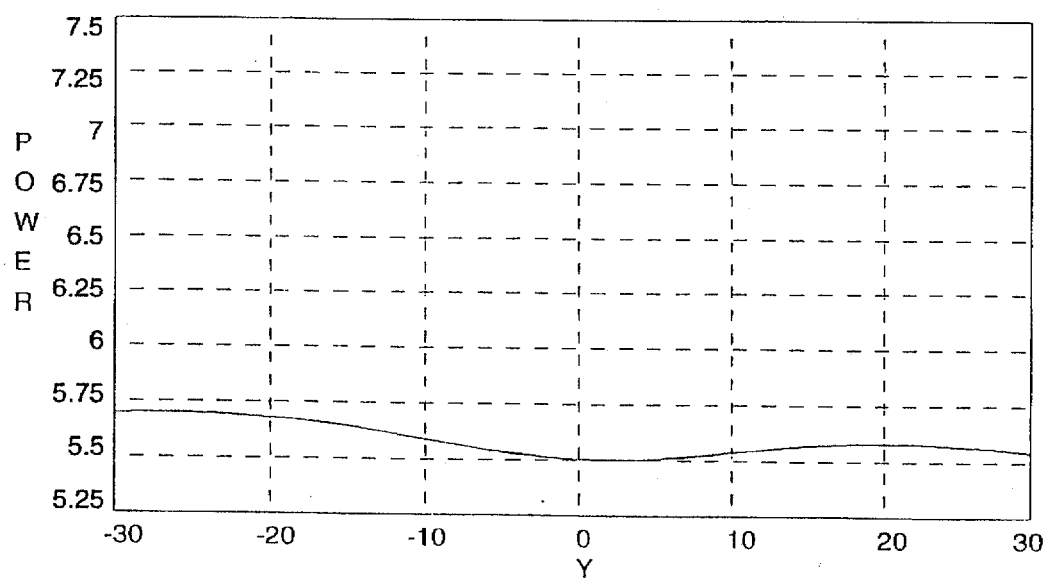
Figure 5C:
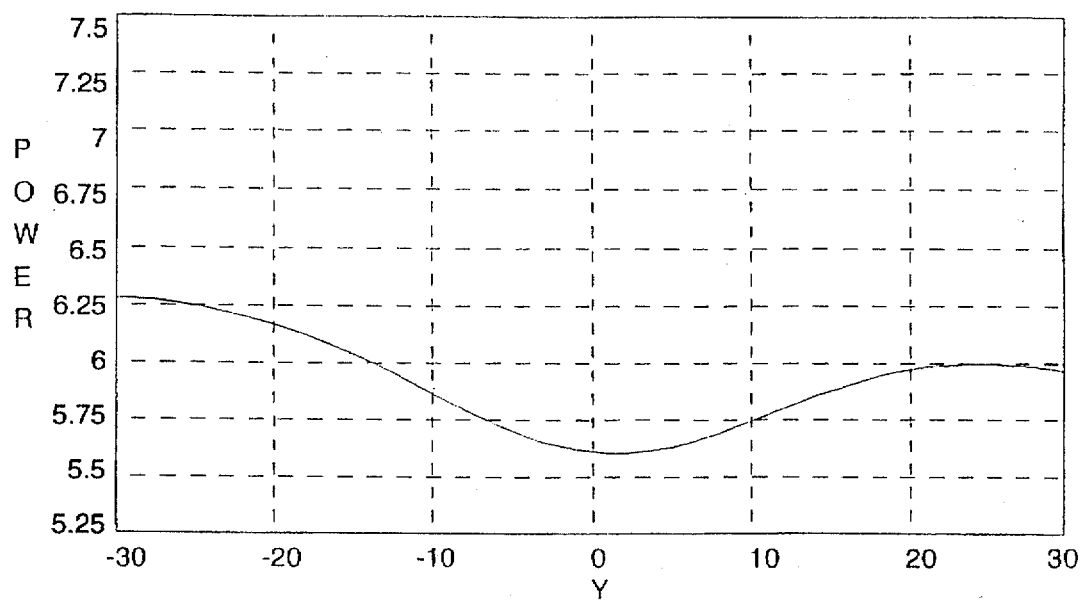
Figure 5D:
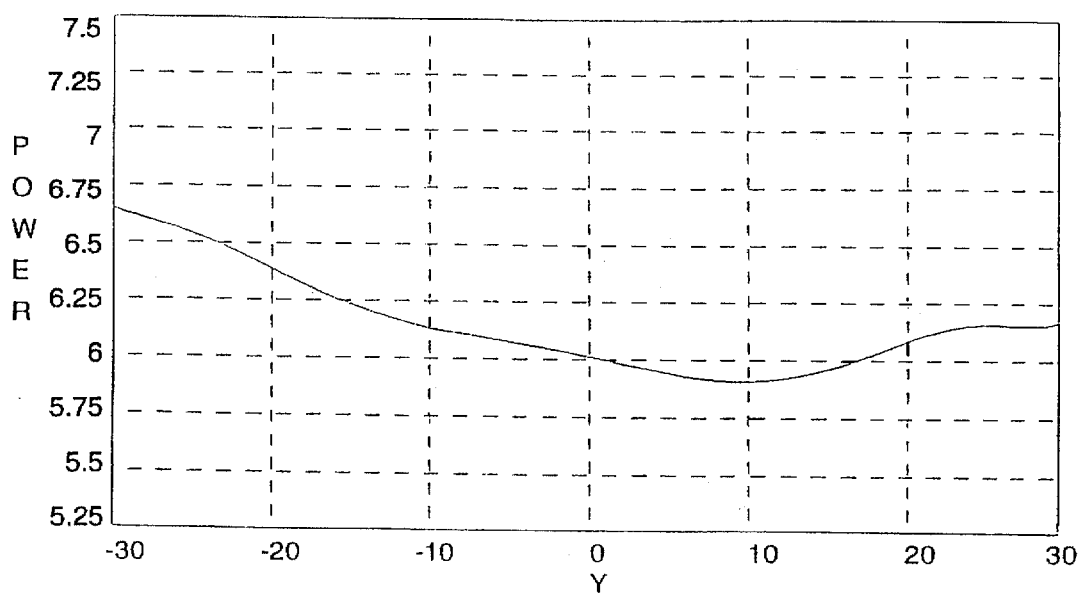
Figure 5E:
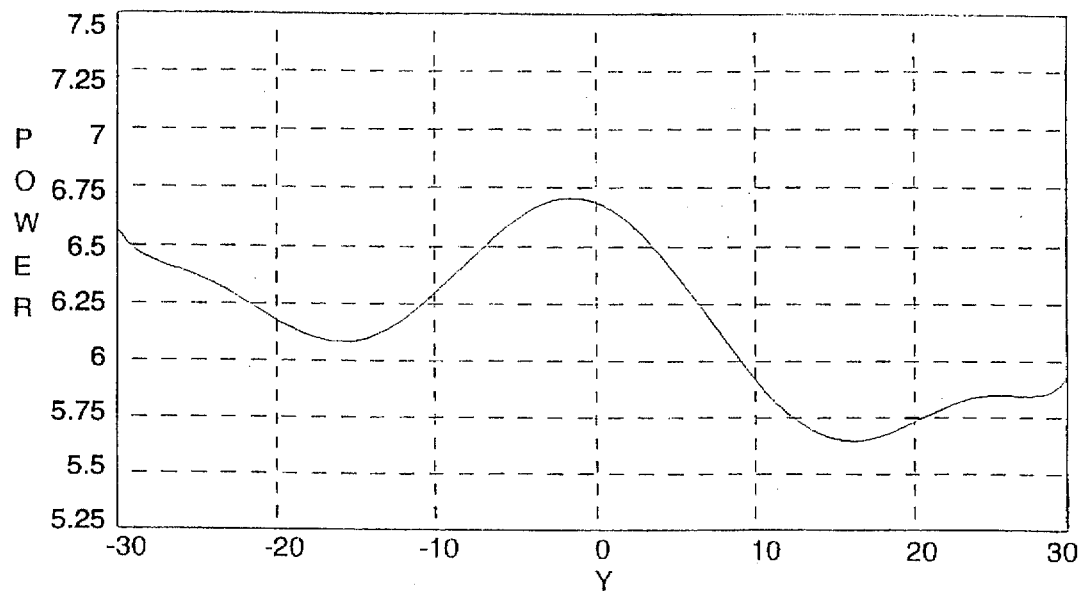
Figure 5F:
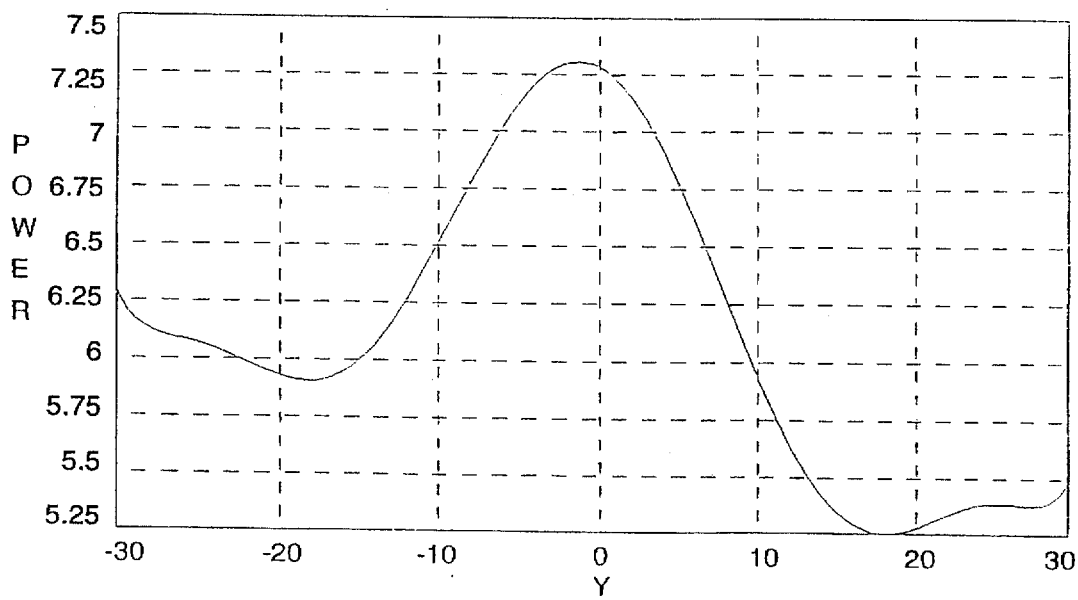
Figure 5G:
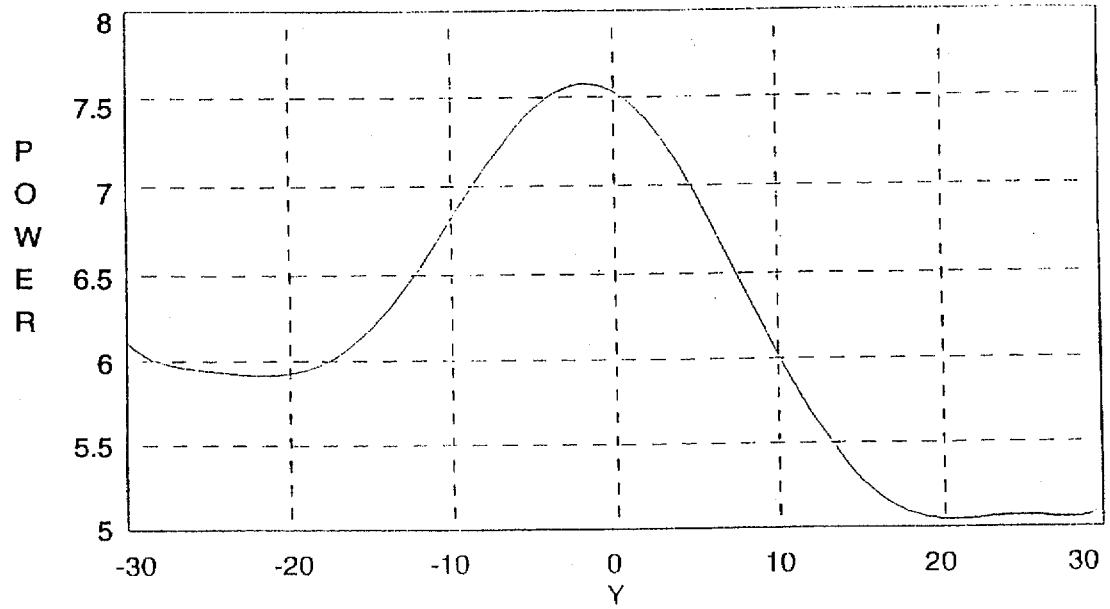
Figure 5H:
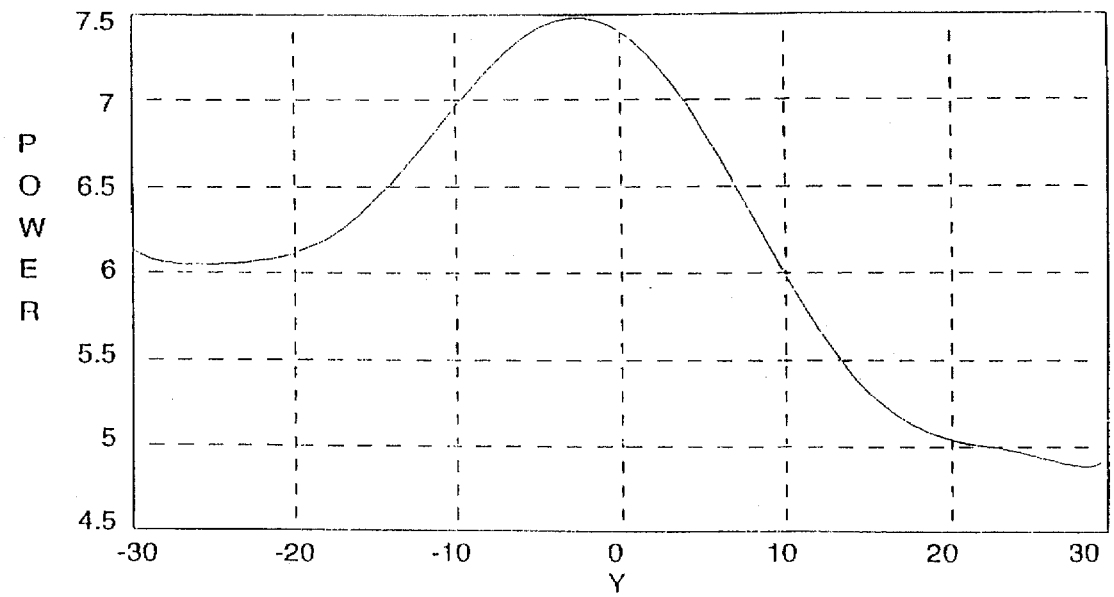
Figure 6A:
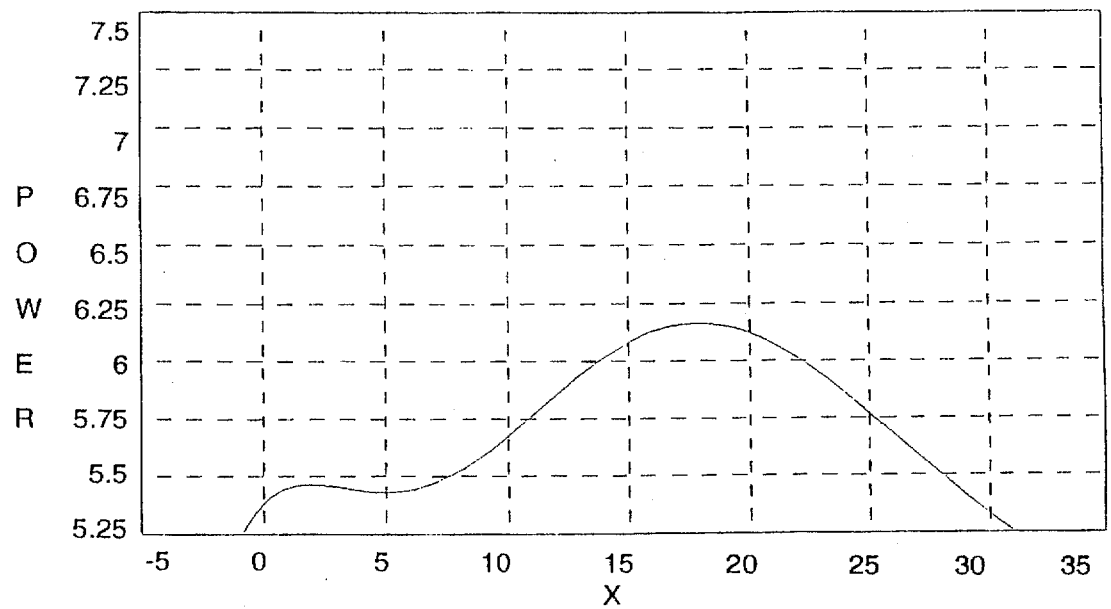
FIGS. 6A through 6M are graphs showing the mean power curves parallel to the eye path during convergence taken every 5 mm along the boundary between the distance and near portions of the lens of FIG. 4.
Figure 6B:
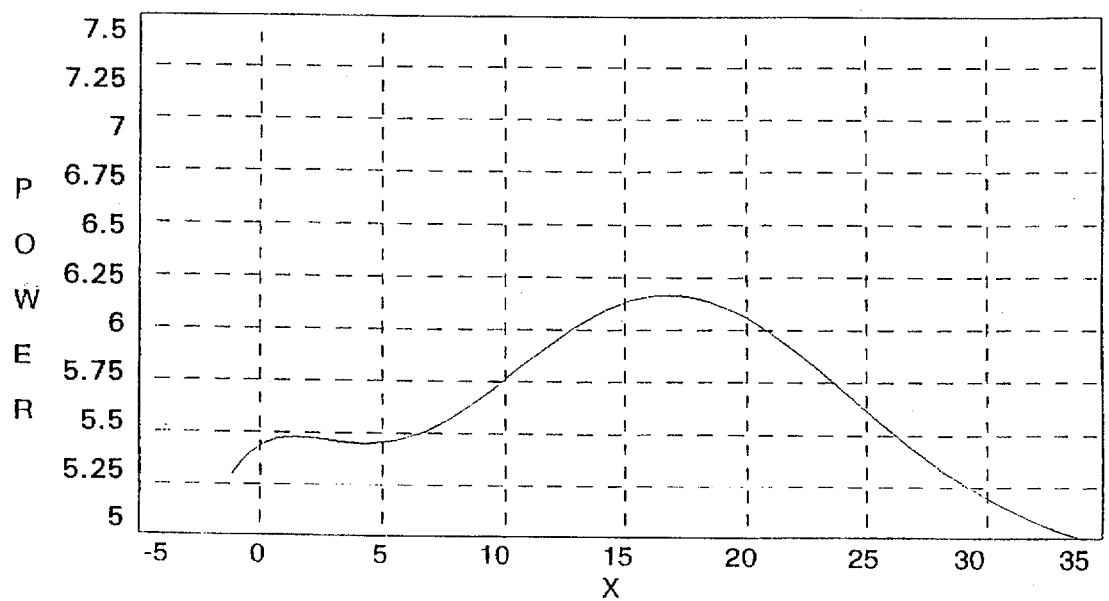
Figure 6C:
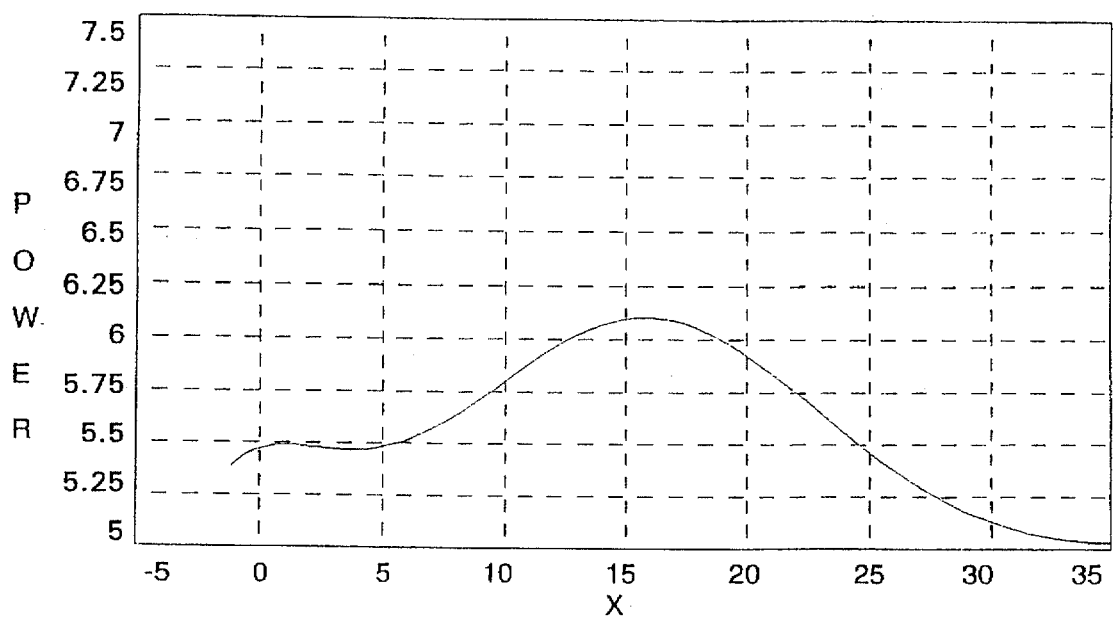
Figure 6D:
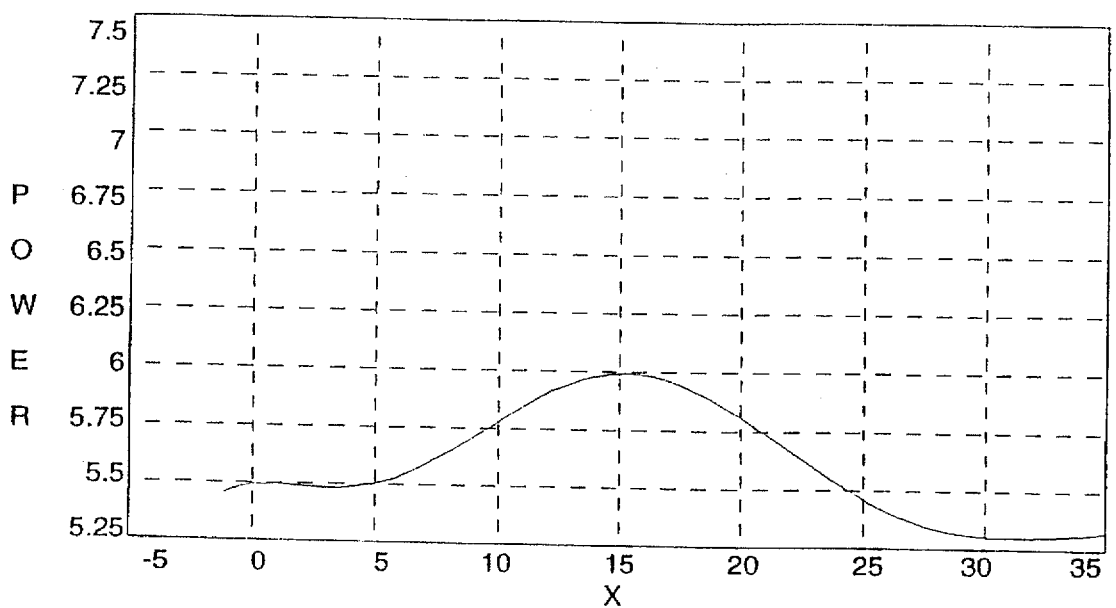
Figure 6E:
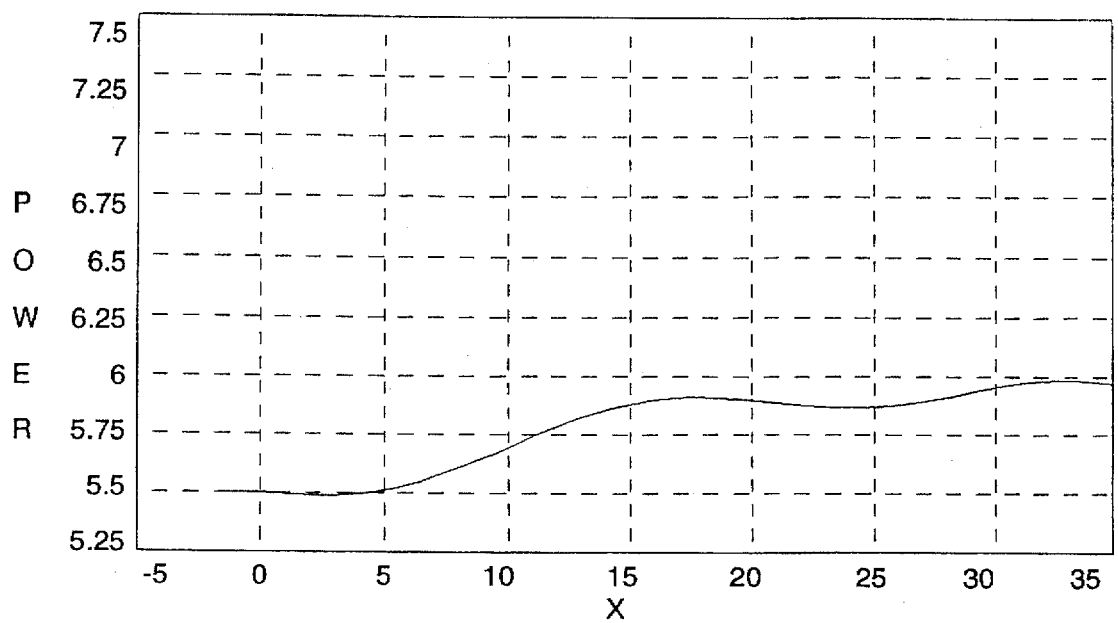
Figure 6F:
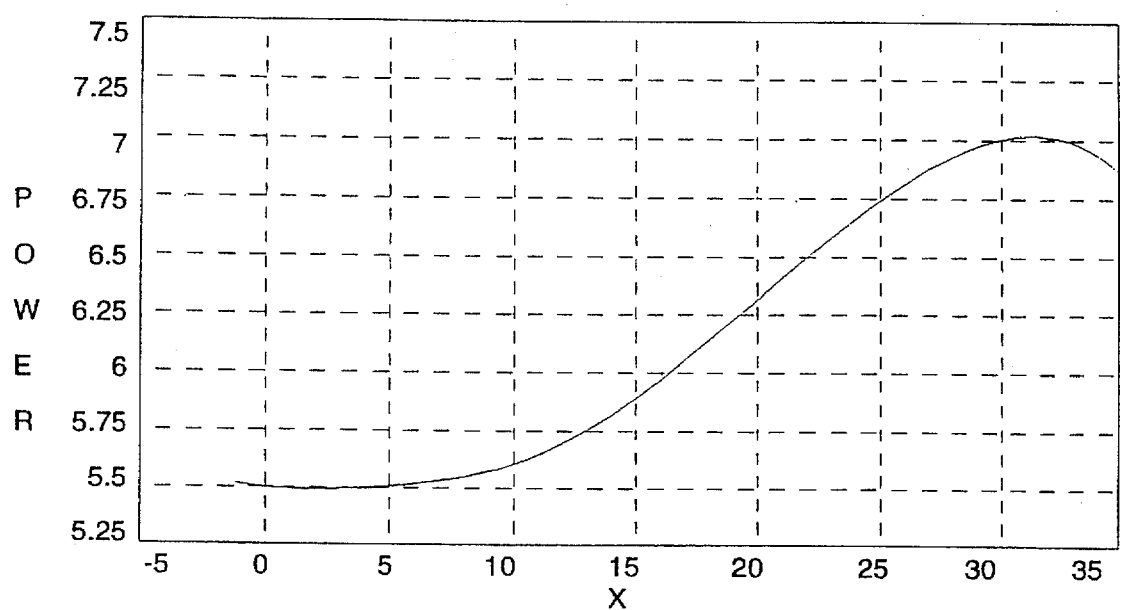
Figure 6G:
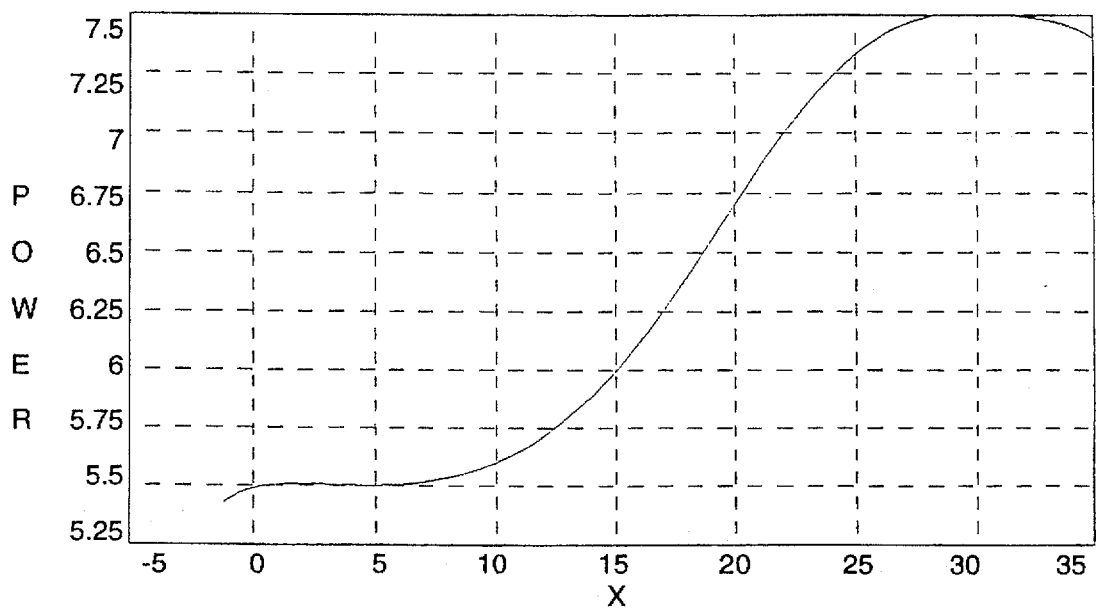
Figure 6H:
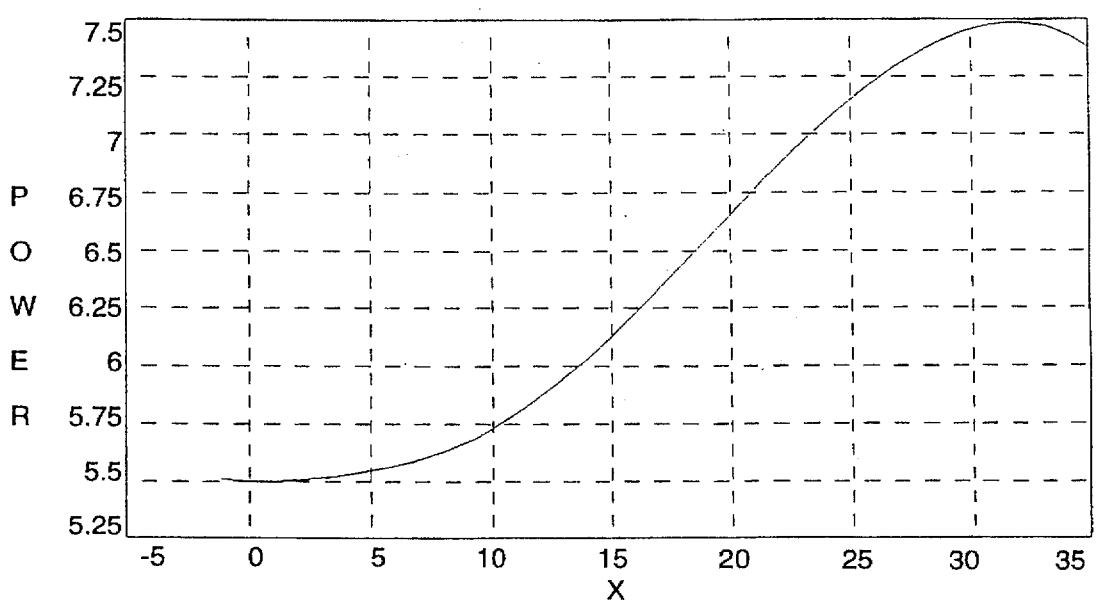
Figure 6I:
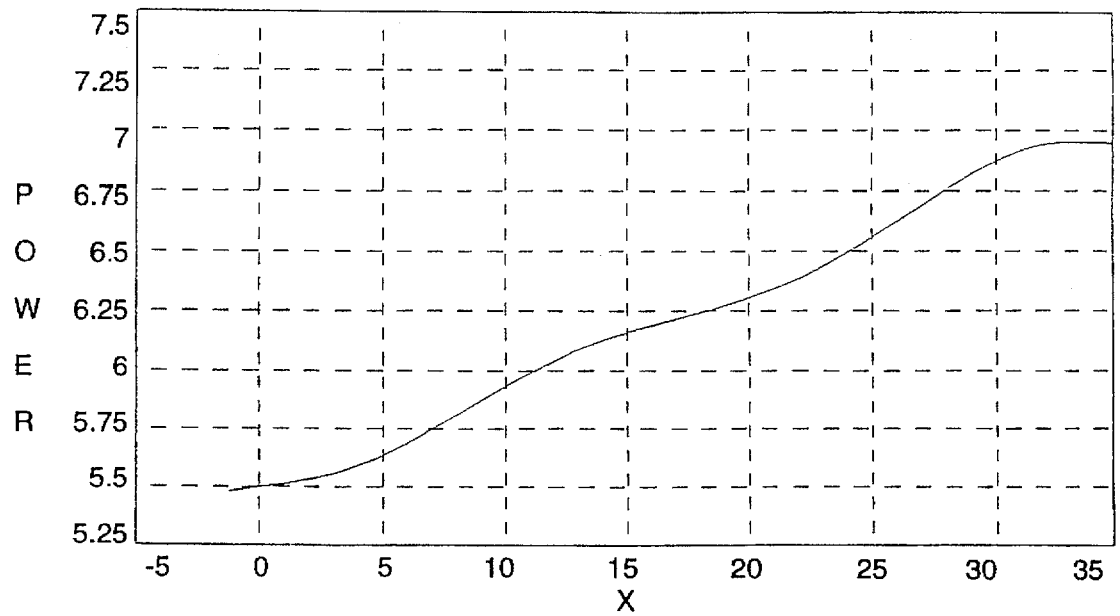
Figure 6J:
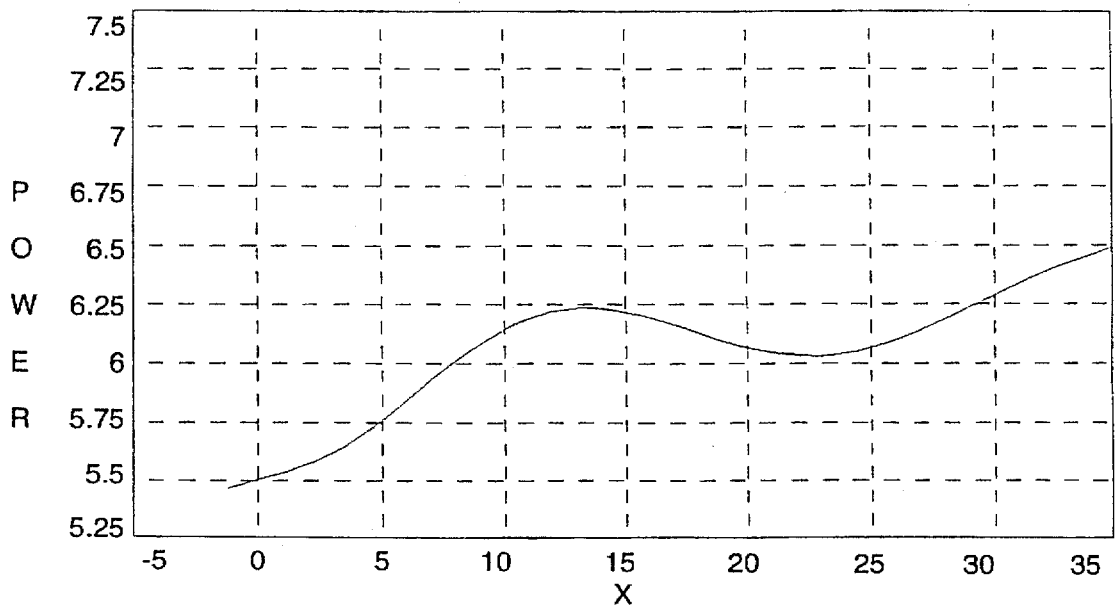
Figure 6K:
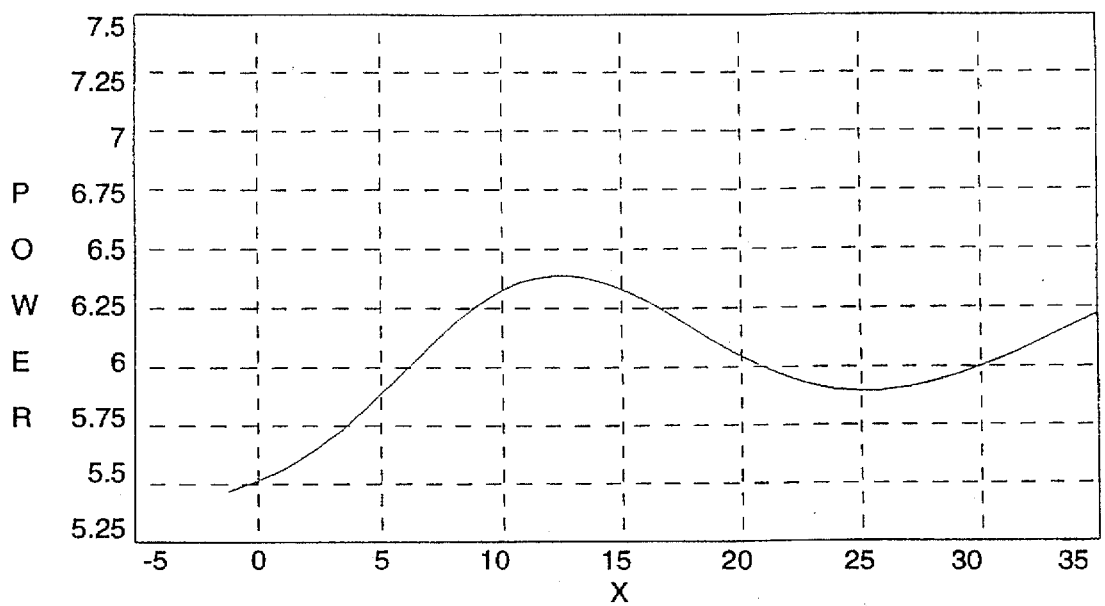
Figure 6L:
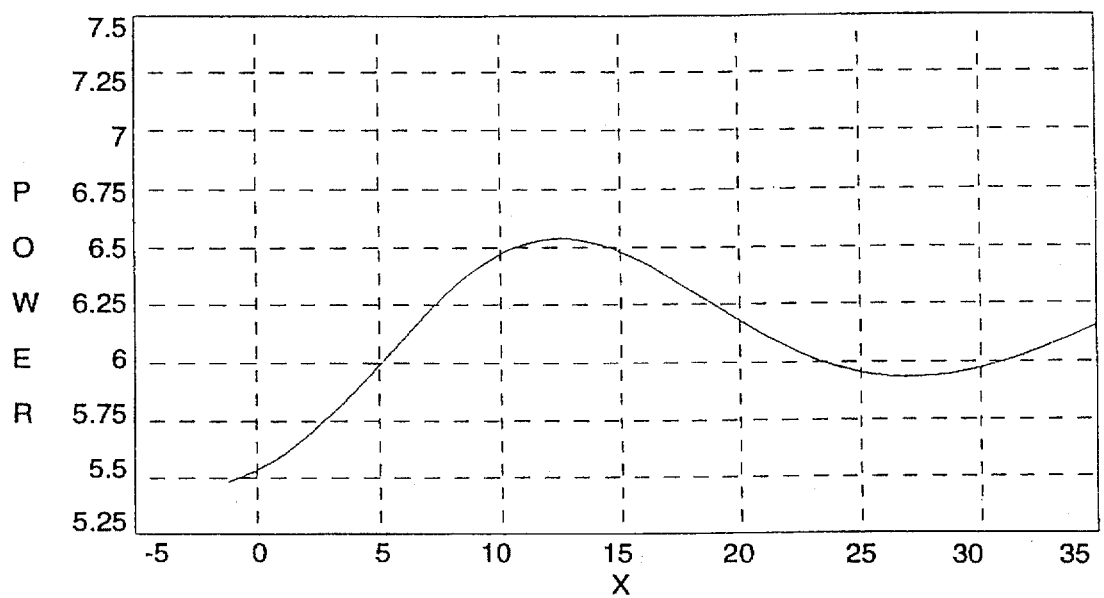
Figure 6M:
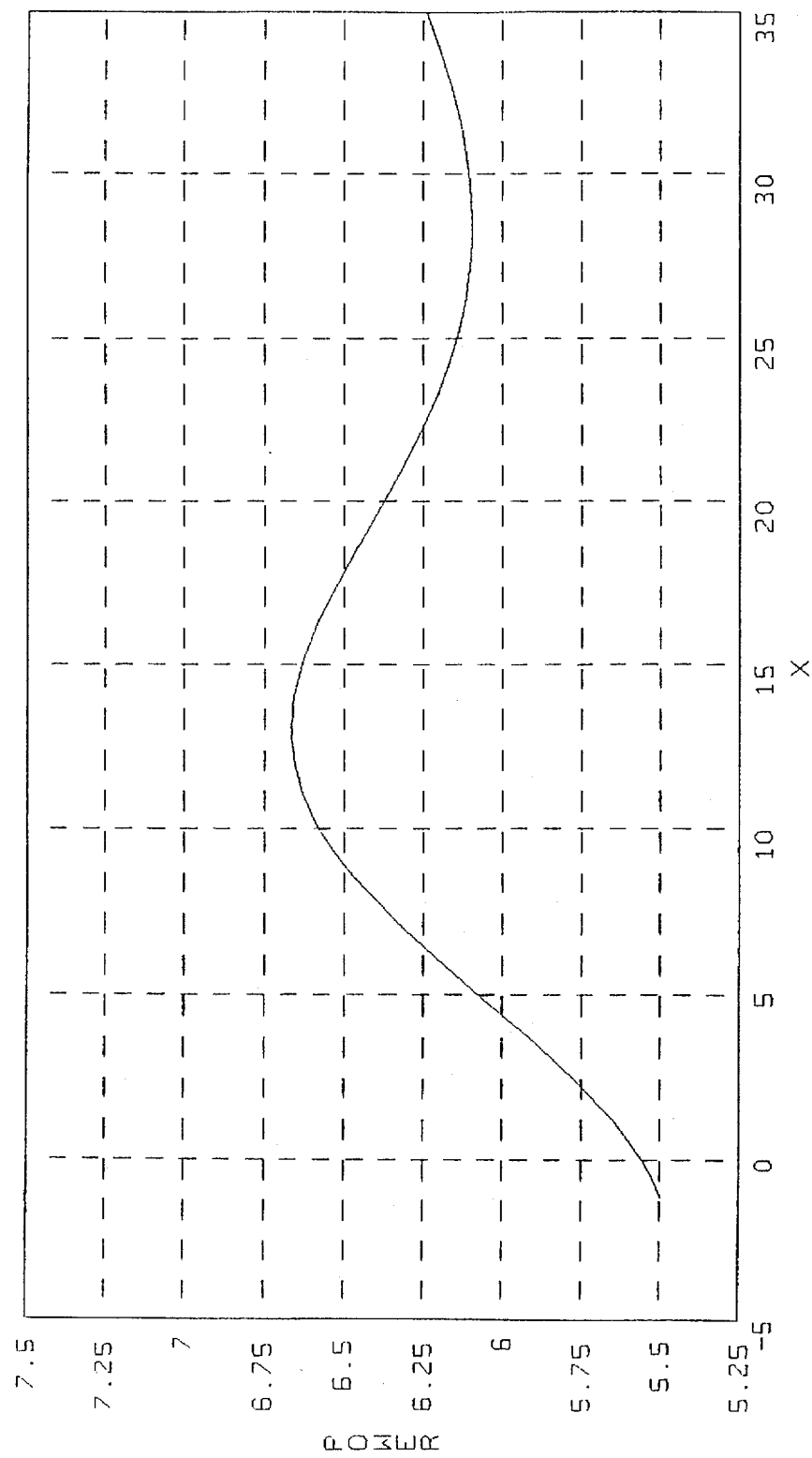

FIGS. 4A, 4B, 4C and 4D represent a lens in accordance with the present invention having a reading addition of 2.00 diopters. FIG. 4A gives the contours of constant surface astigmatism; FIG. 4B gives the contours of constant mean surface power; and FIGS. 4C and 4D provide three-dimensional views of the distribution of surface astigmatism and surface mean power. FIGS. 5A through 5H show horizontal cross-sections of mean power every 5 mm down the lens starting at the top of the progressive zone. The asymmetry becomes more evident as one looks farther down the progressive zone. As the eyes move in lateral gaze, they move parallel to changes in mean power which are gradual. It is also evident that the disparity in mean power between the two eyes is small. FIGS. 6A through 6G profile the mean power curves parallel to the eye path during convergence.

Figure 7:
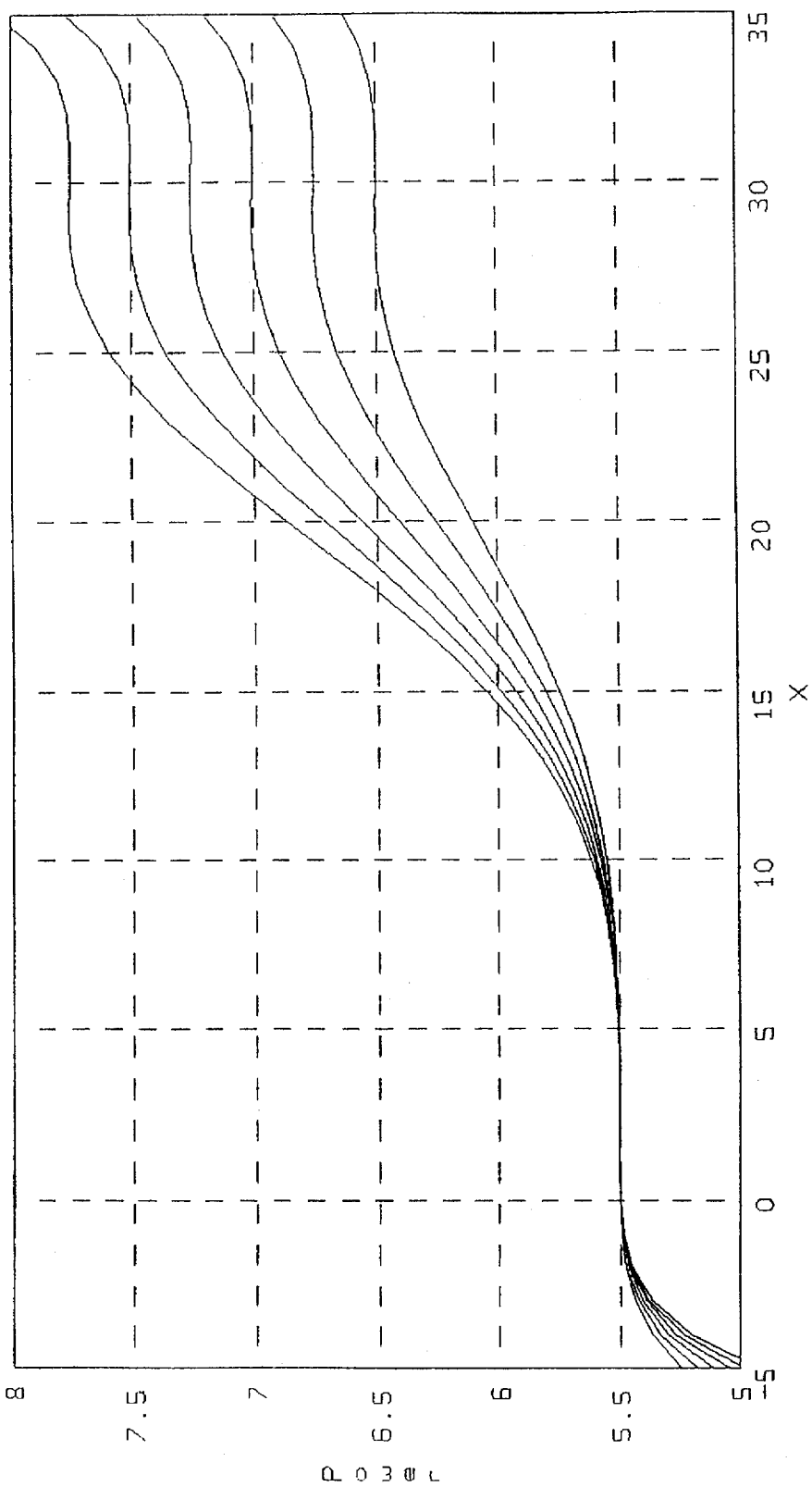
FIG. 7 is a graph showing the meridional power curves from 0 to 35 mm along the main corridor for a family of progressive power ophthalmic lenses in accordance with the present invention.
Figure 8A:
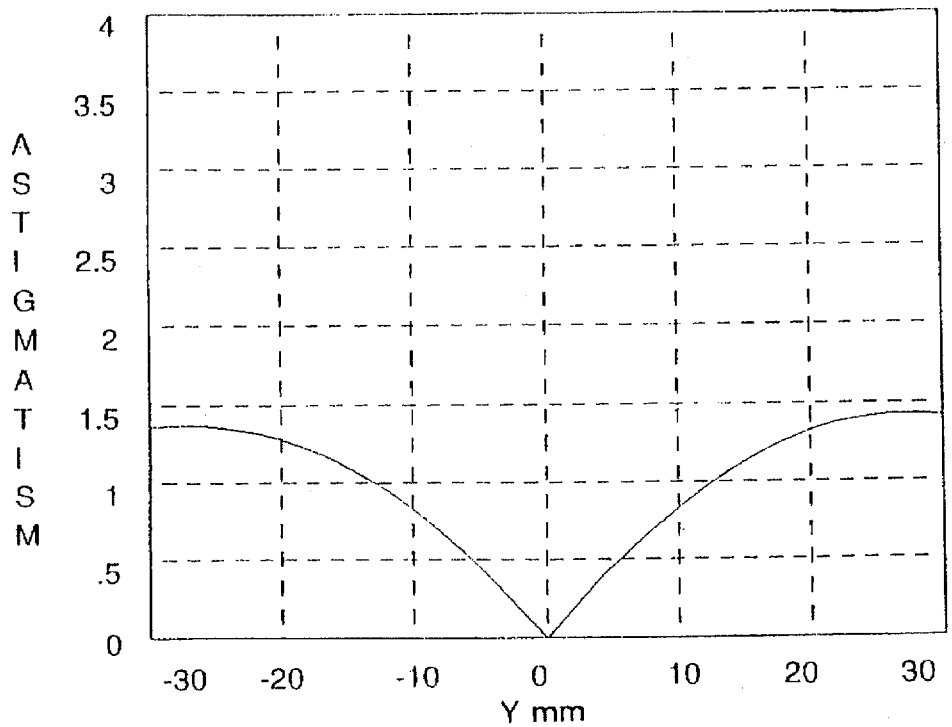
FIGS. 8A through 8C are graphs showing the astigmatism profiles of horizontal sections at 10, 20, and 30 mm into the progressive zone of the lens of FIG. 4.
Figure 8B:
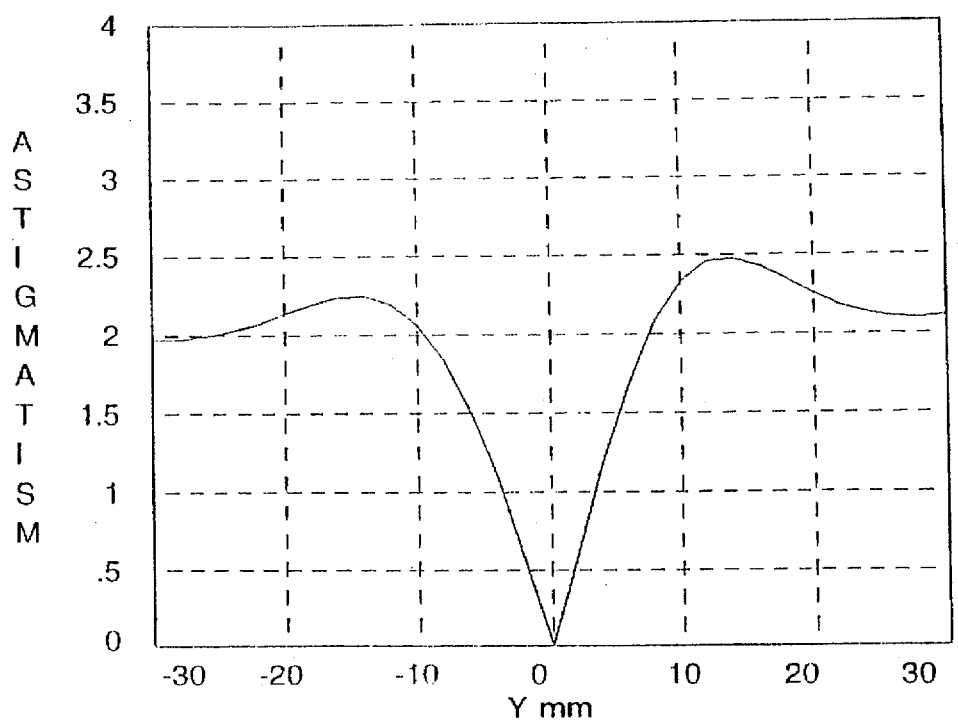
Figure 8C:
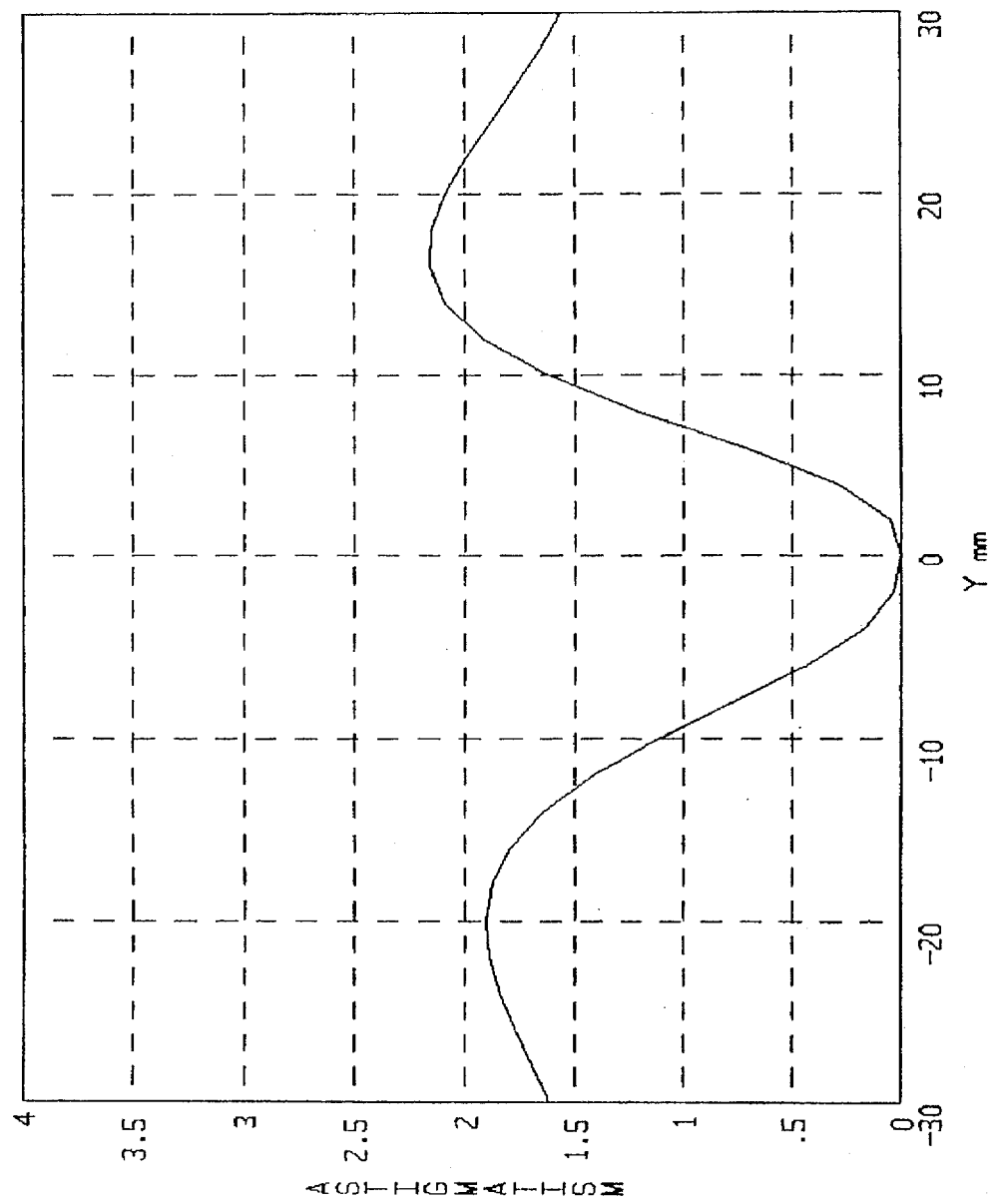

These also exhibit smooth gradual undulations in mean power to facilitate easy adaptation and a visual field with no distinct boundaries. FIG. 7 displays the meridional power curves from 0 to 32 mm along the main corridor for a family of progressive lenses of differing addition power but similar characteristics. The levels of astigmatism also remain moderate, below 2.50 diopters, as seen in FIGS. 8A through 8C which show the astigmatism profiles of horizontal sections at 10, 20 and 30 mm into the progressive zone. Binocular imbalance in terms of astigmatic differences between the two eyes is also small.

EXAMPLE 2

Figure 9A:
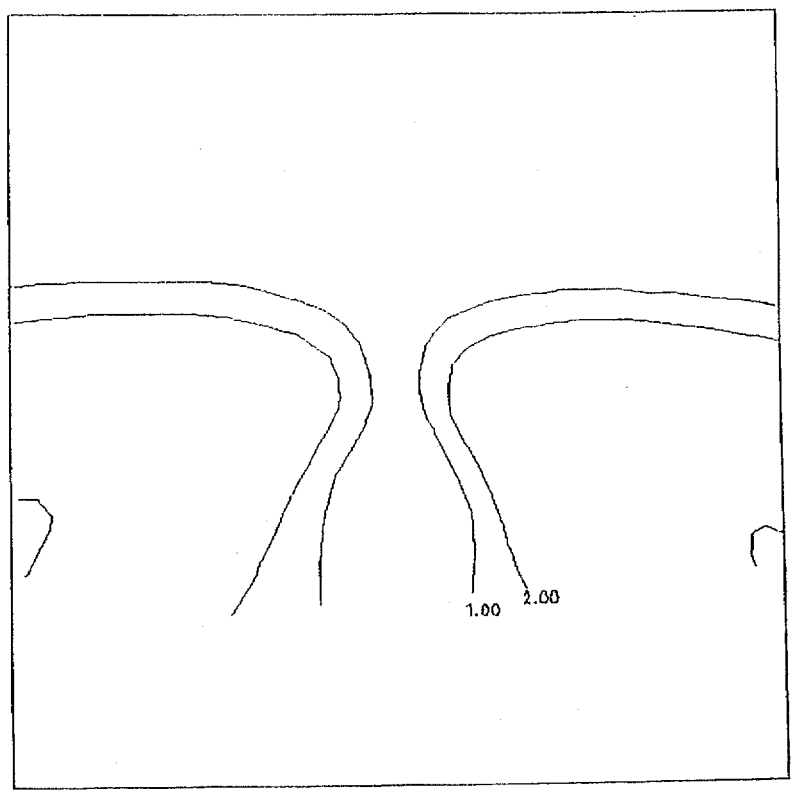
FIGS. 9A, 9B, 9C and 9D depict, respectively, contours of constant surface astigmatism, contours of constant mean surface power, an isometric plot of surface astigmatism, and an isometric plot of surface mean power of a progressive power ophthalmic lens in accordance with the present invention having a 2.50 diopter progression.
Figure 9B:
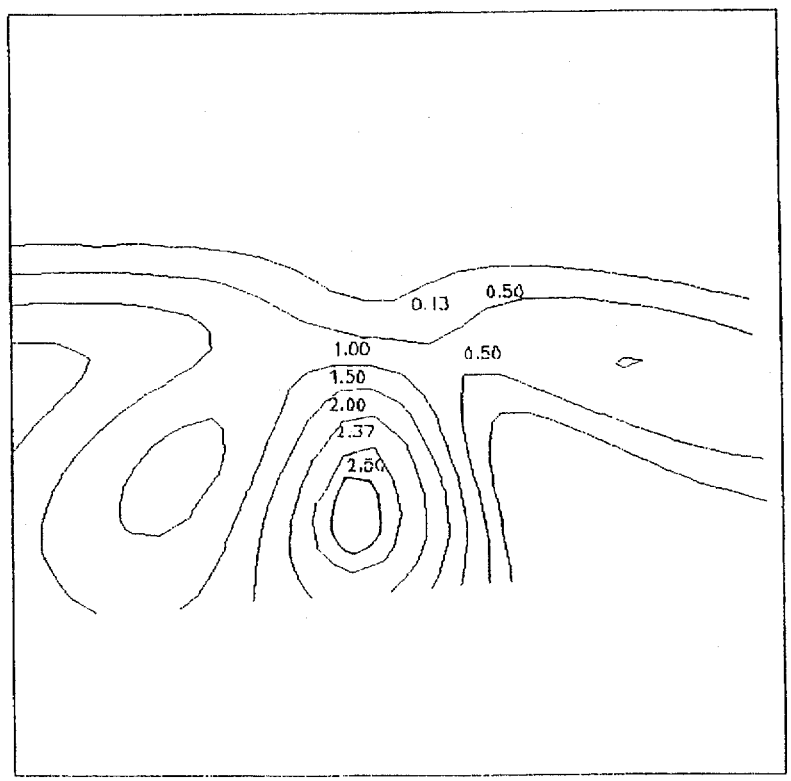
Figure 9C:
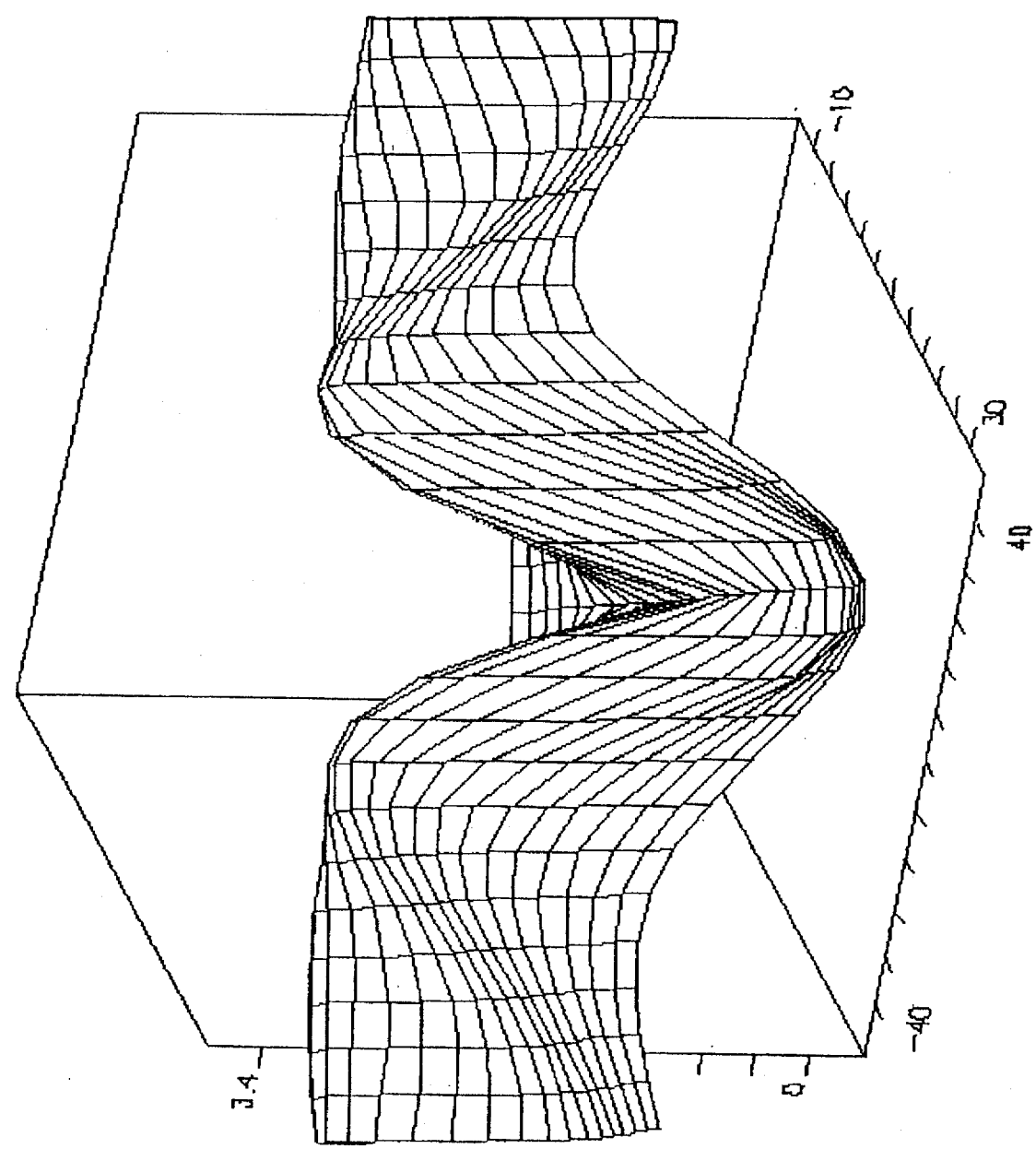
Figure 9D:
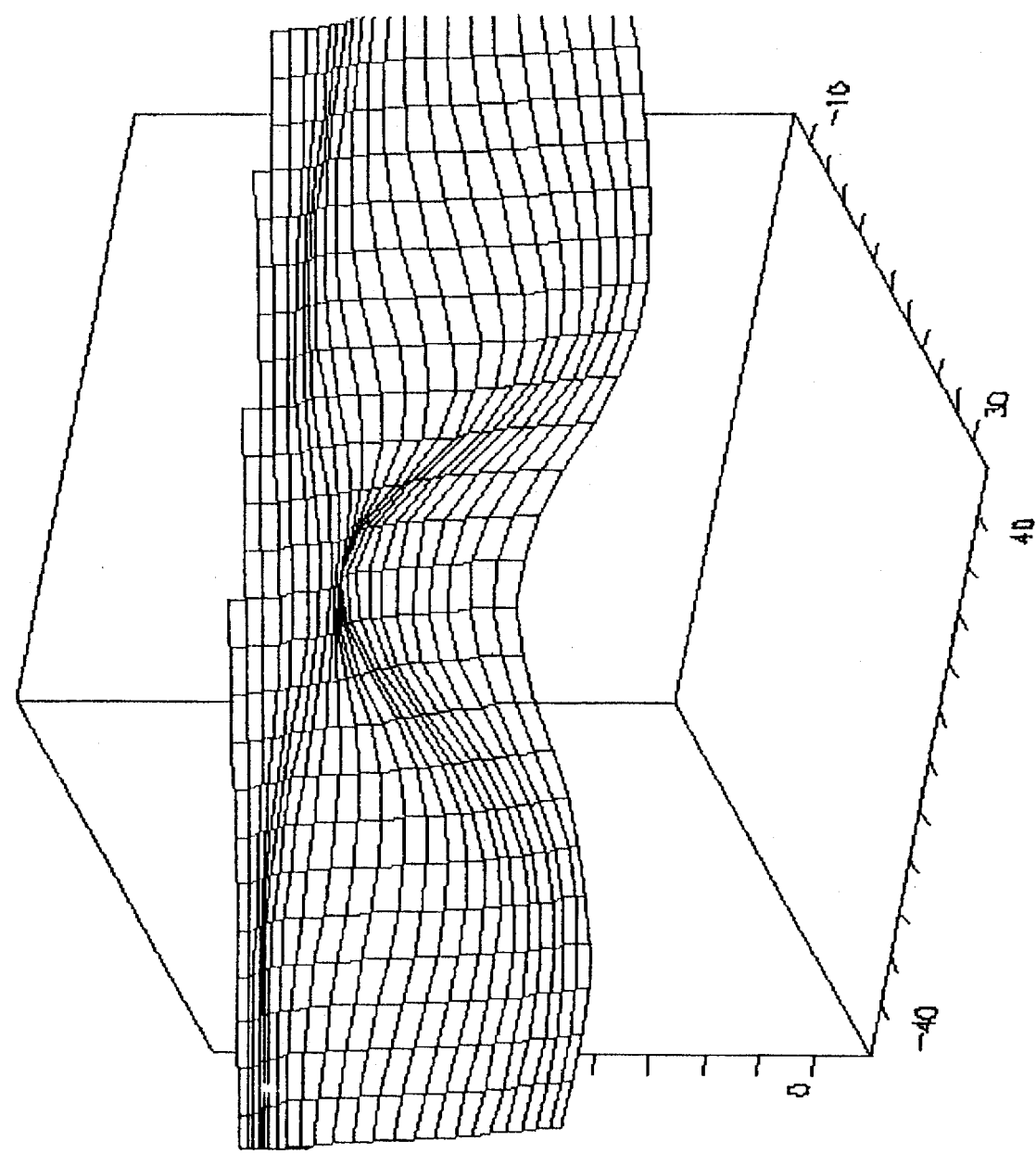
Figure 10A:
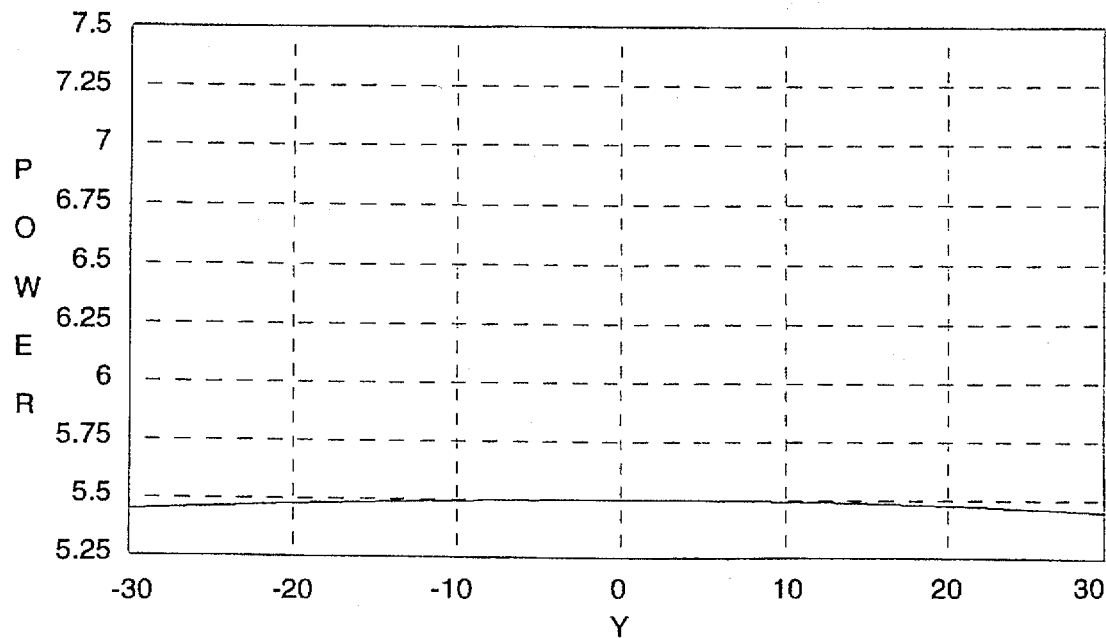
FIGS. 10A through 10H are graphs showing the horizontal cross-sections of mean power taken every 5 mm along the X-axis of the lens of FIG. 9.
Figure 10B:
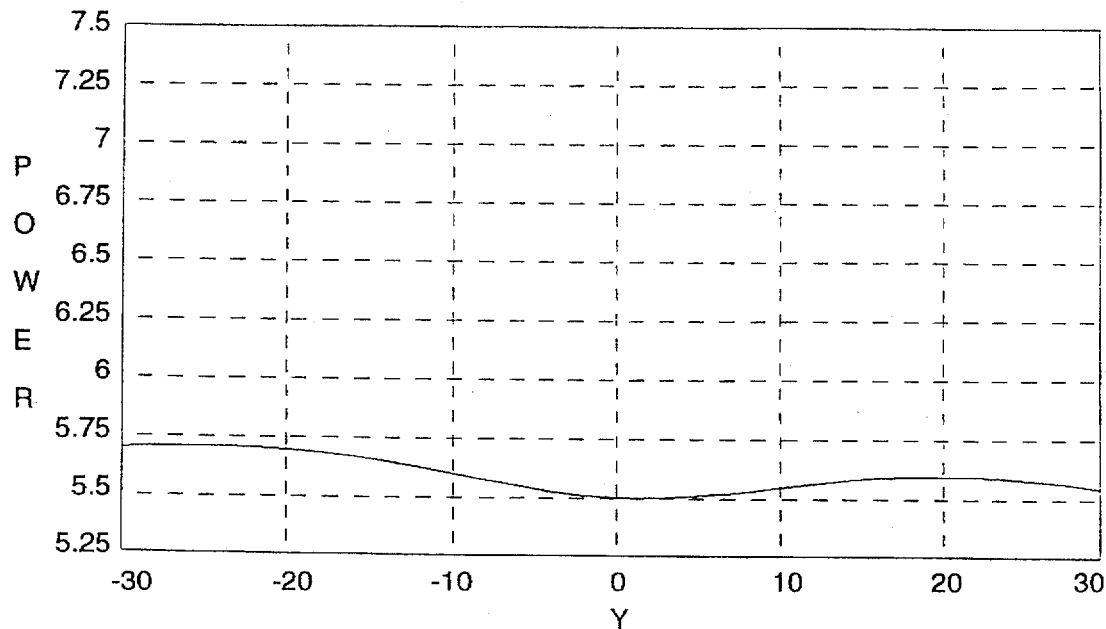
Figure 10C:
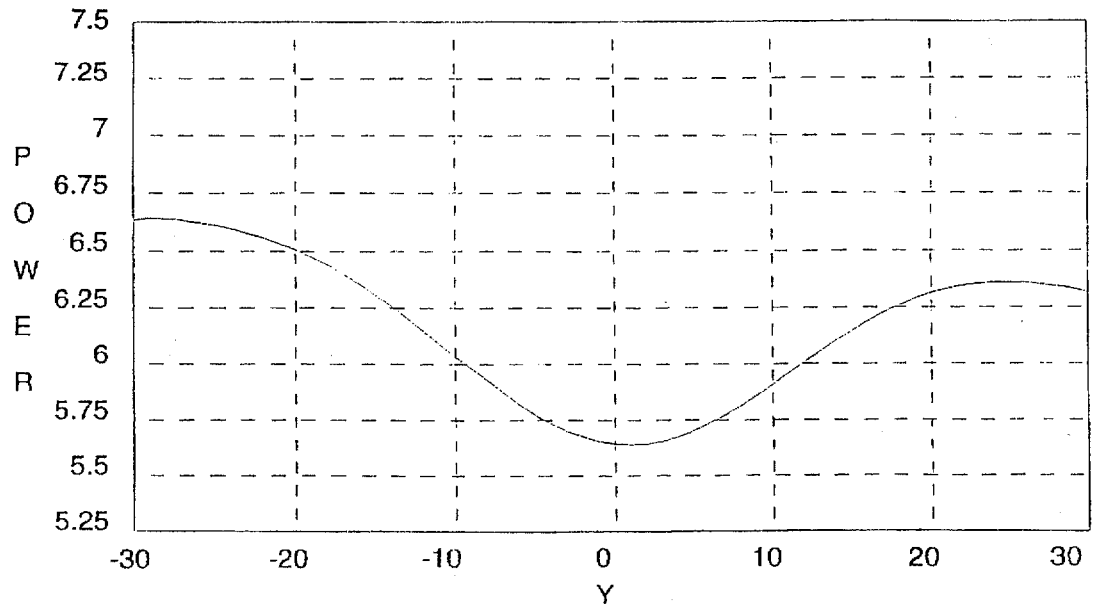
Figure 10D:
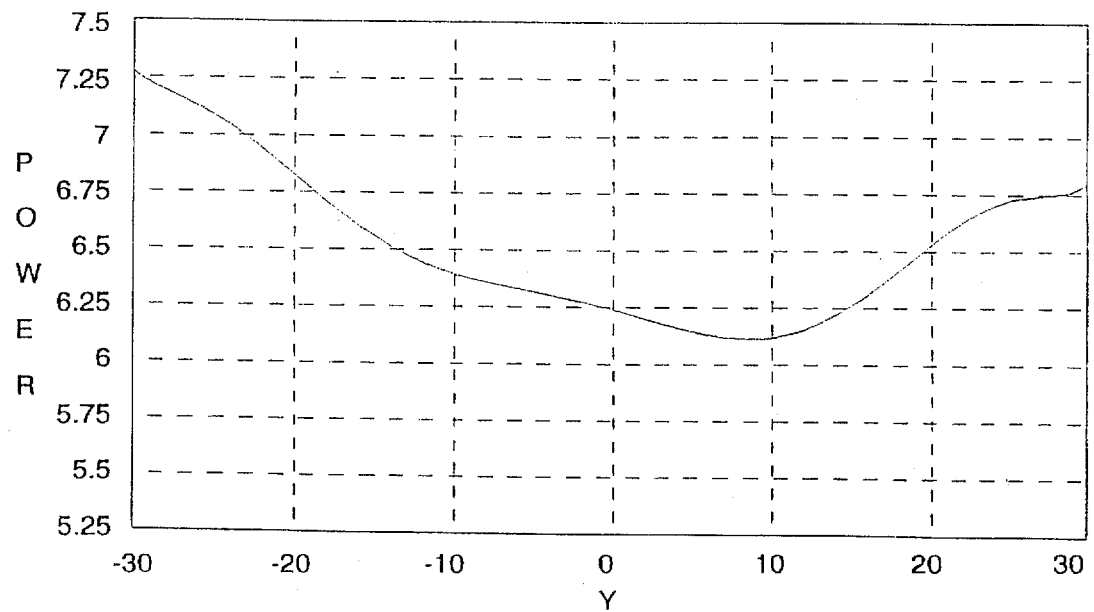
Figure 10E:
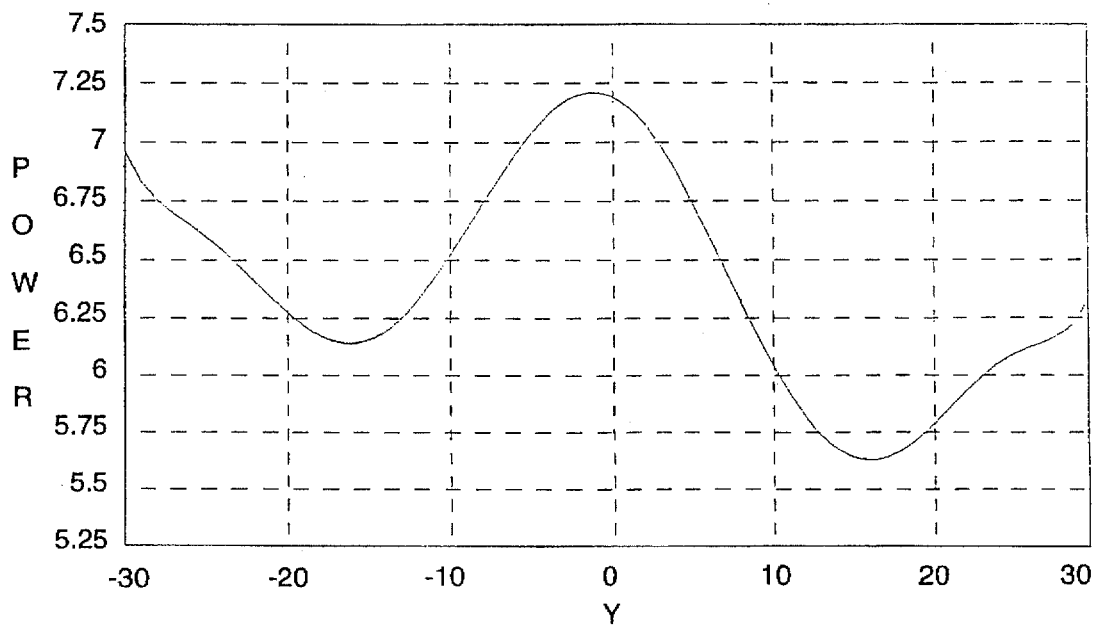
Figure 10F:
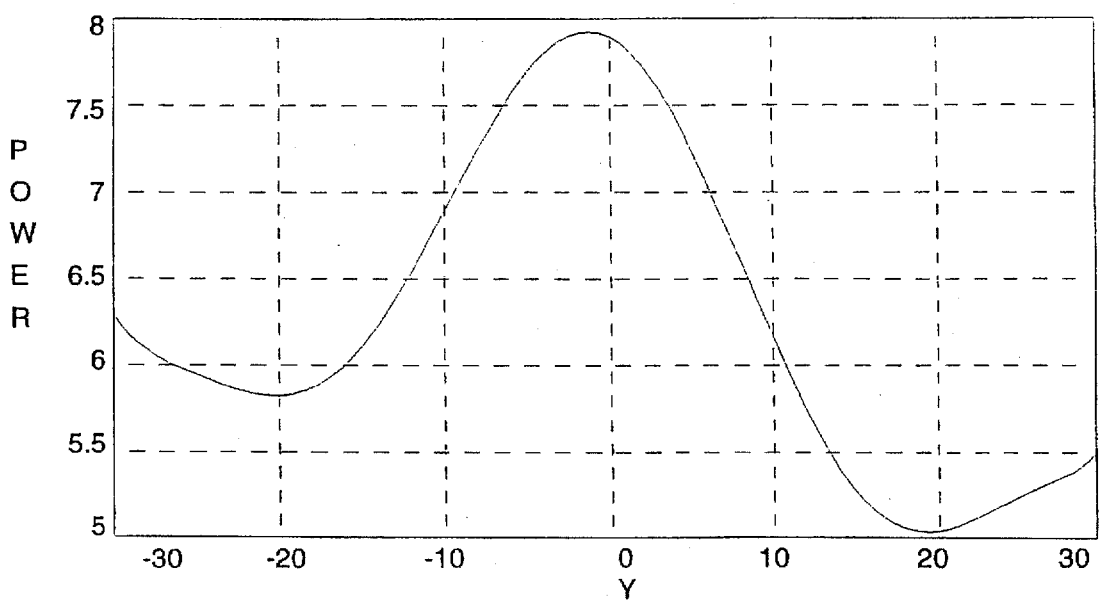
Figure 10G:
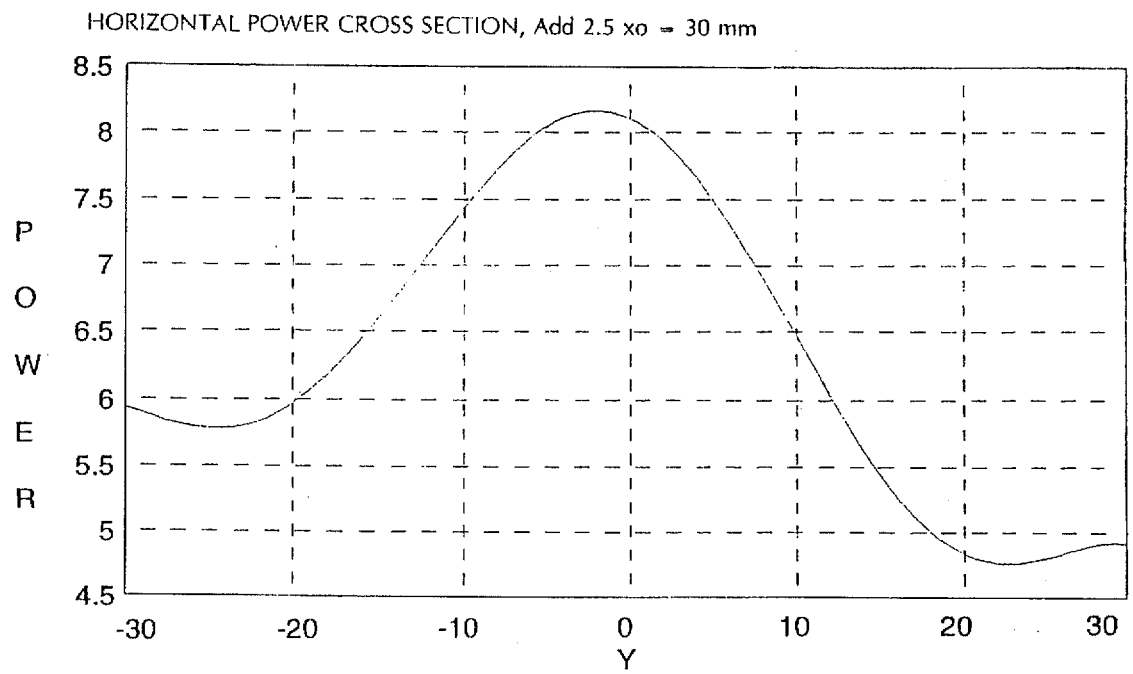
Figure 10H:
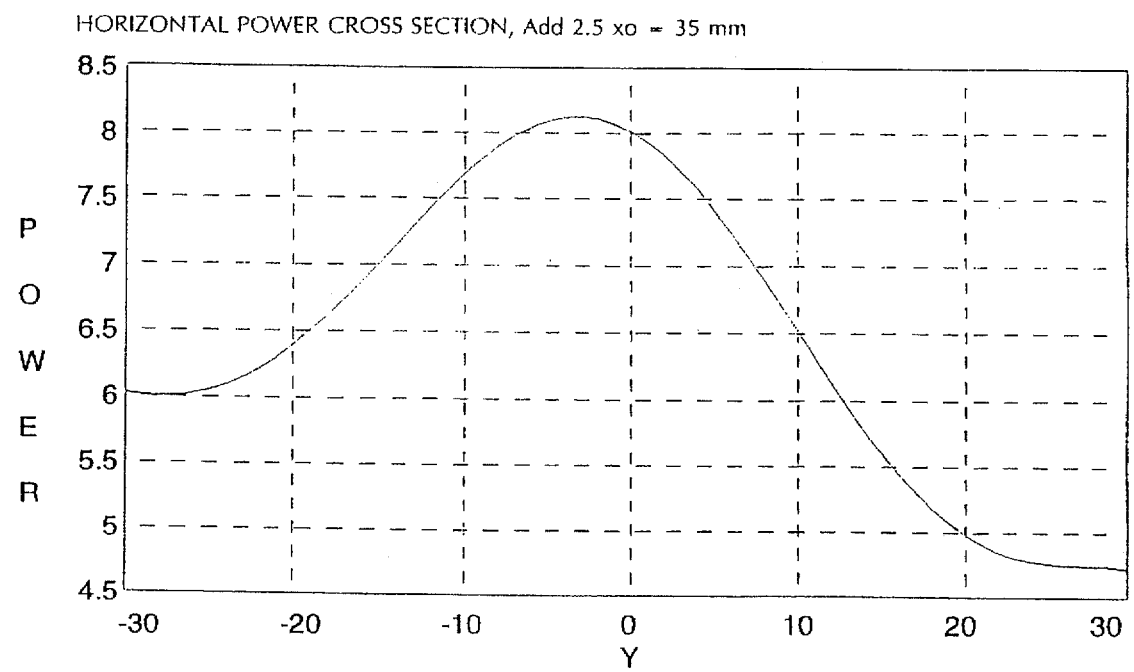
Figure 11A:
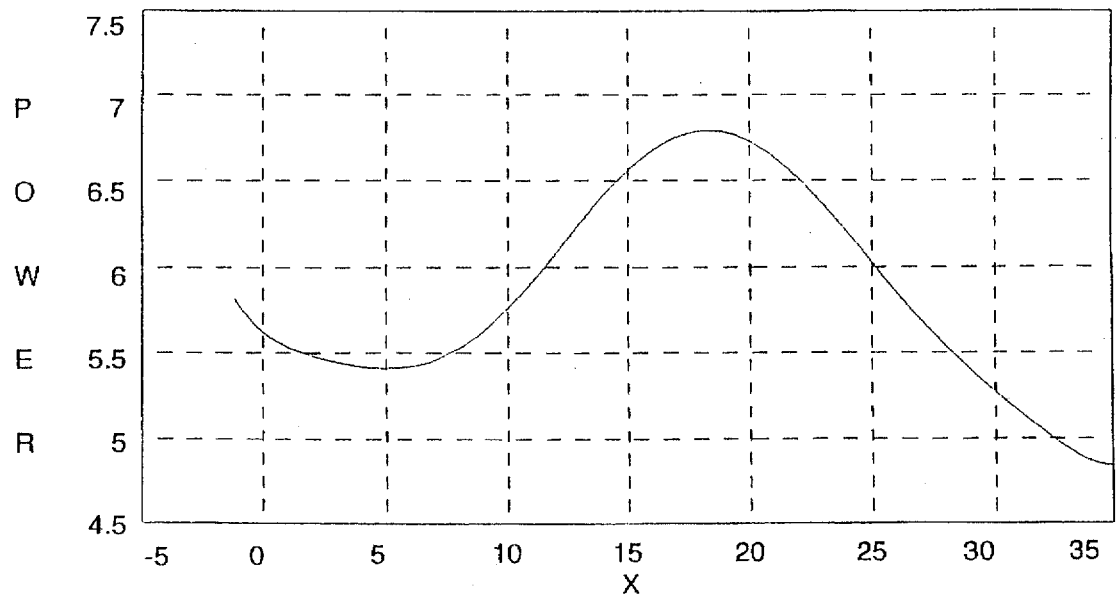
FIGS. 11A through 11M are graphs showing the mean power curves parallel to the eye path during convergence taken every 5 mm along the boundary between the distance and near portions of the lens of FIG. 9.
Figure 11B:
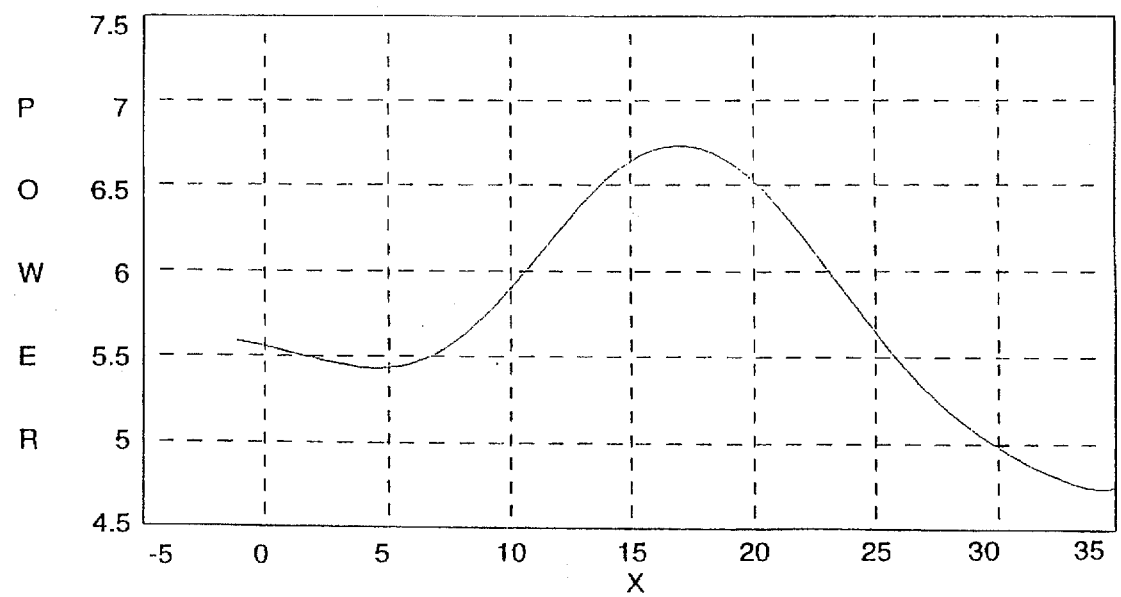
Figure 11C:
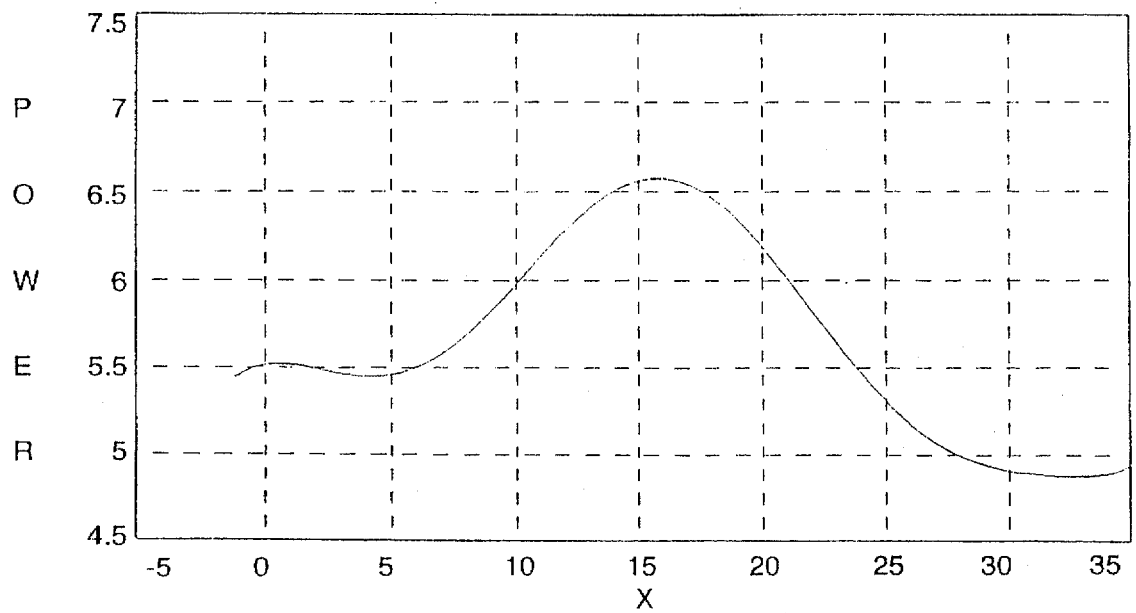
Figure 11D:
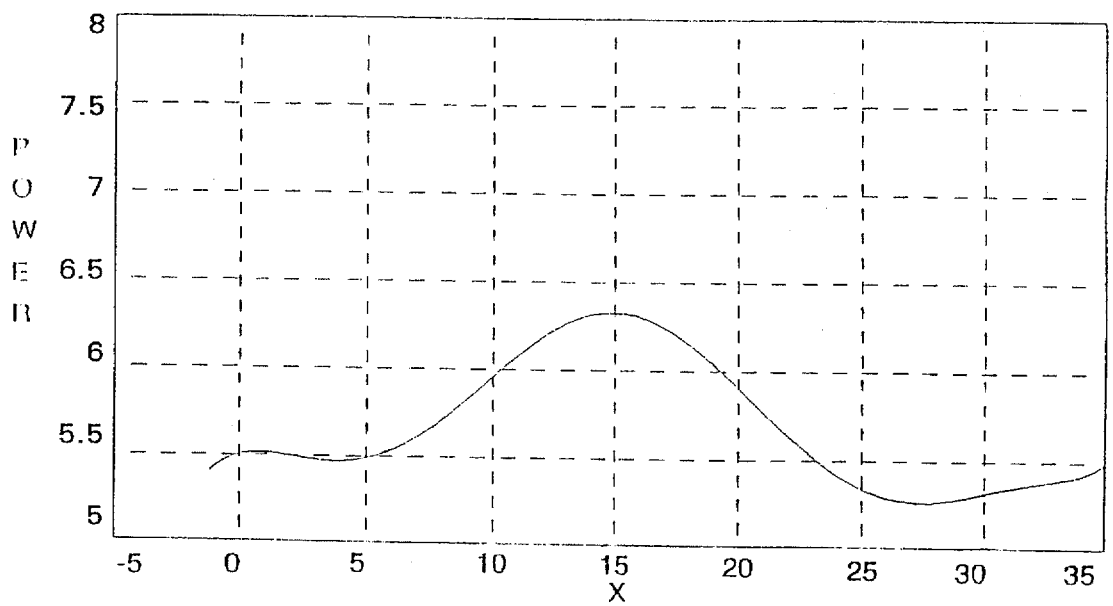
Figure 11E:
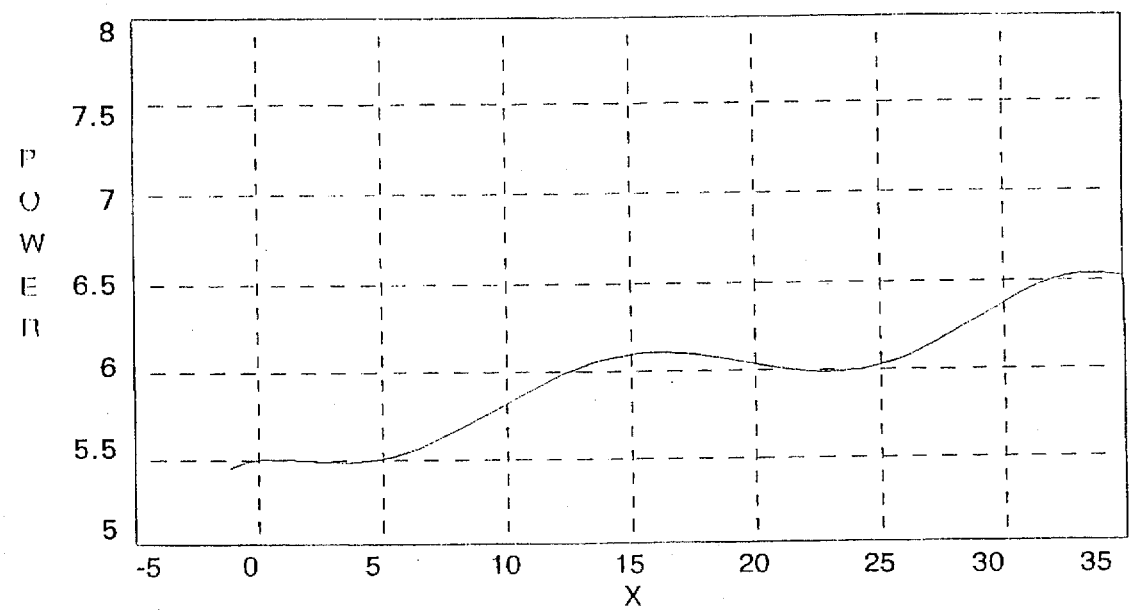
Figure 11F:
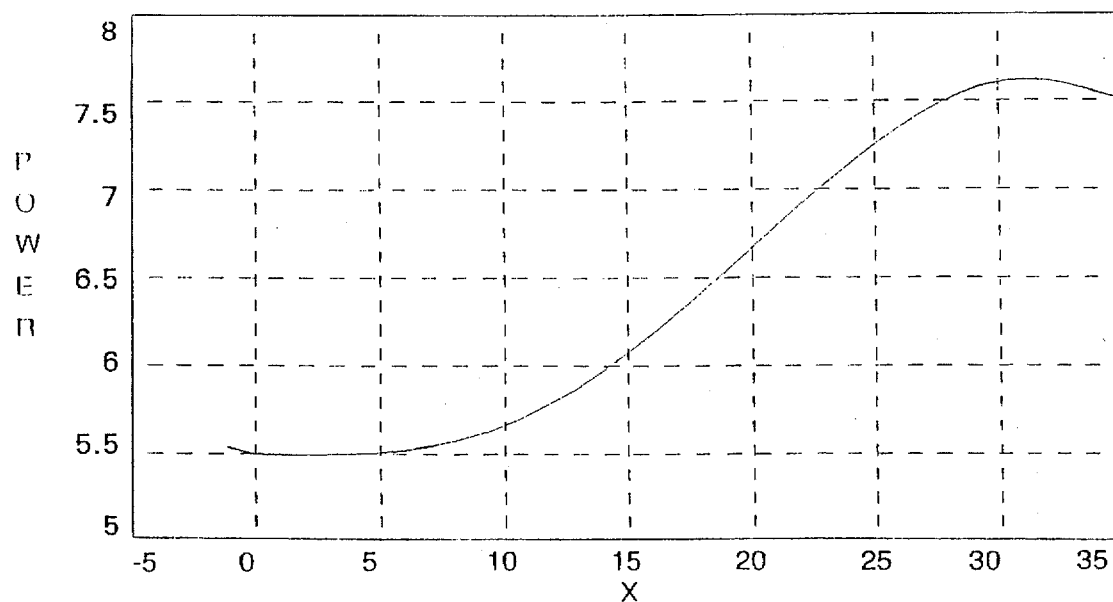
Figure 11G:
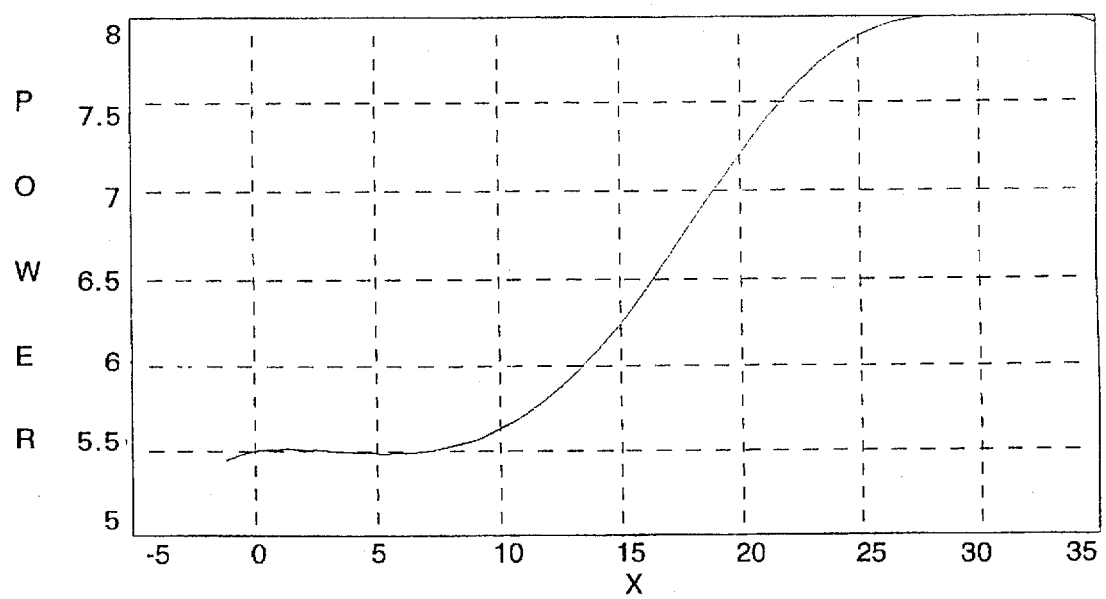
Figure 11H:
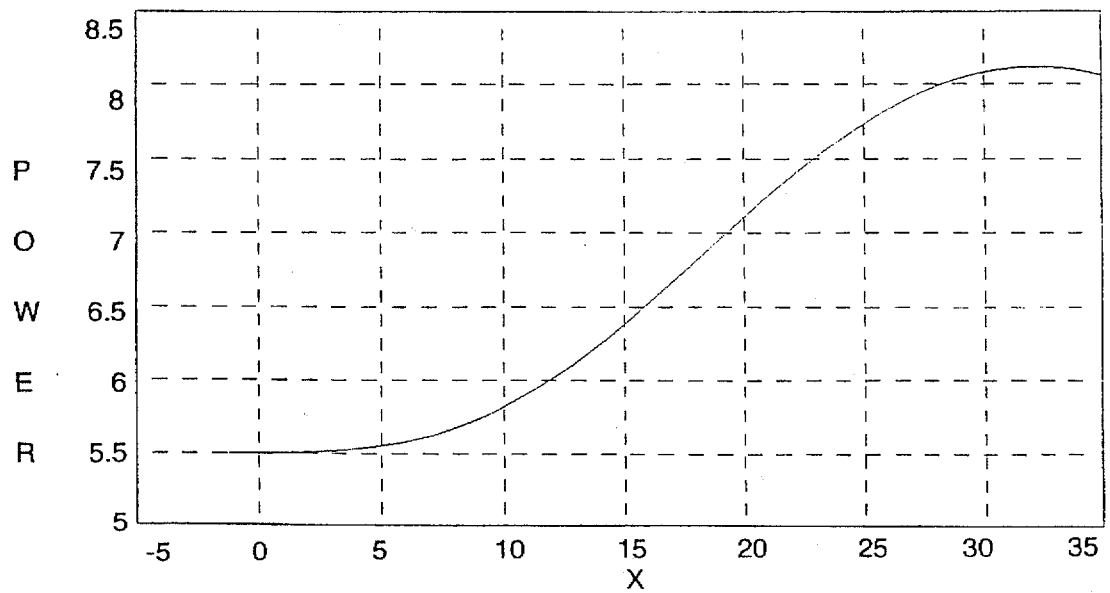
Figure 11I:
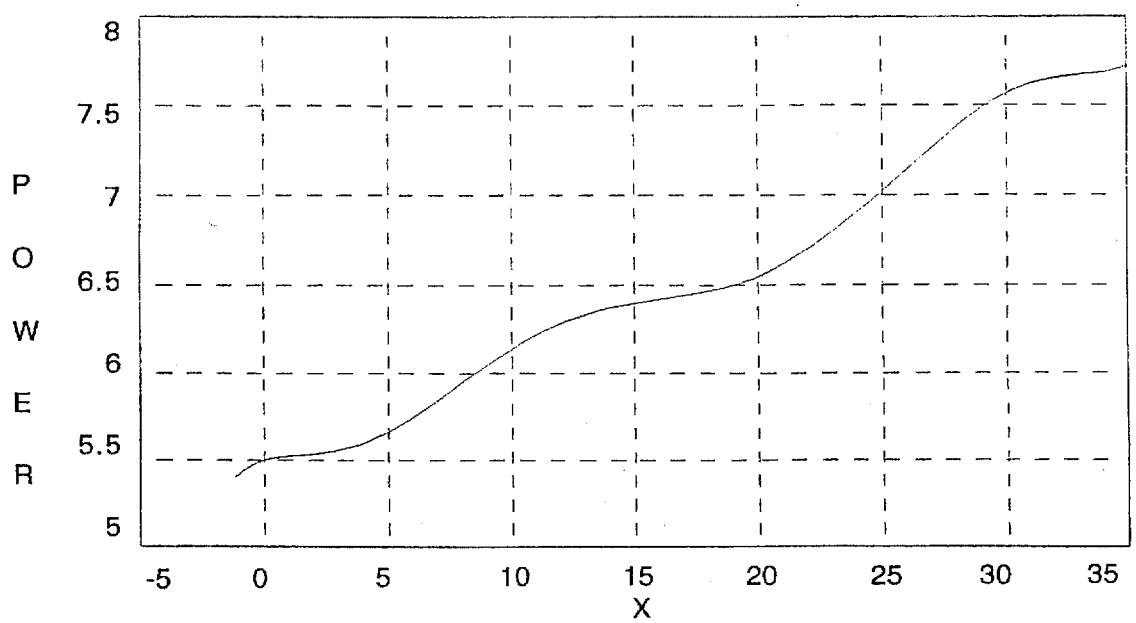
Figure 11J:
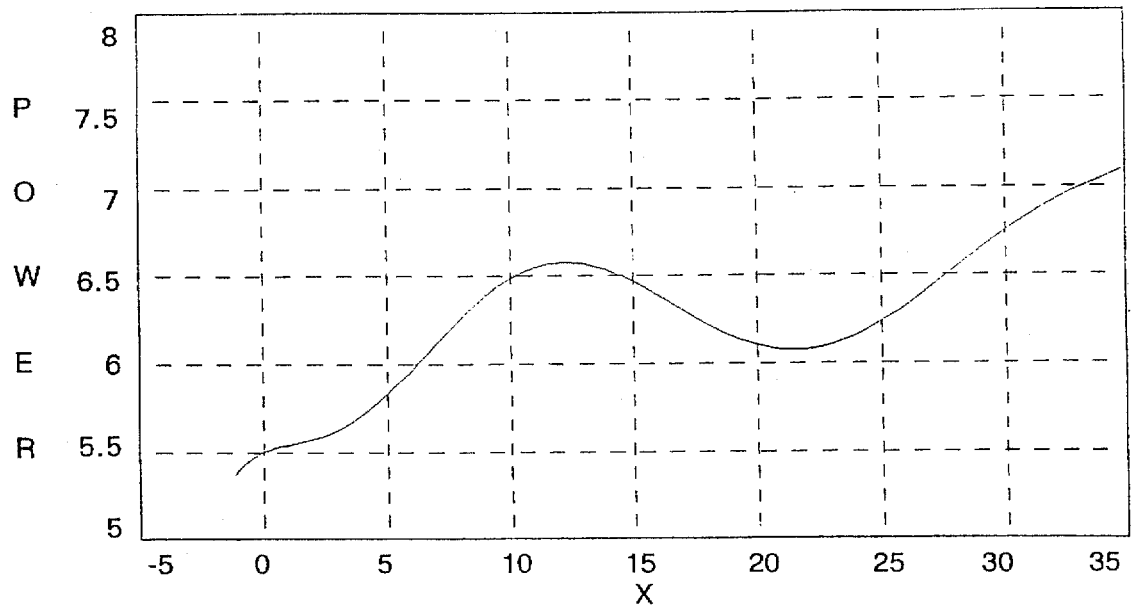
Figure 11K:
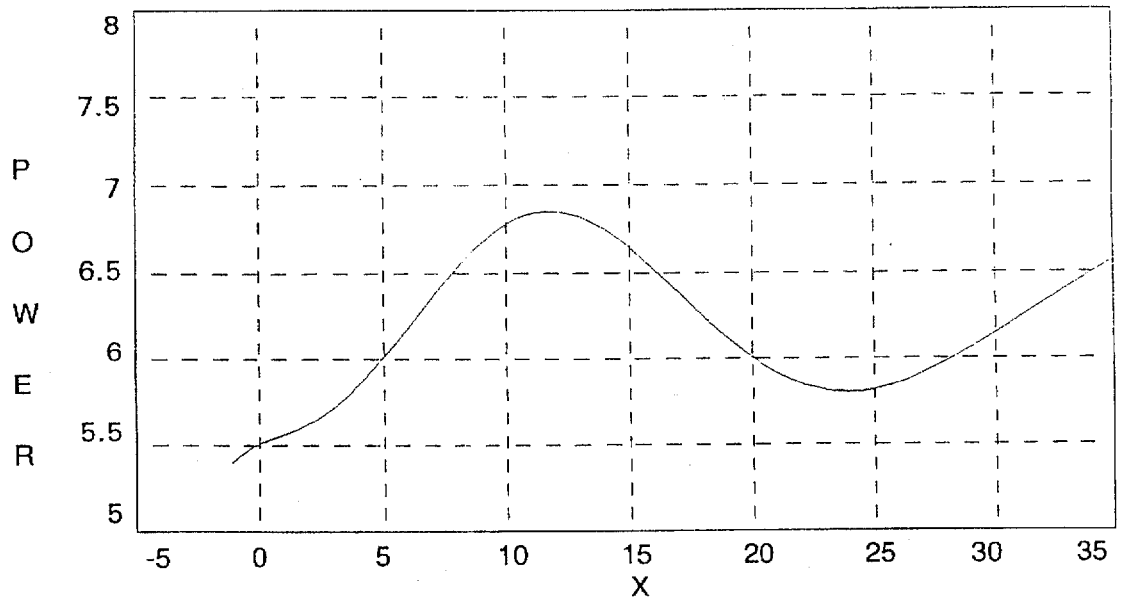
Figure 11L:
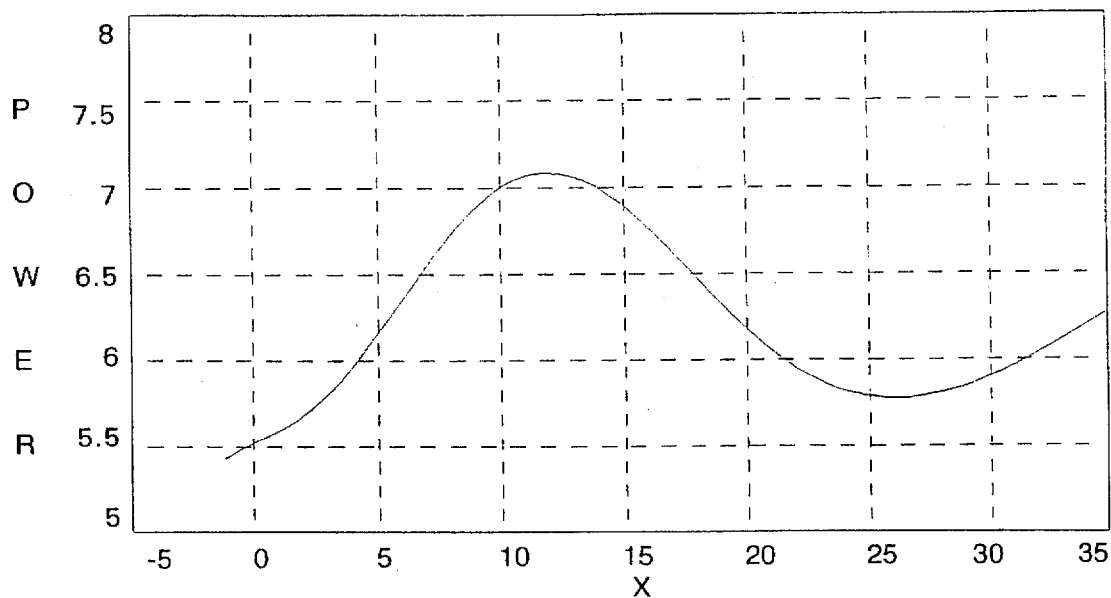
Figure 11M:
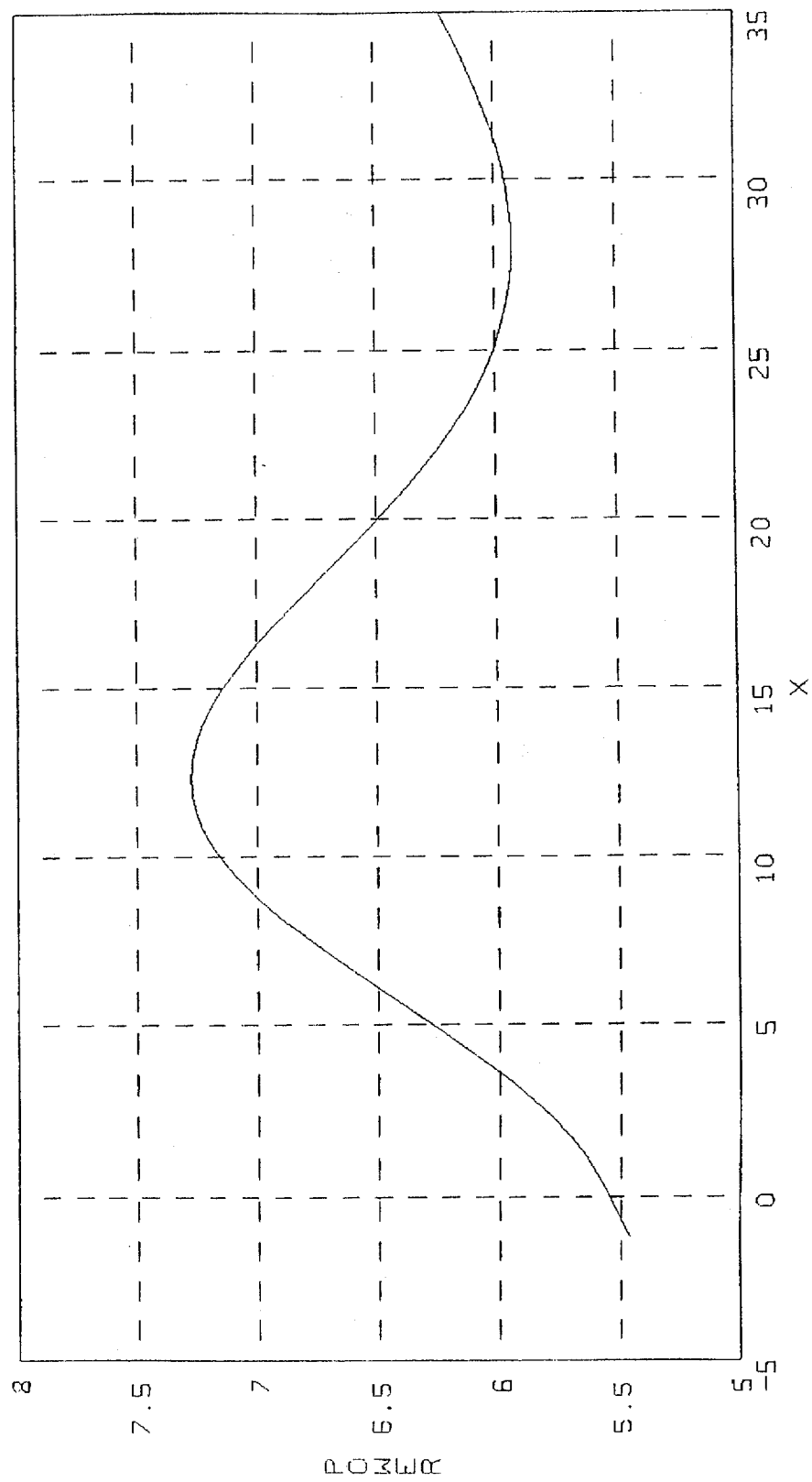
Figure 12:
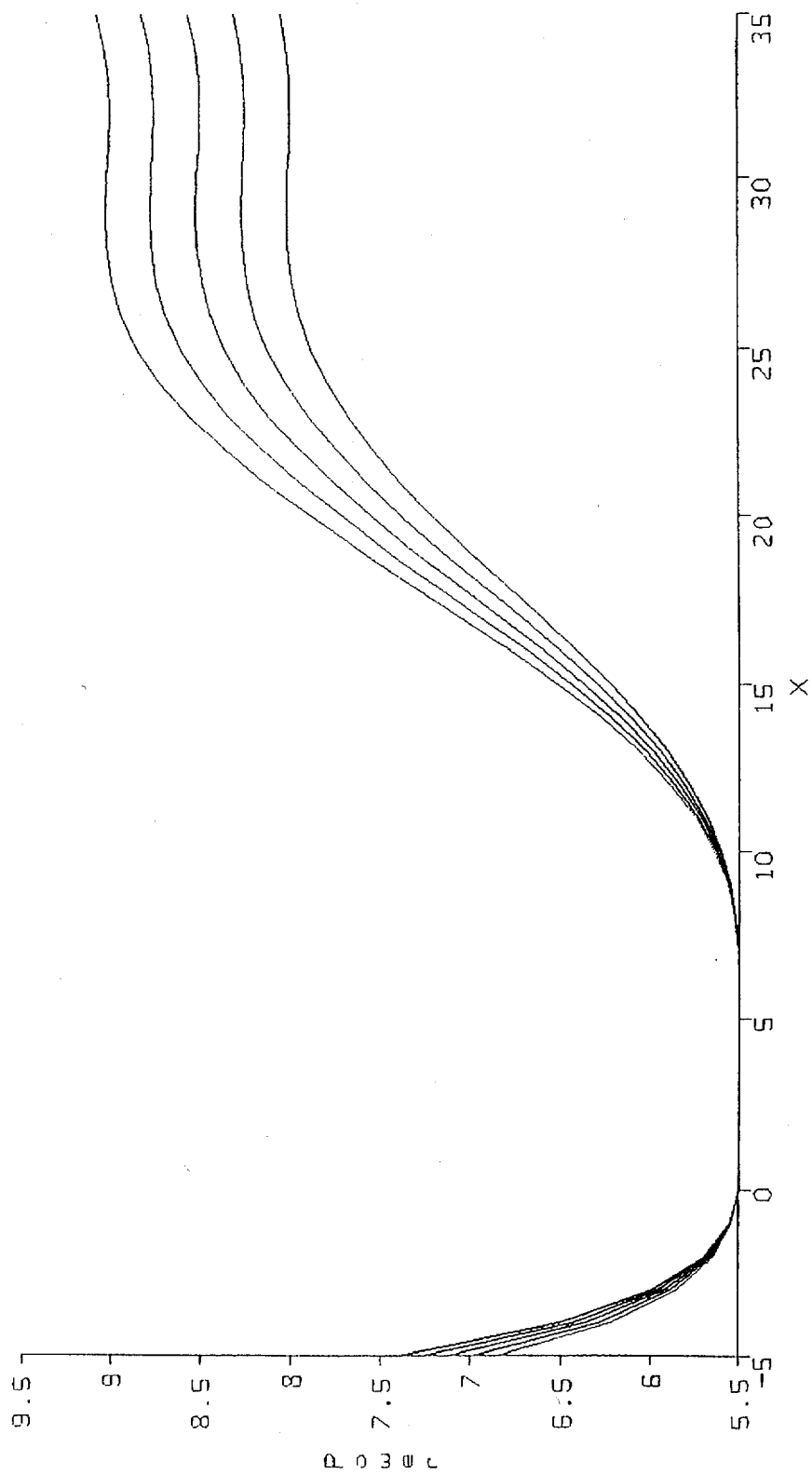
FIG. 12 is a graph showing the meridional power curves from 0 to 35 mm along the main corridor for a family of progressive power ophthalmic lenses in accordance with the present invention.
Figure 13A:
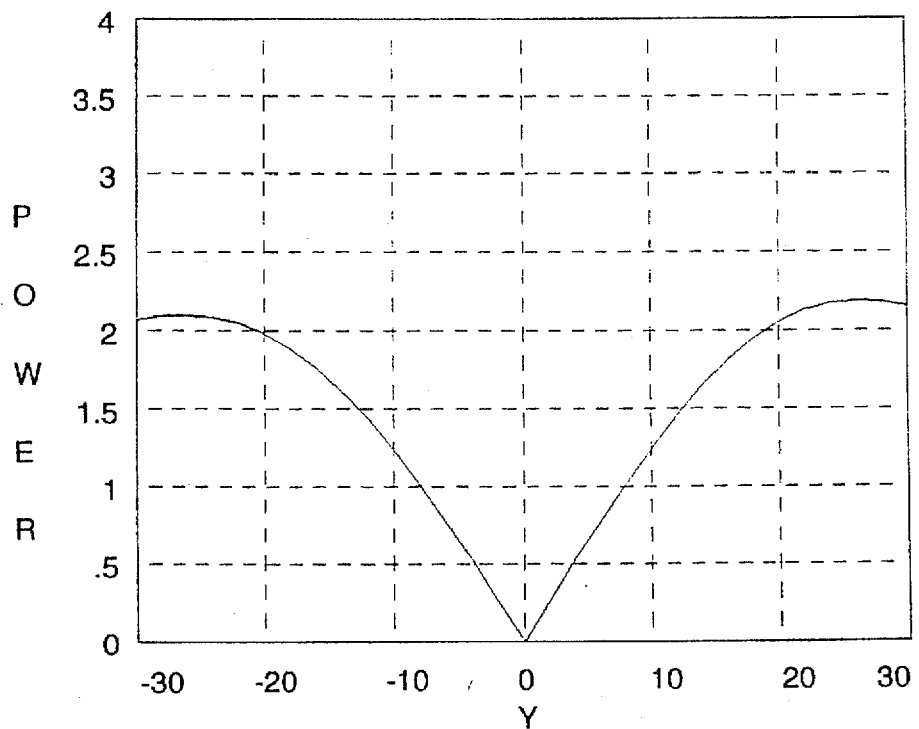
FIGS. 13A through 13C are graphs showing the astigmatism profiles of horizontal sections at 10, 20 and 30 mm into the progressive zone of the lens of FIG. 9.
Figure 13B:
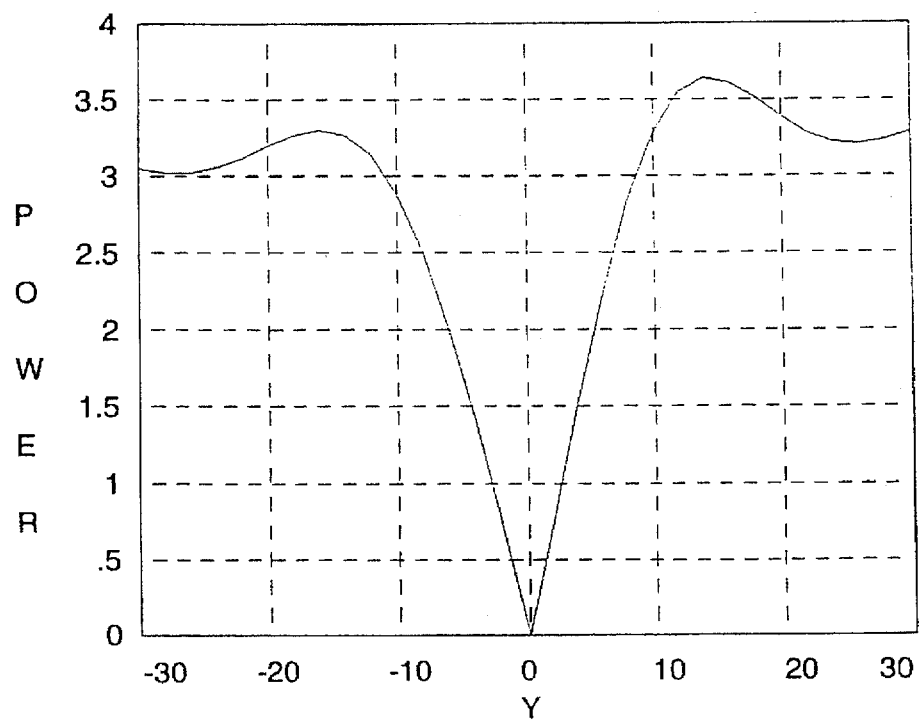
Figure 13C:
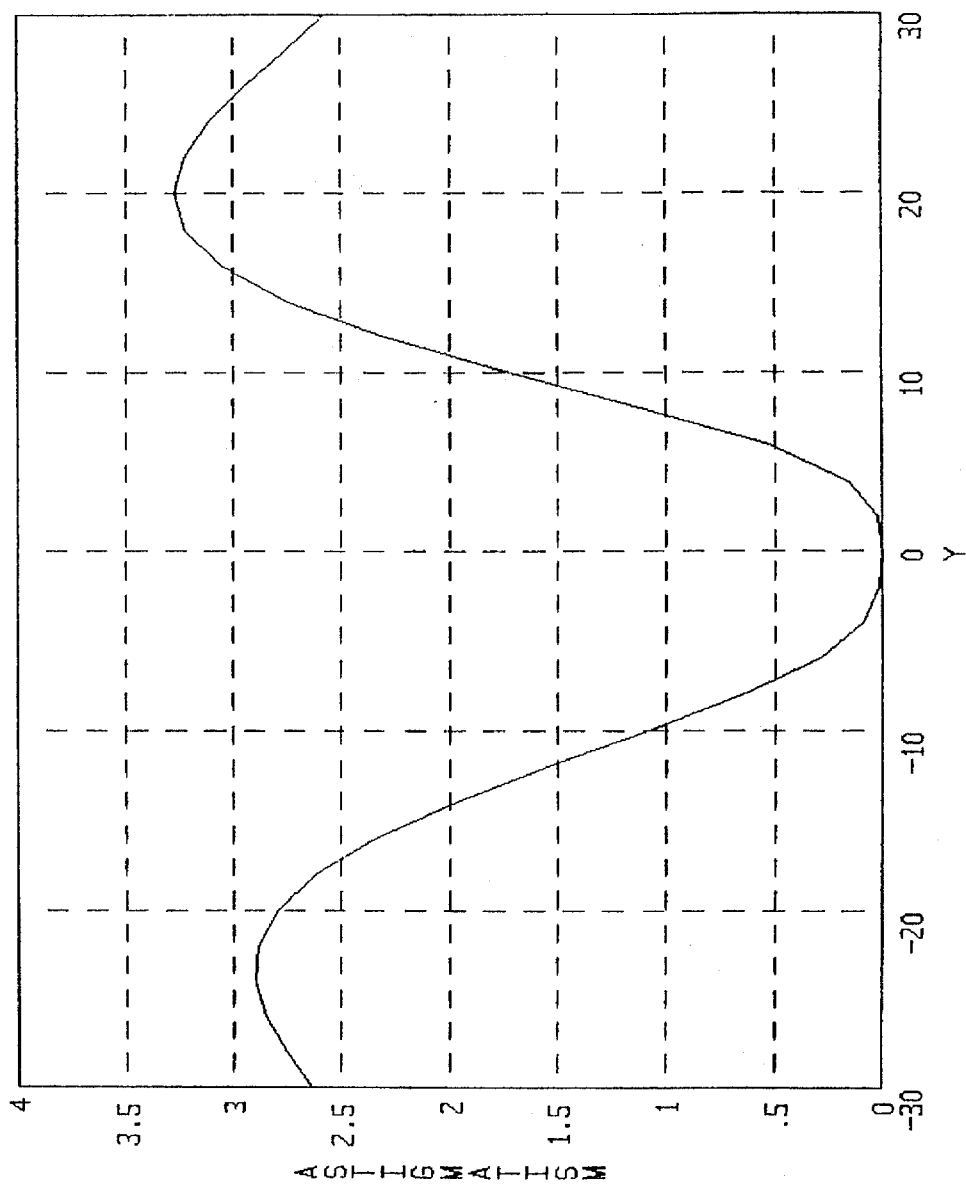

FIGS. 9A, 9B, 9C and 9D represent a lens in accordance with the present invention having a reading addition of 2.50 diopters. FIG. 9A gives the contours of constant surface astigmatism; FIG. 9B gives the contours of constant mean surface power; and FIGS. 9C and 9D provide three-dimensional views of the distribution of surface astigmatism and surface mean power. FIGS. 10A through 10H show horizontal cross-sections of mean power every 5 mm down the lens starting at the top of the progressive zone. FIGS. 11A through 11M show the corresponding curves parallel to the eye path during convergence. These profiles characterize a lens which maintains the important properties of the previous example. Steps have been taken to insure the integrity of the reading area as can be seen in FIG. 12, the family of meridional curves for addition powers of 2.50 and above. Corresponding astigmatism plots of this surface are exhibited in FIGS. 13A through 13C for horizontal sections at 10, 20 and 30 mm into the progressive zone and levels remain moderate for a progressive lens with a 2.50 addition power.

When curvatures are converted to corresponding surface heights referenced to a plane tangent to the geometric center of the lens, Tables 1A and 1B and 2A and 2B contain the sagittal values which represent the lenses in examples 1 and 2 respectively.

While preferred embodiments have been shown and described, various modifications and substitutions may be made thereto without departing from the spirit and scope of the invention. Accordingly, it is to be understood that the present invention has been described by way of illustration and not limitation.

TABLE 1A

| X(mm) | Y(mm)--> -42.5 | -40.0 | -37.5 | -35.0 | -32.5 | -30.0 | -27.5 | -25.0 | -22.5 | -20.0 | -17.5 | -15.0 | -12.5 | -10.0 | -7.5 | -5.0 | -2.5 | 0.0 |
|---|---|---|---|---|---|---|---|---|---|---|---|---|---|---|---|---|---|---|
| -42.5 | 18.589 | 17.424 | 16.344 | 15.345 | 14.424 | 13.580 | 12.810 | 12.112 | 11.486 | 10.928 | 10.439 | 10.018 | 9.6622 | 9.3724 | 9.1475 | 8.9872 | 8.8912 | 8.8592 |
| -40.0 | 17.423 | 16.273 | 15.207 | 14.220 | 13.310 | 12.476 | 11.715 | 11.026 | 10.406 | 9.8550 | 9.3714 | 8.9542 | 8.6026 | 8.3159 | 8.0935 | 7.9349 | 7.8399 | 7.8082 |
| -37.5 | 16.342 | 15.206 | 14.151 | 13.175 | 12.276 | 11.451 | 10.698 | 10.016 | 9.4026 | 8.8573 | 8.3786 | 7.9656 | 7.6175 | 7.3336 | 7.1134 | 6.9564 | 6.8623 | 6.8309 |
| -35.0 | 15.341 | 14.218 | 13.174 | 12.209 | 11.319 | 10.502 | 9.7562 | 9.0805 | 8.4732 | 7.9330 | 7.4588 | 7.0496 | 6.7047 | 6.4234 | 6.2052 | 6.0496 | 5.9563 | 5.9253 |
| -32.5 | 14.420 | 13.307 | 12.274 | 11.318 | 10.436 | 9.6261 | 8.8873 | 8.2176 | 7.6156 | 7.0801 | 6.6099 | 6.2042 | 5.8622 | 5.5833 | 5.3668 | 5.2125 | 5.1201 | 5.0893 |
| -30.0 | 13.575 | 12.472 | 11.448 | 10.500 | 9.6252 | 8.8224 | 8.0897 | 7.4253 | 6.8281 | 6.2968 | 5.8303 | 5.4277 | 5.0883 | 4.8115 | 4.5967 | 4.4436 | 4.3518 | 4.3212 |
| -27.5 | 12.804 | 11.710 | 10.694 | 9.7533 | 8.8854 | 8.0887 | 7.3614 | 6.7019 | 6.1090 | 5.5814 | 5.1182 | 4.7185 | 4.3814 | 4.1065 | 3.8932 | 3.7411 | 3.6499 | 3.6196 |
| -25.0 | 12.105 | 11.020 | 10.011 | 9.0766 | 8.2148 | 7.4235 | 6.7010 | 6.0458 | 5.4568 | 4.9326 | 4.4723 | 4.0751 | 3.7402 | 3.4670 | 3.2550 | 3.1038 | 3.0132 | 2.9830 |
| -22.5 | 11.478 | 10.399 | 9.3968 | 8.4684 | 7.6119 | 6.8253 | 6.1071 | 5.4558 | 4.8702 | 4.3490 | 3.8914 | 3.4964 | 3.1633 | 2.8916 | 2.6808 | 2.5305 | 2.4404 | 2.4104 |
| -20.0 | 10.920 | 9.8473 | 8.8506 | 7.9273 | 7.0754 | 6.2930 | 5.5786 | 4.9308 | 4.3481 | 3.8296 | 3.3742 | 2.9812 | 2.6498 | 2.3795 | 2.1697 | 2.0201 | 1.9304 | 1.9006 |
| -17.5 | 10.430 | 9.3627 | 8.3710 | 7.4522 | 6.6043 | 5.8256 | 5.1145 | 4.4696 | 3.8895 | 3.3733 | 2.9200 | 2.5287 | 2.1987 | 1.9296 | 1.7207 | 1.5717 | 1.4824 | 1.4527 |
| -15.0 | 10.007 | 8.9447 | 7.9571 | 7.0421 | 6.1977 | 5.4222 | 4.7139 | 4.0714 | 3.4937 | 2.9794 | 2.5278 | 2.1380 | 1.8092 | 1.5410 | 1.3329 | 1.1845 | 1.0956 | 1.0660 |
| -12.5 | 9.6507 | 8.5921 | 7.6081 | 6.6963 | 5.8548 | 5.0819 | 4.3759 | 3.7356 | 3.1597 | 2.6471 | 1.9269 | 1.8083 | 1.4807 | 1.2133 | 1.0058 | 0.8579 | 0.7692 | 0.7397 |
| -10.0 | 9.3606 | 8.3050 | 7.3237 | 6.4144 | 5.5752 | 4.8043 | 4.1002 | 3.4616 | 2.8872 | 2.3759 | 1.9269 | 1.5393 | 1.2124 | 0.9457 | 0.7388 | 0.5912 | 0.5028 | 0.4733 |
| -7.5 | 9.1387 | 8.0851 | 7.1056 | 6.1979 | 5.3600 | 4.5904 | 3.8875 | 3.2499 | 2.6763 | 2.1659 | 1.7175 | 1.3305 | 1.0042 | 0.7380 | 0.5314 | 0.3841 | 0.2958 | 0.2664 |
| -5.0 | 8.9893 | 7.9366 | 6.9578 | 6.0506 | 5.2132 | 4.4439 | 3.7411 | 3.1034 | 2.5298 | 2.0191 | 1.5705 | 1.1833 | 0.8567 | 0.5903 | 0.3836 | 0.2363 | 0.1480 | 0.1186 |
| -2.5 | 8.9176 | 7.8648 | 6.8857 | 5.9781 | 5.1401 | 4.3699 | 3.6661 | 3.0272 | 2.4521 | 1.9398 | 1.4895 | 1.1004 | 0.7722 | 0.5042 | 0.2963 | 0.1481 | 0.0593 | 0.0298 |
| 0.0 | 8.9286 | 7.8748 | 6.8945 | 5.9855 | 5.1459 | 4.3738 | 3.6677 | 3.0262 | 2.4481 | 1.9325 | 1.4785 | 1.0856 | 0.7534 | 0.4818 | 0.2707 | 0.1202 | 0.0300 | 0.0000 |
| 2.5 | 9.0260 | 7.9702 | 6.9878 | 6.0765 | 5.2343 | 4.4592 | 3.7497 | 3.1043 | 2.5217 | 2.0009 | 1.5422 | 1.1421 | 0.8035 | 0.5256 | 0.3089 | 0.1540 | 0.0610 | 0.0302 |
| 5.0 | 9.2117 | 8.1529 | 7.1674 | 6.2528 | 5.4069 | 4.6277 | 3.9136 | 3.2629 | 2.6743 | 2.1466 | 1.6752 | 1.2717 | 0.9243 | 0.6376 | 0.4129 | 0.2514 | 0.1543 | 0.1220 |
| 7.5 | 9.4859 | 8.4229 | 7.4331 | 6.5139 | 5.6631 | 4.8787 | 4.1586 | 3.5013 | 2.9051 | 2.3691 | 1.8523 | 1.4746 | 1.1165 | 0.8192 | 0.5846 | 0.4150 | 0.3125 | 0.2784 |
| 10.0 | 9.8477 | 8.7790 | 7.7834 | 6.8582 | 6.0011 | 5.2099 | 4.4825 | 3.8171 | 3.2121 | 2.6664 | 2.1790 | 1.7500 | 1.3802 | 1.0713 | 0.8260 | 0.6477 | 0.5394 | 0.5032 |
| 12.5 | 10.295 | 9.2192 | 8.2161 | 7.2833 | 6.4183 | 5.6188 | 4.8826 | 4.2079 | 3.5929 | 3.0364 | 2.5377 | 2.0969 | 1.7152 | 1.3948 | 1.1393 | 0.9527 | 0.8391 | 0.8010 |
| 15.0 | 10.827 | 9.7415 | 8.7291 | 7.7869 | 6.9123 | 6.1030 | 5.3567 | 4.6714 | 4.0455 | 3.4777 | 2.9575 | 2.5152 | 2.1223 | 1.7916 | 1.5271 | 1.3337 | 1.2157 | 1.1761 |
| 17.5 | 11.441 | 10.344 | 9.3206 | 8.3673 | 7.4816 | 6.6611 | 5.9035 | 5.2069 | 4.5696 | 3.9905 | 3.4692 | 3.0062 | 2.6034 | 2.2640 | 1.9924 | 1.7940 | 1.6731 | 1.6326 |
| 20.0 | 12.137 | 11.027 | 9.9899 | 9.0238 | 8.1256 | 7.2927 | 6.5230 | 5.8145 | 5.1658 | 4.5758 | 4.0444 | 3.5723 | 3.1615 | 2.8155 | 2.5389 | 2.3370 | 2.2143 | 2.1733 |
| 22.5 | 12.915 | 11.789 | 10.737 | 9.7568 | 8.8448 | 7.9987 | 7.2164 | 6.4959 | 5.8361 | 5.2360 | 4.6957 | 4.2162 | 3.7996 | 3.4492 | 3.1696 | 2.9657 | 2.8420 | 2.8006 |
| 25.0 | 13.775 | 12.632 | 11.564 | 10.568 | 9.6409 | 8.7809 | 7.9856 | 7.2533 | 6.5828 | 5.9736 | 5.4259 | 4.9407 | 4.5202 | 4.1675 | 3.8867 | 3.6824 | 3.5582 | 3.5166 |
| 27.5 | 14.720 | 13.557 | 12.472 | 11.459 | 10.516 | 9.6417 | 8.8333 | 8.0893 | 7.4089 | 6.7915 | 6.2375 | 5.7480 | 5.3251 | 4.9716 | 4.6911 | 4.4873 | 4.3636 | 4.3220 |
| 30.0 | 15.752 | 14.569 | 13.463 | 12.433 | 11.474 | 10.584 | 9.7626 | 9.0072 | 8.3171 | 7.6921 | 7.1326 | 6.6397 | 6.2153 | 5.8618 | 5.5823 | 5.3797 | 5.2568 | 5.2152 |
| 32.5 | 16.875 | 15.669 | 14.543 | 13.493 | 12.517 | 11.612 | 10.777 | 10.010 | 9.3105 | 8.6783 | 8.1236 | 7.6177 | 7.1919 | 6.8386 | 6.5600 | 6.3586 | 6.2364 | 6.1945 |
| 35.0 | 18.093 | 16.863 | 15.715 | 14.645 | 13.650 | 12.729 | 11.880 | 11.101 | 10.392 | 9.7527 | 9.1529 | 8.6836 | 8.2564 | 7.9027 | 7.6246 | 7.4239 | 7.3020 | 7.2596 |
| 37.5 | 19.412 | 18.156 | 16.983 | 15.891 | 14.878 | 13.940 | 13.076 | 12.285 | 11.566 | 10.919 | 10.343 | 9.8401 | 9.4107 | 9.0561 | 8.7777 | 8.5769 | 8.4547 | 8.4116 |
| 40.0 | 20.838 | 19.553 | 18.354 | 17.239 | 16.205 | 15.249 | 14.370 | 13.565 | 12.836 | 12.180 | 11.598 | 11.090 | 10.658 | 10.301 | 10.022 | 9.8201 | 9.6973 | 9.6530 |
| 42.5 | 22.378 | 21.061 | 19.834 | 18.694 | 17.637 | 16.662 | 15.766 | 14.947 | 14.206 | 13.540 | 12.951 | 12.438 | 12.001 | 11.642 | 11.360 | 11.157 | 11.033 | 10.987 |

TABLE 1B

| Y(mm)--><br>X(mm) | 0.0 | 2.5 | 5.0 | 7.5 | 10.0 | 12.5 | 15.0 | 17.5 | 20.0 | 22.5 | 25.0 | 27.5 | 30.0 | 32.5 | 35.0 | 37.5 | 40.0 | 42.5 |
|---|---|---|---|---|---|---|---|---|---|---|---|---|---|---|---|---|---|---|
| -42.5 | 8.8592 | 8.8912 | 9.9872 | 9.1475 | 9.3724 | 9.6622 | 10.018 | 10.439 | 10.928 | 11.486 | 12.112 | 12.810 | 13.580 | 14.424 | 15.345 | 16.344 | 17.424 | 18.589 |
| -40.0 | 7.8082 | 7.8399 | 7.9349 | 8.0935 | 8.3259 | 8.6026 | 8.9542 | 9.3714 | 9.8550 | 10.406 | 11.026 | 11.715 | 12.476 | 13.310 | 14.220 | 15.207 | 16.273 | 17.423 |
| -37.5 | 6.8309 | 6.8623 | 6.9564 | 7.1134 | 7.3336 | 7.6175 | 7.9656 | 8.3786 | 8.8573 | 9.4026 | 10.016 | 10.698 | 11.451 | 12.276 | 13.175 | 14.151 | 15.206 | 16.342 |
| -35.0 | 5.9253 | 5.9563 | 6.0496 | 6.2052 | 6.4234 | 6.7047 | 7.0496 | 7.4588 | 7.9330 | 8.4732 | 9.0805 | 9.7562 | 10.502 | 11.319 | 12.209 | 13.174 | 14.218 | 15.341 |
| -32.5 | 5.0893 | 5.1201 | 5.2125 | 5.3668 | 5.5833 | 5.8622 | 6.2042 | 6.6099 | 7.0801 | 7.6156 | 8.2176 | 8.8873 | 9.6261 | 10.436 | 11.318 | 12.274 | 13.307 | 14.420 |
| -30.0 | 4.3212 | 4.3518 | 4.4436 | 4.5967 | 4.8115 | 5.0883 | 5.4277 | 5.8303 | 6.2968 | 6.8281 | 7.4253 | 8.0997 | 8.8224 | 9.6252 | 10.500 | 11.448 | 12.472 | 13.575 |
| -27.5 | 3.6196 | 3.6499 | 3.7411 | 3.8932 | 4.1065 | 4.3814 | 4.7185 | 5.1182 | 5.5814 | 6.1090 | 6.7019 | 7.3614 | 8.0887 | 8.8854 | 9.7533 | 10.694 | 11.710 | 12.804 |
| -25.0 | 2.9830 | 3.0132 | 3.1038 | 3.2550 | 3.4670 | 3.7402 | 4.0751 | 4.4723 | 4.9326 | 5.4568 | 6.0458 | 6.7010 | 7.4235 | 8.2148 | 9.0766 | 10.011 | 11.020 | 12.105 |
| -22.5 | 2.4104 | 2.4404 | 2.5305 | 2.6808 | 2.8916 | 3.1633 | 3.4964 | 3.8914 | 4.3490 | 4.8702 | 5.4558 | 6.1071 | 6.8253 | 7.6119 | 8.4684 | 9.3968 | 10.399 | 11.478 |
| -20.0 | 1.9006 | 1.9304 | 2.0201 | 2.1697 | 2.3795 | 2.6498 | 2.9812 | 3.3742 | 3.8296 | 4.3481 | 4.9308 | 5.5786 | 6.2930 | 7.0754 | 7.9273 | 8.8506 | 9.8473 | 10.920 |
| -17.5 | 1.4527 | 1.4824 | 1.5717 | 1.7207 | 1.9296 | 2.1987 | 2.5287 | 2.9200 | 3.3733 | 3.8895 | 4.4696 | 5.1145 | 5.8256 | 6.6043 | 7.4522 | 8.3710 | 9.3627 | 10.430 |
| -15.0 | 1.0660 | 1.0956 | 1.1845 | 1.3329 | 1.5410 | 1.8092 | 2.1380 | 2.5278 | 2.9794 | 3.4937 | 4.0714 | 4.7139 | 5.4222 | 6.1977 | 7.0421 | 7.9571 | 8.9447 | 10.007 |
| -12.5 | 0.7397 | 0.7692 | 0.8579 | 1.0058 | 1.2133 | 1.4807 | 1.8083 | 2.1969 | 2.6471 | 3.1597 | 3.7356 | 4.3759 | 5.0819 | 5.8548 | 6.6963 | 7.6081 | 8.5921 | 9.6506 |
| -10.0 | 0.4733 | 0.5028 | 0.5912 | 0.7388 | 0.9457 | 1.2124 | 1.5393 | 1.9269 | 2.3759 | 2.8871 | 3.4615 | 4.1001 | 4.8041 | 5.5749 | 6.4141 | 7.3233 | 8.3045 | 9.3599 |
| -7.5 | 0.2664 | 0.2958 | 0.3841 | 0.5314 | 0.7379 | 1.0041 | 1.3303 | 1.7171 | 2.1652 | 2.6754 | 3.2486 | 3.8859 | 4.5884 | 5.3576 | 6.1949 | 7.1021 | 8.0811 | 9.1341 |
| -5.0 | 0.1186 | 0.1480 | 0.2362 | 0.3833 | 0.5896 | 0.8553 | 1.1811 | 1.5673 | 2.0148 | 2.5242 | 3.0966 | 3.7329 | 4.4344 | 5.2024 | 6.0384 | 6.9442 | 7.9216 | 8.9728 |
| -2.5 | 0.0298 | 0.0592 | 0.1476 | 0.2949 | 0.5012 | 0.7669 | 1.0924 | 1.4782 | 1.9252 | 2.4340 | 3.0057 | 3.6413 | 4.3421 | 5.1092 | 5.9444 | 6.8493 | 7.8257 | 8.8759 |
| 0.0 | 0.0000 | 0.0298 | 0.1191 | 0.2674 | 0.4747 | 0.7411 | 1.0669 | 1.4527 | 1.8993 | 2.4076 | 2.9786 | 3.6135 | 4.3135 | 5.0799 | 5.9143 | 6.8185 | 7.7943 | 8.8438 |
| 2.5 | 0.0302 | 0.0608 | 0.1521 | 0.3030 | 0.5129 | 0.7814 | 1.1087 | 1.4953 | 1.9420 | 2.4500 | 3.0203 | 3.6542 | 4.3532 | 5.1186 | 5.9521 | 6.8554 | 7.8305 | 8.8794 |
| 5.0 | 0.1220 | 0.1539 | 0.2486 | 0.4042 | 0.6189 | 0.8917 | 1.2223 | 1.6110 | 2.0587 | 2.5668 | 3.1366 | 3.7695 | 4.4672 | 5.2312 | 6.0634 | 6.9654 | 7.9395 | 8.9876 |
| 7.5 | 0.2784 | 0.3121 | 0.4116 | 0.5738 | 0.7958 | 1.0752 | 1.4111 | 1.8037 | 2.2538 | 2.7629 | 3.3326 | 3.9648 | 4.6612 | 5.4236 | 6.2541 | 7.1546 | 8.1272 | 9.1741 |
| 10.0 | 0.5032 | 0.5390 | 0.6441 | 0.8145 | 1.0455 | 1.3337 | 1.6771 | 2.0754 | 2.5295 | 3.0409 | 3.6116 | 4.2436 | 4.9391 | 5.7002 | 6.5291 | 7.4279 | 8.3969 | 9.4445 |
| 12.5 | 0.8010 | 0.8387 | 0.9496 | 1.1286 | 1.3696 | 1.6679 | 2.0203 | 2.4261 | 2.8858 | 3.4011 | 3.9741 | 4.6072 | 5.3028 | 6.0634 | 6.8912 | 7.7888 | 8.7585 | 9.8030 |
| 15.0 | 1.1761 | 1.2155 | 1.3313 | 1.5182 | 1.7691 | 2.0776 | 2.4399 | 2.8544 | 3.3212 | 3.8421 | 4.4191 | 5.0549 | 5.7522 | 6.5135 | 7.3415 | 8.2388 | 9.2081 | 10.252 |
| 17.5 | 1.6326 | 1.6730 | 1.7925 | 1.9858 | 2.2450 | 2.5631 | 2.9351 | 3.3587 | 3.8338 | 4.3617 | 4.9445 | 5.5849 | 6.2856 | 7.0495 | 7.8793 | 8.7780 | 9.7484 | 10.793 |
| 20.0 | 2.1733 | 2.2143 | 2.3361 | 2.5338 | 2.7994 | 3.1252 | 3.5058 | 3.9384 | 4.4222 | 4.9582 | 5.5484 | 6.1951 | 6.9013 | 7.6698 | 8.5035 | 9.4056 | 10.379 | 11.427 |
| 22.5 | 2.8006 | 2.8420 | 2.9650 | 3.1649 | 3.4343 | 3.7655 | 4.1530 | 4.5935 | 5.0860 | 5.6307 | 6.2293 | 6.8841 | 7.5976 | 8.3728 | 9.2127 | 10.120 | 11.099 | 12.152 |
| 25.0 | 3.5166 | 3.5580 | 3.6811 | 3.8812 | 4.1517 | 4.4859 | 4.8783 | 5.3255 | 5.8259 | 6.3795 | 6.9873 | 7.6513 | 8.3739 | 9.1578 | 10.006 | 10.922 | 11.908 | 12.969 |
| 27.5 | 4.3220 | 4.3629 | 4.4846 | 4.6832 | 4.9530 | 5.2881 | 5.6837 | 6.1362 | 6.6437 | 7.2059 | 7.8233 | 8.4974 | 9.2304 | 10.025 | 10.883 | 11.809 | 12.806 | 13.876 |
| 30.0 | 5.2152 | 5.2550 | 5.3746 | 5.5707 | 5.8387 | 6.1735 | 6.5710 | 7.0277 | 7.5416 | 8.1122 | 8.7391 | 9.4240 | 10.168 | 10.975 | 11.846 | 12.784 | 13.793 | 14.877 |
| 32.5 | 6.1945 | 6.2329 | 6.3503 | 6.5437 | 6.8094 | 7.1435 | 7.5422 | 8.0024 | 8.5222 | 9.1006 | 9.7374 | 10.433 | 11.190 | 12.010 | 12.895 | 13.847 | 14.871 | 15.970 |
| 35.0 | 7.2596 | 7.2966 | 7.4117 | 7.6027 | 7.8665 | 8.1999 | 8.5997 | 9.0632 | 9.5886 | 10.175 | 10.821 | 11.529 | 12.299 | 13.133 | 14.033 | 15.002 | 16.043 | 17.160 |
| 37.5 | 8.4116 | 8.4472 | 8.5604 | 8.7494 | 9.0118 | 9.3449 | 9.7460 | 10.213 | 10.744 | 11.338 | 11.995 | 12.714 | 13.498 | 14.347 | 15.264 | 16.252 | 17.312 | 18.449 |
| 40.0 | 9.6550 | 9.6872 | 9.7989 | 9.9865 | 10.248 | 10.582 | 10.985 | 11.455 | 11.992 | 12.595 | 13.262 | 13.994 | 14.793 | 15.658 | 16.594 | 17.601 | 18.683 | 19.843 |
| 42.5 | 10.987 | 11.020 | 11.131 | 11.318 | 11.579 | 11.914 | 12.319 | 12.794 | 13.338 | 13.949 | 14.627 | 15.373 | 16.187 | 17.071 | 18.026 | 19.055 | 20.161 | 21.347 |

TABLE 2A

| X(mm) | Y(mm)--> -42.5 | -40.0 | -37.5 | -35.0 | -32.5 | -30.0 | -27.5 | -25.0 | -22.5 |
|---|---|---|---|---|---|---|---|---|---|
| -42.5 | 18.588 | 17.423 | 16.343 | 15.344 | 14.423 | 13.579 | 12.809 | 12.112 | 11.485 |
| -40.0 | 17.422 | 16.273 | 15.206 | 14.219 | 13.320 | 12.475 | 11.714 | 11.025 | 10.405 |
| -37.5 | 16.341 | 15.205 | 14.150 | 13.175 | 12.275 | 11.450 | 10.697 | 10.035 | 9.4020 |
| -35.0 | 15.341 | 14.217 | 13.174 | 12.208 | 11.318 | 10.501 | 9.7556 | 9.0799 | 8.4726 |
| -32.5 | 54.439 | 13.307 | 12.273 | 11.317 | 10.435 | 9.6256 | 6.8866 | 8.2171 | 7.6151 |
| -30.0 | 13.574 | 12.472 | 11.447 | 10.499 | 9.6247 | 8.8219 | 8.0892 | 7.4249 | 6.8277 |
| -27.5 | 12.803 | 11.710 | 10.694 | 9.7528 | 8.8850 | 8.0883 | 7.3609 | 6.7015 | 6.1086 |
| -25.0 | 12.305 | 11.019 | 10.011 | 9.0773 | 8.2144 | 7.4231 | 6.7006 | 6.0455 | 5.4564 |
| -22.5 | 11.477 | 10.399 | 9.3965 | 8.4681 | 7.6115 | 6.8250 | 6.1068 | 5.4555 | 4.8699 |
| -20.0 | 10.919 | 9.8470 | 8.8503 | 7.9270 | 7.0751 | 6.2928 | 5.5784 | 4.9305 | 4.3478 |
| -17.5 | 10.429 | 9.3625 | 8.3707 | 7.4519 | 6.6041 | 5.8254 | 5.1143 | 4.4693 | 3.8893 |
| -15.0 | 10.007 | 8.9444 | 7.9569 | 7.0419 | 6.1975 | 5.4220 | 4.7137 | 4.0713 | 3.4935 |
| -12.5 | 9.6505 | 8.5920 | 7.6079 | 6.6961 | 5.8546 | 5.0817 | 4.3758 | 3.7355 | 3.1596 |
| -10.0 | 9.3601 | 8.3046 | 7.3233 | 6.4141 | 5.5749 | 4.8041 | 4.1001 | 3.4614 | 2.8870 |
| -7.5 | 9.1371 | 8.0837 | 7.1043 | 6.1968 | 5.3591 | 4.5897 | 3.8869 | 3.2493 | 2.6759 |
| -5.0 | 8.9861 | 7.9338 | 6.9552 | 6.0484 | 5.2113 | 4.4422 | 3.7396 | 3.1022 | 2.5287 |
| -2.5 | 8.9142 | 7.8619 | 6.8833 | 5.9761 | 5.1364 | 4.3685 | 3.6649 | 3.0263 | 2.4514 |
| 0.0 | 8.9289 | 7.8758 | 6.8961 | 5.9877 | 5.1484 | 4.3766 | 3.6707 | 3.0292 | 2.4510 |
| 2.5 | 9.0363 | 7.9814 | 6.9998 | 6.0891 | 5.2472 | 4.4723 | 3.7626 | 3.1167 | 2.5332 |
| 5.0 | 9.2394 | 8.1817 | 7.1971 | 6.2829 | 5.4371 | 4.6576 | 3.9426 | 3.2904 | 2.6996 |
| 7.5 | 9.5387 | 8.4767 | 7.4874 | 6.5682 | 5.7168 | 4.9309 | 4.2086 | 3.5481 | 2.9479 |
| 10.0 | 9.9320 | 8.8637 | 7.8678 | 6.9415 | 6.0824 | 5.2881 | 4.5564 | 3.8854 | 3.2736 |
| 12.5 | 10.416 | 9.3392 | 8.3342 | 7.3985 | 6.5293 | 5.7242 | 4.9809 | 4.2974 | 3.6723 |
| 15.0 | 10.998 | 9.8993 | 8.8827 | 7.9350 | 7.0533 | 6.2352 | 5.4783 | 4.7808 | 4.1411 |
| 17.5 | 11.644 | 10.541 | 9.5102 | 8.5481 | 7.6518 | 6.8189 | 6.0470 | 5.3343 | 4.6797 |
| 20.0 | 12.382 | 11.263 | 10.215 | 9.2366 | 8.3240 | 7.4748 | 6.6870 | 5.9590 | 5.2896 |
| 22.5 | 13.202 | 12.064 | 10.998 | 10.001 | 9.0706 | 8.2045 | 7.4005 | 6.6572 | 5.9739 |
| 25.0 | 14.106 | 12.946 | 11.859 | 10.843 | 9.8940 | 9.0104 | 8.1902 | 7.4324 | 6.7362 |
| 27.5 | 15.094 | 13.911 | 12.802 | 11.765 | 10.797 | 9.8961 | 9.0600 | 9.2882 | 7.5802 |
| 30.0 | 16.171 | 14.963 | 13.831 | 12.772 | 11.784 | 10.865 | 10.014 | 9.2285 | 8.5095 |
| 32.5 | 17.341 | 16.106 | 14.949 | 13.868 | 12.860 | 11.923 | 11.056 | 10.257 | 9.5277 |
| 35.0 | 18.609 | 17.345 | 16.162 | 15.057 | 14.028 | 13.073 | 12.190 | 11.378 | 10.638 |
| 37.5 | 19.982 | 18.687 | 17.476 | 16.346 | 15.295 | 14.321 | 13.421 | 12.596 | 11.845 |
| 40.0 | 21.466 | 20.137 | 18.897 | 17.741 | 16.666 | 15.671 | 14.755 | 13.915 | 13.153 |
| 42.5 | 23.070 | 21.705 | 20.432 | 19.247 | 18.148 | 17.132 | 16.197 | 15.342 | 14.566 |

| X(mm) | Y(mm)--> -20.0 | -17.5 | -15.0 | -12.5 | -10.0 | -7.5 | -5.0 | -2.5 | 0.0 |
|---|---|---|---|---|---|---|---|---|---|
| -42.5 | 10.928 | 10.439 | 10.017 | 9.6615 | 9.3717 | 9.1468 | 8.9865 | 8.8905 | 8.8585 |
| -40.0 | 9.8543 | 9.3707 | 8.9536 | 8.6020 | 8.3152 | 8.0928 | 7.9342 | 7.8392 | 7.8075 |
| -37.5 | 8.8566 | 8.3780 | 7.9650 | 7.6169 | 7.3330 | 7.1128 | 6.9558 | 6.8617 | 6.8303 |
| -35.0 | 7.9324 | 7.4582 | 7.0491 | 6.7042 | 6.4229 | 6.2046 | 6.0490 | 5.9558 | 5.9247 |
| -32.5 | 7.0796 | 6.6094 | 6.2037 | 5.8617 | 5.5828 | 5.3663 | 5.2120 | 5.1196 | 5.0887 |
| -30.0 | 6.2963 | 5.8298 | 5.4273 | 5.0879 | 4.8110 | 4.5962 | 4.4431 | 4.3513 | 4.3207 |
| -27.5 | 5.5810 | 5.1178 | 4.7181 | 4.3810 | 4.1061 | 3.8928 | 3.7407 | 3.6495 | 3.6192 |
| -25.0 | 4.9322 | 4.4720 | 4.0747 | 3.7398 | 3.4666 | 3.2546 | 3.1034 | 3.0129 | 2.9827 |
| -22.5 | 4.3487 | 3.8910 | 3.4961 | 3.1630 | 2.8913 | 2.6805 | 2.5302 | 2.4401 | 2.4101 |
| -20.0 | 3.8293 | 3.3740 | 2.9810 | 2.6496 | 2.3792 | 2.1694 | 2.0198 | 1.9302 | 1.9003 |
| -17.5 | 3.3731 | 2.9198 | 2.5285 | 2.1985 | 1.9293 | 1.7204 | 1.5715 | 1.4822 | 1.4525 |
| -15.0 | 2.9792 | 2.5276 | 2.1378 | 1.8091 | 1.5409 | 1.3327 | 1.1843 | 1.0954 | 1.0658 |
| -12.5 | 2.6470 | 2.1968 | 1.8082 | 1.4805 | 1.2132 | 1.0057 | 0.8577 | 0.7691 | 0.7395 |
| -10.0 | 2.3758 | 1.9268 | 1.5392 | 1.2123 | 0.9456 | 0.7387 | 0.5911 | 0.5027 | 0.4732 |
| -7.5 | 2.1655 | 1.7173 | 1.3304 | 1.0041 | 0.7379 | 0.5313 | 0.3840 | 0.2957 | 0.2663 |
| -5.0 | 2.0183 | 1.5699 | 1.1828 | 0.8564 | 0.5901 | 0.3835 | 0.2362 | 0.1480 | 0.1186 |
| -2.5 | 1.9392 | 1.4990 | 1.1001 | 0.7719 | 0.5040 | 0.2962 | 0.1480 | 0.0593 | 0.0298 |
| 0.0 | 1.9351 | 1.4808 | 1.0874 | 0.7547 | 0.4827 | 0.2712 | 0.1203 | 0.0300 | 0.0000 |
| 2.5 | 2.0113 | 1.5500 | 1.1492 | 0.8088 | 0.5292 | 0.3110 | 0.1549 | 0.0613 | 0.0302 |
| 5.0 | 2.1692 | 1.6985 | 1.2873 | 0.9360 | 0.6457 | 0.4177 | 0.2538 | 0.1553 | 0.1225 |
| 7.5 | 2.4068 | 1.9243 | 1.5004 | 1.1360 | 0.8328 | 0.5932 | 0.4198 | 0.3151 | 0.2802 |
| 10.0 | 2.7199 | 2.2238 | 1.7858 | 1.4071 | 1.0904 | 0.8387 | 0.6558 | 0.5449 | 0.5079 |
| 12.5 | 3.1045 | 2.5939 | 2.1412 | 1.7484 | 1.4188 | 1.1562 | 0.9651 | 0.8490 | 0.8101 |
| 15.0 | 3.5586 | 3.0333 | 2.5665 | 2.1608 | 1.8199 | 1.5485 | 1.3511 | 1.2315 | 1.1914 |
| 17.5 | 4.0825 | 3.5433 | 3.0638 | 2.6470 | 2.2971 | 2.0191 | 1.8175 | 1.6957 | 1.6550 |
| 20.0 | 4.6787 | 4.1271 | 3.6369 | 3.2133 | 2.8547 | 2.5720 | 2.3676 | 2.2444 | 2.2033 |
| 22.5 | 5.3507 | 4.7886 | 4.2898 | 3.8576 | 3.4963 | 3.2105 | 3.0042 | 2.8798 | 2.8364 |
| 25.0 | 6.1021 | 5.5313 | 5.0259 | 4.5892 | 4.2249 | 3.9372 | 3.7296 | 3.6043 | 3.5625 |
| 27.5 | 6.9366 | 6.3585 | 5.8481 | 5.4082 | 5.0422 | 4.7536 | 4.5454 | 4.4197 | 4.3776 |
| 30.0 | 7.8573 | 7.2729 | 6.7585 | 6.3163 | 5.9494 | 5.6605 | 5.4522 | 5.3264 | 5.2842 |
| 32.5 | 8.8673 | 8.2772 | 7.7591 | 7.3150 | 6.9473 | 6.6584 | 6.4502 | 6.3244 | 6.2819 |

TABLE 2A-continued

| | | | | | | | | |
|---|---|---|---|---|---|---|---|---|
| 35.0 | 9.9698 | 9.3740 | 8.8522 | 8.4060 | 8.0373 | 7.7481 | 7.5399 | 7.4140 | 7.3709 |
| 37.5 | 11.368 | 10.566 | 10.040 | 9.5915 | 9.2213 | 8.9313 | 8.7226 | 8.5962 | 8.5523 |
| 40.0 | 12.467 | 11.858 | 11.327 | 10.875 | 10.502 | 10.211 | 10.001 | 9.8735 | 9.9287 |
| 42.5 | 13.870 | 13.253 | 12.716 | 12.259 | 11.884 | 11.590 | 11.378 | 11.249 | 11.203 |

TABLE 2B

| | Y(mm)--> | | | | | | | | |
|---|---|---|---|---|---|---|---|---|---|
| X(mm) | 0.0 | 2.5 | 5.0 | 7.5 | 10.0 | 12.5 | 15.0 | 17.5 | 20.0 |
| −42.5 | 8.8585 | 8.8905 | 8.9865 | 9.1468 | 9.3717 | 9.6615 | 10.017 | 10.439 | 10.928 |
| −40.0 | 7.8075 | 7.8392 | 7.9342 | 8.0928 | 8.3152 | 8.6020 | 8.9536 | 9.3707 | 9.8543 |
| −37.5 | 6.8303 | 6.8617 | 6.9558 | 7.1128 | 7.3330 | 7.6169 | 7.9650 | 8.3780 | 8.8566 |
| −35.0 | 5.9247 | 5.9558 | 6.0490 | 6.2046 | 6.4229 | 6.7042 | 7.0491 | 7.4582 | 7.9324 |
| −32.5 | 5.0887 | 5.1196 | 5.2120 | 5.3663 | 5.5828 | 5.8617 | 6.2037 | 6.6094 | 7.0796 |
| −30.0 | 4.3207 | 4.3513 | 4.4431 | 4.5962 | 4.8110 | 5.0879 | 5.4273 | 5.8298 | 6.2963 |
| −27.5 | 3.6192 | 3.6495 | 3.7407 | 3.8928 | 4.1061 | 4.3810 | 4.7181 | 5.1178 | 5.5810 |
| −25.0 | 2.9827 | 3.0129 | 3.1034 | 3.2546 | 3.4666 | 3.7398 | 4.0747 | 4.4720 | 4.9322 |
| −22.5 | 2.4101 | 2.4401 | 2.5302 | 2.6805 | 2.8913 | 3.1630 | 3.4961 | 3.8910 | 4.3487 |
| −20.0 | 1.9003 | 1.9302 | 2.0198 | 2.1694 | 2.3792 | 2.6496 | 2.9810 | 3.3740 | 3.8293 |
| −17.5 | 1.4525 | 1.4822 | 1.5715 | 1.7204 | 1.9293 | 2.1985 | 2.5285 | 2.9198 | 3.3731 |
| −15.0 | 1.0658 | 1.0954 | 1.1843 | 1.3327 | 1.5409 | 1.8091 | 2.1378 | 2.5276 | 2.9792 |
| −12.5 | 0.7395 | 0.7691 | 0.8577 | 1.0057 | 1.2132 | 1.4805 | 1.8082 | 2.1968 | 2.6470 |
| −10.0 | 0.4732 | 0.5027 | 0.5911 | 0.7387 | 0.9456 | 1.2123 | 1.5392 | 1.9268 | 2.3758 |
| −7.5 | 0.2663 | 0.2957 | 0.3840 | 0.5313 | 0.7378 | 1.0040 | 1.3302 | 1.7170 | 2.1651 |
| −9.0 | 0.1186 | 0.1480 | 0.2361 | 0.3832 | 0.5895 | 0.8553 | 1.1810 | 1.5673 | 2.0147 |
| −2.5 | 0.0298 | 0.0592 | 0.1476 | 0.2948 | 0.5010 | 0.7666 | 1.0921 | 1.4779 | 1.9249 |
| 0.0 | 0.0000 | 0.0299 | 0.1191 | 0.2674 | 0.4746 | 0.7407 | 1.0663 | 1.4520 | 1.8984 |
| 2.5 | 0.0302 | 0.0610 | 0.1526 | 0.3039 | 0.5139 | 0.7823 | 1.1093 | 1.4955 | 1.9417 |
| 5.0 | 0.1225 | 0.1548 | 0.2506 | 0.4074 | 0.6232 | 0.8966 | 1.2272 | 1.6155 | 2.0624 |
| 7.5 | 0.2802 | 0.3146 | 0.4160 | 0.5808 | 0.8054 | 1.0871 | 1.4243 | 1.8171 | 2.2665 |
| 10.0 | 0.5079 | 0.5445 | 0.6522 | 0.8265 | 1.0622 | 1.3548 | 1.7017 | 2.1020 | 2.5563 |
| 12.5 | 0.8101 | 0.8487 | 0.9623 | 1.1460 | 1.3936 | 1.6989 | 2.0578 | 2.4682 | 2.9304 |
| 15.0 | 1.1914 | 1.2313 | 1.3494 | 1.5412 | 1.7999 | 2.1180 | 2.4900 | 2.9126 | 3.3851 |
| 17.5 | 1.6550 | 1.6956 | 1.8167 | 2.0145 | 2.2823 | 2.6120 | 2.9967 | 3.4323 | 3.9169 |
| 20.0 | 2.2033 | 2.2444 | 2.3672 | 2.5690 | 2.8435 | 3.1824 | 3.5784 | 4.0264 | 4.5237 |
| 22.5 | 2.8384 | 2.8798 | 3.0039 | 3.2081 | 3.4868 | 3.8322 | 4.2372 | 4.6960 | 5.2054 |
| 25.0 | 3.5625 | 3.6043 | 3.7290 | 3.9343 | 4.2151 | 4.5645 | 4.9758 | 5.4434 | 5.9637 |
| 27.5 | 4.3776 | 4.4194 | 4.5441 | 4.7493 | 5.0304 | 5.3817 | 5.7972 | 6.2717 | 6.8013 |
| 30.0 | 5.2842 | 5.3255 | 5.4494 | 5.6536 | 5.9340 | 6.2859 | 6.7041 | 7.1838 | 7.7214 |
| 32.5 | 6.2819 | 6.3224 | 6.4452 | 6.6478 | 6.9271 | 7.2788 | 7.6988 | 8.1827 | 8.7272 |
| 35.0 | 7.3709 | 7.4105 | 7.5318 | 7.7329 | 8.0109 | 8.3624 | 8.7838 | 9.2715 | 9.8224 |
| 37.5 | 8.5523 | 8.5909 | 8.7108 | 8.9105 | 9.1876 | 9.5392 | 9.9622 | 10.454 | 11.011 |
| 40.0 | 9.8287 | 9.8661 | 8.9849 | 10.184 | 10.460 | 10.812 | 11.237 | 11.733 | 12.296 |
| 42.5 | 11.203 | 11.240 | 11.358 | 11.556 | 11.832 | 12.186 | 12.613 | 13.114 | 13.684 |

| | Y(mm)--> | | | | | | | | |
|---|---|---|---|---|---|---|---|---|---|
| X(mm) | 22.5 | 25.0 | 27.5 | 30.0 | 32.5 | 35.0 | 37.5 | 40.0 | 42.5 |
| −42.5 | 11.485 | 12.112 | 12.809 | 13.579 | 14.423 | 15.344 | 16.343 | 17.423 | 18.588 |
| −40.0 | 10.405 | 11.025 | 11.714 | 12.475 | 13.310 | 14.219 | 15.206 | 16.273 | 17.422 |
| −37.5 | 9.4020 | 10.015 | 10.697 | 11.450 | 12.275 | 13.275 | 14.150 | 15.205 | 16.341 |
| −35.0 | 8.4726 | 9.0799 | 9.7556 | 10.501 | 11.318 | 12.208 | 13.174 | 14.217 | 15.341 |
| −32.5 | 7.6151 | 8.2171 | 8.8868 | 9.6256 | 10.435 | 11.317 | 12.273 | 13.307 | 14.419 |
| −30.0 | 6.8277 | 7.4249 | 8.0892 | 8.8219 | 9.6247 | 10.499 | 11.447 | 12.472 | 13.574 |
| −27.5 | 6.1086 | 6.7015 | 7.3609 | 8.0883 | 8.8850 | 9.7528 | 10.694 | 11.710 | 12.803 |
| −25.0 | 5.4564 | 6.0455 | 6.7006 | 7.4231 | 8.2144 | 9.0763 | 10.011 | 11.019 | 12.105 |
| −22.5 | 4.8699 | 5.4555 | 6.1068 | 6.8250 | 7.6115 | 8.4681 | 9.3965 | 10.399 | 11.477 |
| −20.0 | 4.3478 | 4.9305 | 5.5784 | 6.2926 | 7.0751 | 7.9270 | 8.8503 | 9.8470 | 10.919 |
| −17.5 | 3.8893 | 4.4693 | 5.1143 | 5.8254 | 6.6041 | 7.4519 | 8.3707 | 9.3625 | 10.429 |
| −15.0 | 3.4935 | 4.0713 | 4.7137 | 5.4220 | 6.1975 | 7.0419 | 7.9569 | 8.9444 | 10.007 |
| −12.5 | 3.1596 | 3.7355 | 4.3758 | 5.0817 | 5.8546 | 6.6961 | 7.6079 | 8.5920 | 9.6505 |
| −10.0 | 2.8870 | 3.4614 | 4.1000 | 4.8040 | 5.5748 | 6.4140 | 7.3232 | 8.3044 | 9.3597 |
| −7.5 | 2.6754 | 3.2486 | 3.8858 | 4.5884 | 5.3575 | 6.1948 | 7.1020 | 8.0810 | 9.1340 |
| −9.0 | 2.5242 | 3.0966 | 3.7329 | 4.4344 | 5.2024 | 6.0384 | 6.9441 | 7.9216 | 8.9728 |
| −2.5 | 2.4337 | 3.0855 | 3.6411 | 4.3419 | 5.1091 | 5.9443 | 6.8492 | 7.8257 | 8.8759 |
| 0.0 | 2.4066 | 2.9776 | 3.6125 | 4.3125 | 5.0790 | 5.9136 | 6.8179 | 7.7938 | 8.8434 |
| 2.5 | 2.4491 | 3.0190 | 3.6526 | 4.3513 | 5.1166 | 5.9501 | 6.8535 | 7.8286 | 8.8778 |
| 5.0 | 2.5693 | 3.1379 | 3.7696 | 4.4663 | 5.2295 | 6.0609 | 6.9626 | 7.9363 | 8.9843 |
| 7.5 | 2.7740 | 3.3427 | 3.9716 | 4.6657 | 5.4260 | 6.2546 | 7.1535 | 8.1247 | 9.1707 |
| 10.0 | 3.0665 | 3.6348 | 4.2636 | 4.9555 | 5.7130 | 6.5383 | 7.4337 | 8.4018 | 9.4449 |
| 12.5 | 3.4459 | 4.0171 | 4.6469 | 5.3381 | 6.0936 | 6.9162 | 7.8086 | 8.7734 | 9.8133 |
| 15.0 | 3.9088 | 4.4858 | 5.1193 | 5.8122 | 6.5679 | 7.3895 | 8.2800 | 9.2425 | 10.280 |
| 17.5 | 4.4511 | 5.0369 | 5.6770 | 6.3747 | 7.1334 | 7.9566 | 8.8475 | 9.8097 | 10.846 |

TABLE 2B-continued

| | | | | | | | | |
|---|---|---|---|---|---|---|---|---|
| 20.0 5.0700 | 5.6667 | 6.3163 | 7.0218 | 7.7867 | 8.6146 | 9.5090 | 10.474 | 11.512 |
| 22.5 5.7643 | 6.3735 | 7.0347 | 7.7507 | 8.5249 | 9.3607 | 10.262 | 11.232 | 12.275 |
| 25.0 6.5349 | 7.1570 | 7.8313 | 8.5600 | 9.3461 | 10.193 | 11.104 | 12.083 | 13.135 |
| 27.5 7.3839 | 8.0189 | 8.7070 | 9.4498 | 10.250 | 11.110 | 12.035 | 13.026 | 14.089 |
| 30.0 8.3144 | 8.9619 | 9.6640 | 10.422 | 11.237 | 12.114 | 13.054 | 14.061 | 15.139 |
| 32.5 9.3299 | 9.9894 | 10.705 | 11.479 | 12.311 | 13.205 | 14.163 | 15.188 | 16.285 |
| 35.0 10.434 | 11.105 | 11.835 | 12.625 | 13.475 | 14.388 | 15.365 | 16.412 | 17.530 |
| 37.5 11.631 | 12.314 | 13.058 | 13.864 | 14.733 | 15.666 | 16.665 | 17.735 | 18.877 |
| 40.0 12.926 | 13.620 | 14.379 | 15.202 | 16.090 | 17.045 | 18.068 | 19.213 | 20.333 |
| 42.5 14.323 | 15.030 | 15.804 | 16.645 | 17.553 | 18.531 | 19.580 | 20.703 | 21.903 |

What is claimed is:

1. A progressive addition ophthalmic lens providing a continuous visual field, the lens comprising:

a progressive power surface, said progressive power surface comprising, a distance viewing portion having a first focal power, a near viewing portion having a second focal power, an intermediate portion having a mean focal power which varies progressively from said first focal power to said second focal power along an umbilical meridian connecting said distance viewing portion to said near viewing portion, wherein said mean focal power is defined by a polynomial equation of the form $P=b_1+b_2X+b_3X^2+ \ldots b_9X^8$ wherein $b_1$ through $b_9$ are non-zero coefficients and X is the ordinate value of the coordinate axis and wherein said progressive power surface provides a smooth continuous transition of said mean power within the visual field along a line of lateral gaze and a line of ocular convergence.

2. The progressive addition ophthalmic lens of claim 1 wherein said distance viewing portion is substantially spherical.

3. The progressive addition ophthalmic lens of claim 2 wherein said near viewing portion is substantially spherical.

4. A method of making an improved progressive addition ophthalmic lens having a continuous visual field, a progressive power surface, a distance viewing portion having a first focal power, a near viewing portion having a second focal power, an intermediate portion having a mean focal power which varies progressively from said first focal power to said second focal power along an umbilical meridian connecting said distance viewing portion to said near viewing portion, said method comprising the steps of:

defining the progressive lens surface by a polynomial equation of the form $P=b_1+b_2X+b_3X^2+ \ldots b_9X^8$ wherein $b_1$ through $b_9$ are non-zero coefficients and X is the ordinate value of the coordinate axis and wherein said progressive power surface provides a smooth continuous transition of said mean power within the visual field along a line of lateral gaze and a line of ocular convergence; and forming a lens surface in the lens as defined by P.

* * * * *